United States Patent
Patil et al.

(10) Patent No.: US 12,369,088 B2
(45) Date of Patent: Jul. 22, 2025

(54) SOFT ACCESS POINT AND PEER TO PEER OPERATION

(71) Applicant: QUALCOMM Incorporated, San Diego, CA (US)

(72) Inventors: Abhishek Pramod Patil, San Diego, CA (US); Gaurang Naik, San Diego, CA (US); Abdel Karim Ajami, Lakeside, CA (US); George Cherian, San Diego, CA (US); Alfred Asterjadhi, San Diego, CA (US); Yanjun Sun, San Diego, CA (US); Sai Yiu Duncan Ho, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 345 days.

(21) Appl. No.: 17/855,479

(22) Filed: Jun. 30, 2022

(65) Prior Publication Data

US 2024/0007918 A1     Jan. 4, 2024

(51) Int. Cl.
*H04W 36/08*     (2009.01)
*H04W 76/15*     (2018.01)

(52) U.S. Cl.
CPC .......... *H04W 36/08* (2013.01); *H04W 76/15* (2018.02)

(58) Field of Classification Search
CPC ..... H04W 36/08; H04W 76/15; H04W 72/40; H04W 84/12
See application file for complete search history.

(56) References Cited

FOREIGN PATENT DOCUMENTS

| WO | WO-2017107046 A1 | * | 6/2017 |
| WO | WO-2021180541 A1 | | 9/2021 |
| WO | WO-2022005165 A1 | | 1/2022 |
| WO | WO-2022124979 A1 | | 6/2022 |

OTHER PUBLICATIONS

IEEE: "Draft Standard for Information Technology Telecommunications . . . for EHT", Piscataway, NJ, vol. 802.11 drafts, No. D2.0, May 23, 2022, pp. 1-933, XP068192044 (Year: 2022).*
International Search Report and Written Opinion—PCT/US2023/025546—ISA/EPO—Dec. 11, 2023.

(Continued)

*Primary Examiner* — Jamal Javaid
(74) *Attorney, Agent, or Firm* — Holland & Hart LLP

(57) ABSTRACT

Methods, systems, and devices for wireless communications are described. Described techniques relate to a soft access point (AP) in a multi-link operation including a first radio frequency link for control communications and a second radio frequency link for data communications. Described techniques further relate to a transfer of an AP role in a wireless local area network operating in accordance with an multi-link operation. Described techniques further provide for assisting, at an AP (which may be a soft AP), peer to peer communications between non-AP multi-link devices (MLDs) in a WLAN operating in accordance with an MLO.

21 Claims, 21 Drawing Sheets

(56) References Cited

OTHER PUBLICATIONS

IEEE: "Draft Standard for Information Technology—Tele-Communications and Information Exchange Between Systems Local and Metropolitan Area Networks—Specific Requirements Part 11: Wireless LAN Medium Access Control and Physical Layer Specifications Amendment 8: Enhancements for EHT", D2.0_Redline_Compared_To_D1.5, IEEE-SA, Piscataway, NJ USA, vol. 802.11be drafts, No. D2.0, May 23, 2022, pp. 1-933, XP068192044, p. 491-492, Para. 35.3.16.3, Fig. 35-27, 35-28 p. 238, Tables 9-401k, p. 335, 336, Para. 11.3.5.2, p. 506, Fig 35-34.
Partial International Search Report—PCT/US2023/025546—ISA/EPO—Sep. 19, 2023.

\* cited by examiner

SOFT ACCESS POINT AND PEER TO PEER OPERATION

BACKGROUND

The following relates to wireless communications, including soft access point (AP) and peer to peer (p2p) operation.

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a WLAN, such as a Wi-Fi (i.e., Institute of Electrical and Electronics Engineers (IEEE) 802.11) network may include an AP that may communicate with one or more stations (STAs) or mobile devices. The AP may be coupled to a network, such as the Internet, and may enable a mobile device to communicate via the network (or communicate with other devices coupled to the access point). A wireless device may communicate with a network device bi-directionally. For example, in a WLAN, a STA may communicate with an associated AP via DL and UL. The DL (or forward link) may refer to the communication link from the AP to the STA, and the UL (or reverse link) may refer to the communication link from the STA to the AP.

SUMMARY

The described techniques relate to improved methods, systems, devices, or apparatuses that support soft access point (AP) and peer to peer (p2p) operation. Generally, the described techniques provide for communications related to a transfer of an AP role in a wireless local area network (WLAN) operating in accordance with an multi-link operation (MLO). Additionally, or alternatively, described techniques provide for assisting, at an AP (which may be a soft AP), p2p communications between non-AP multi-link devices (MLDs) in a WLAN operating in accordance with an MLO. A transfer of the AP role may be active or reactive. For example, a WLAN operating in accordance with an MLO may include an MLD operating in an AP role (e.g., as a soft AP), and one or more non-AP MLDs. For an MLO that includes the first radio frequency link (e.g., a sub7 link) for control communications and a second radio frequency link (e.g., a 60 GHz radio link) for data communications, the MLD operating in the AP role (the AP MLD) may transmit a message including information relating to the transfer of the AP role via the first radio frequency link. For example, the message may be a direct 1-to-1 message to a non-AP MLD confirming that the non-AP MLD will assume the AP role. In some cases, the message may be a ranked list of candidate MLDs (which may include non-AP MLDs) that may assume the AP role (e.g., at a defined time, or if the current MLD operating in the AP role loses connectivity or power). Accordingly, at the indicated time, or if the current MLD operating in the AP role loses connectivity or power, a MLD on the candidate list may assume the AP role for the MLO. The AP MLD (which may be an AP or which may be a client device such as a station (STA) operating as a soft AP) may schedule service periods for p2p communications between non-AP MLDs in the WLAN. The AP MLD may transmit control information via the first radio frequency link scheduling the service periods for the non-AP MLDs to communicate via the second radio frequency link.

A method for wireless communications at a first MLD is described. The method may include establishing communications according to a multi-link operation for a wireless local area network including the first MLD operating in an access point role and one or more second MLDs, where the multi-link operation includes a first radio frequency link for control communications and a second radio frequency link for data communications and transmitting, via the first radio frequency link, a message including information associated with a transfer of the access point role from the first MLD to a second MLD of the one or more second MLDs.

An apparatus for wireless communications at a first MLD is described. The apparatus may include a processor, memory coupled with the processor, and instructions stored in the memory. The instructions may be executable by the processor to cause the apparatus to establish communications according to a multi-link operation for a wireless local area network including the first MLD operating in an access point role and one or more second MLDs, where the multi-link operation includes a first radio frequency link for control communications and a second radio frequency link for data communications and transmit, via the first radio frequency link, a message including information associated with a transfer of the access point role from the first MLD to a second MLD of the one or more second MLDs.

Another apparatus for wireless communications at a first MLD is described. The apparatus may include means for establishing communications according to a multi-link operation for a wireless local area network including the first MLD operating in an access point role and one or more second MLDs, where the multi-link operation includes a first radio frequency link for control communications and a second radio frequency link for data communications and means for transmitting, via the first radio frequency link, a message including information associated with a transfer of the access point role from the first MLD to a second MLD of the one or more second MLDs.

A non-transitory computer-readable medium storing code for wireless communications at a first MLD is described. The code may include instructions executable by a processor to establish communications according to a multi-link operation for a wireless local area network including the first MLD operating in an access point role and one or more second MLDs, where the multi-link operation includes a first radio frequency link for control communications and a second radio frequency link for data communications and transmit, via the first radio frequency link, a message including information associated with a transfer of the access point role from the first MLD to a second MLD of the one or more second MLDs.

Some examples of the method, apparatuses, and non-transitory computer-readable medium described herein may further include operations, features, means, or instructions for receiving, from the second MLD of the one or more second MLDs and via the first radio frequency link, a request to transfer the access point role to the second MLD of the one or more second MLDs, where the message includes a confirmation transmitted to the second MLD of the one or more second MLDs in response to the request.

Some examples of the method, apparatuses, and non-transitory computer-readable medium described herein may further include operations, features, means, or instructions for transmitting, via the first radio frequency link, a management frame indicating a timing for the transfer of the access point role from the first MLD to the second MLD of the one or more second MLDs.

Some examples of the method, apparatuses, and non-transitory computer-readable medium described herein may further include operations, features, means, or instructions for transmitting, to the second MLD of the one or more second MLDs via the first radio frequency link, an indication of a basic service set (BSS) context associated with the access point role in response to the request, the BSS context including at least one operational parameter of a BSS and a set of service periods associated with data communications via the second radio frequency link for the one or more second MLDs.

In some examples of the method, apparatuses, and non-transitory computer-readable medium described herein, the timing includes a countdown period between transmission of the message and a target beacon transmission time associated with the transfer of the access point role from the first MLD to the second MLD of the one or more second MLDs, the countdown period including a set of multiple delivery traffic indication message periods on the first radio frequency link.

In some examples of the method, apparatuses, and non-transitory computer-readable medium described herein, transmitting the message may include operations, features, means, or instructions for transmitting an indication of a candidate list of MLDs of the one or more second MLDs capable of operating in the access point role, where the candidate list of MLDs includes the second MLD of the one or more second MLDs.

In some examples of the method, apparatuses, and non-transitory computer-readable medium described herein, transmitting the message may include operations, features, means, or instructions for transmitting an indication of a timing for the transfer of the access point role from the first MLD to the second MLD of the one or more second MLDs.

Some examples of the method, apparatuses, and non-transitory computer-readable medium described herein may further include operations, features, means, or instructions for receiving, from the second MLD of the one or more second MLDs via the first radio frequency link, a second message including an indication of an updated timing for the transfer of the access point role and transmitting, via the first radio frequency link and in response to the second message, a third message indicating the updated timing for the transfer of the access point role.

In some examples of the method, apparatuses, and non-transitory computer-readable medium described herein, transmitting the indication of the timing may include operations, features, means, or instructions for transmitting an indication of a countdown period set to a reserved value.

In some examples of the method, apparatuses, and non-transitory computer-readable medium described herein, transmitting the indication of the timing may include operations, features, means, or instructions for transmitting an indication of a target beacon transmission time in the second radio frequency link, the target beacon transmission time associated with the transfer of the access point role from the first MLD to the second MLD of the one or more second MLDs.

In some examples of the method, apparatuses, and non-transitory computer-readable medium described herein, transmitting the message may include operations, features, means, or instructions for transmitting an indication of a BSS context associated with the access point role, the BSS context including at least one operational parameter of a BSS and a set of service periods associated with data communications via the second radio frequency link for the one or more second MLDs.

Some examples of the method, apparatuses, and non-transitory computer-readable medium described herein may further include operations, features, means, or instructions for receiving, via the first radio frequency link from a third MLD of the one or more second MLDs included in the candidate list of MLDs, an indication to remove the third MLD from the candidate list of MLDs and transmitting a second message including an indication of an updated candidate list of MLDs without the third MLD.

In some examples of the method, apparatuses, and non-transitory computer-readable medium described herein, the transfer of the access point role includes a transfer of the access point role in the second radio frequency link.

A method for wireless communications at a second MLD is described. The method may include establishing communications according to a multi-link operation for a wireless local area network including a first MLD operating in an access point role, the second MLD, and one or more third MLDs, the multi-link operation including a first radio frequency link for control communications and a second radio frequency link for data communications and receiving, from the first MLD via the first radio frequency link, a message including information associated with a transfer of the access point role from the first MLD to the second MLD or to one of the one or more third MLDs.

An apparatus for wireless communications at a second MLD is described. The apparatus may include a processor, memory coupled with the processor, and instructions stored in the memory. The instructions may be executable by the processor to cause the apparatus to establish communications according to a multi-link operation for a wireless local area network including a first MLD operating in an access point role, the second MLD, and one or more third MLDs, the multi-link operation including a first radio frequency link for control communications and a second radio frequency link for data communications and receive, from the first MLD via the first radio frequency link, a message including information associated with a transfer of the access point role from the first MLD to the second MLD or to one of the one or more third MLDs.

Another apparatus for wireless communications at a second MLD is described. The apparatus may include means for establishing communications according to a multi-link operation for a wireless local area network including a first MLD operating in an access point role, the second MLD, and one or more third MLDs, the multi-link operation including a first radio frequency link for control communications and a second radio frequency link for data communications and means for receiving, from the first MLD via the first radio frequency link, a message including information associated with a transfer of the access point role from the first MLD to the second MLD or to one of the one or more third MLDs.

A non-transitory computer-readable medium storing code for wireless communications at a second MLD is described. The code may include instructions executable by a processor to establish communications according to a multi-link operation for a wireless local area network including a first MLD operating in an access point role, the second MLD, and one or more third MLDs, the multi-link operation including a first radio frequency link for control communications and a second radio frequency link for data communications and receive, from the first MLD via the first radio frequency link, a message including information associated with a transfer of the access point role from the first MLD to the second MLD or to one of the one or more third MLDs.

Some examples of the method, apparatuses, and non-transitory computer-readable medium described herein may further include operations, features, means, or instructions for receiving, from the one or more third MLDs via the first radio frequency link, one or more respective authentication messages.

Some examples of the method, apparatuses, and non-transitory computer-readable medium described herein may further include operations, features, means, or instructions for communicating, according to the multi-link operation and in the access point role, with the one or more third MLDs.

Some examples of the method, apparatuses, and non-transitory computer-readable medium described herein may further include operations, features, means, or instructions for transmitting, via the first radio frequency link, a management frame for the second radio frequency link.

Some examples of the method, apparatuses, and non-transitory computer-readable medium described herein may further include operations, features, means, or instructions for transmitting, to the one or more third MLDs via the first radio frequency link, an indication of service periods for data communications via the second radio frequency link.

Some examples of the method, apparatuses, and non-transitory computer-readable medium described herein may further include operations, features, means, or instructions for performing a beam training procedure with the one or more third MLDs for data communications via the second radio frequency link.

Some examples of the method, apparatuses, and non-transitory computer-readable medium described herein may further include operations, features, means, or instructions for transmitting, to the first MLD via the first radio frequency link, a request to transfer the access point role to the second MLD, where the message includes a confirmation received in response to the request.

Some examples of the method, apparatuses, and non-transitory computer-readable medium described herein may further include operations, features, means, or instructions for receiving, from the first MLD via the first radio frequency link, a management frame indicating a timing for the transfer of the access point role from the first MLD to the second MLD.

Some examples of the method, apparatuses, and non-transitory computer-readable medium described herein may further include operations, features, means, or instructions for receiving, from the first MLD via the first radio frequency link, an indication of a BSS context associated with the access point role in response to the request, the basic service set context including at least one operational parameter of a BSS and a set of service periods associated with data communications via the second radio frequency link for the one or more third MLDs.

In some examples of the method, apparatuses, and non-transitory computer-readable medium described herein, the timing includes a countdown period between transmission of the message and a target beacon transmission time associated with the transfer of the access point role from the first MLD to the second MLD, the countdown period including a set of multiple delivery traffic indication message periods on the first radio frequency link.

In some examples of the method, apparatuses, and non-transitory computer-readable medium described herein, receiving the message may include operations, features, means, or instructions for receiving an indication of a candidate list of MLDs capable of operating in the access point role, where the candidate list of MLDs includes the second MLD.

In some examples of the method, apparatuses, and non-transitory computer-readable medium described herein, receiving the message may include operations, features, means, or instructions for receiving an indication of a timing for the transfer of the access point role from the first MLD to the second MLD or to one of the one or more third MLDs.

Some examples of the method, apparatuses, and non-transitory computer-readable medium described herein may further include operations, features, means, or instructions for transmitting, to the first MLD via the first radio frequency link, a second message including an indication of an updated timing for the transfer of the access point role and receiving, via the first radio frequency link and in response to the second message, a third message indicating the updated timing for the transfer of the access point role.

In some examples of the method, apparatuses, and non-transitory computer-readable medium described herein, receiving the indication of the timing may include operations, features, means, or instructions for receiving an indication of a countdown period set to a reserved value.

In some examples of the method, apparatuses, and non-transitory computer-readable medium described herein, receiving the indication of the timing may include operations, features, means, or instructions for receiving an indication of a target beacon transmission time in the second radio frequency link, the target beacon transmission time associated with the transfer of the access point role from the first MLD to the second MLD or to one of the one or more third MLDs.

In some examples of the method, apparatuses, and non-transitory computer-readable medium described herein, receiving the message may include operations, features, means, or instructions for receiving an indication of a BSS context associated with the access point role, the BSS context including at least one operational parameter of a BSS and a set of service periods associated with data communications via the second radio frequency link for the second MLD and the one or more third MLDs.

Some examples of the method, apparatuses, and non-transitory computer-readable medium described herein may further include operations, features, means, or instructions for transmitting, via the first radio frequency link to the first MLD, an indication to remove the second MLD from the candidate list of MLDs and receiving, from the first MLD via the first radio frequency link, a second message including an indication of an updated candidate list of MLDs without the second MLD.

In some examples of the method, apparatuses, and non-transitory computer-readable medium described herein, the transfer of the access point role includes a transfer of the access point role in the second radio frequency link.

A method for wireless communications at a first MLD is described. The method may include establishing communications according to a multi-link operation for a wireless local area network including the first MLD operating in an access point role, a second MLD, and a third MLD, where the multi-link operation includes a first radio frequency link for control communications and a second radio frequency link for data communications and transmitting, via the first radio frequency link to the second MLD and to the third MLD, control information scheduling one or more service periods for peer to peer communications via the second radio frequency link between the second MLD and the third MLD.

An apparatus for wireless communications at a first MLD is described. The apparatus may include a processor, memory coupled with the processor, and instructions stored in the memory. The instructions may be executable by the processor to cause the apparatus to establish communications according to a multi-link operation for a wireless local area network including the first MLD operating in an access point role, a second MLD, and a third MLD, where the multi-link operation includes a first radio frequency link for control communications and a second radio frequency link for data communications and transmit, via the first radio frequency link to the second MLD and to the third MLD, control information scheduling one or more service periods for peer to peer communications via the second radio frequency link between the second MLD and the third MLD.

Another apparatus for wireless communications at a first MLD is described. The apparatus may include means for establishing communications according to a multi-link operation for a wireless local area network including the first MLD operating in an access point role, a second MLD, and a third MLD, where the multi-link operation includes a first radio frequency link for control communications and a second radio frequency link for data communications and means for transmitting, via the first radio frequency link to the second MLD and to the third MLD, control information scheduling one or more service periods for peer to peer communications via the second radio frequency link between the second MLD and the third MLD.

A non-transitory computer-readable medium storing code for wireless communications at a first MLD is described. The code may include instructions executable by a processor to establish communications according to a multi-link operation for a wireless local area network including the first MLD operating in an access point role, a second MLD, and a third MLD, where the multi-link operation includes a first radio frequency link for control communications and a second radio frequency link for data communications and transmit, via the first radio frequency link to the second MLD and to the third MLD, control information scheduling one or more service periods for peer to peer communications via the second radio frequency link between the second MLD and the third MLD.

Some examples of the method, apparatuses, and non-transitory computer-readable medium described herein may further include operations, features, means, or instructions for receiving, from the second MLD via the first radio frequency link, a report indicating a buffer status for the peer to peer communications via the second radio frequency link between the second MLD and the third MLD, where the one or more service periods may be determined based on the report.

In some examples of the method, apparatuses, and non-transitory computer-readable medium described herein, receiving the report may include operations, features, means, or instructions for receiving an indication of a bandwidth time product and a link identifier associated with the peer to peer communications via the second radio frequency link between the second MLD and the third MLD, and where the first MLD determines a duration of the one or more service periods based on the bandwidth time product and a link identifier.

Some examples of the method, apparatuses, and non-transitory computer-readable medium described herein may further include operations, features, means, or instructions for transmitting, via the first radio frequency link to the second MLD and the third MLD, second control information scheduling one or more second service periods for second peer to peer communications via the second radio frequency link associated with a fourth MLD, where the one or more second service periods do not overlap in time with the one or more service periods.

Some examples of the method, apparatuses, and non-transitory computer-readable medium described herein may further include operations, features, means, or instructions for transmitting, via the first radio frequency link to the second MLD and the third MLD, second control information scheduling one or more second service periods for second peer to peer communications via the second radio frequency link associated with a fourth MLD, where the one or more second service periods overlap in time with the one or more service periods, and where the one or more second service periods may be associated with a first beam orthogonal with a second beam associated with the one or more service periods.

Some examples of the method, apparatuses, and non-transitory computer-readable medium described herein may further include operations, features, means, or instructions for determining, via a machine learning process, that the first beam may be orthogonal with the second beam, and where transmitting the control information and the second control information may be based on the determining.

Some examples of the method, apparatuses, and non-transitory computer-readable medium described herein may further include operations, features, means, or instructions for identifying a first sector associated with the second MLD and a second sector associated with the third MLD and transmitting, to the second MLD and the third MLD via the first radio frequency link, second control information indicating the first sector and the second sector.

A method for wireless communications at a second MLD is described. The method may include establishing communications according to a multi-link operation for a wireless local area network including a first MLD operating in an access point role, the second MLD, and a third MLD, where the multi-link operation includes a first radio frequency link for control communications and a second radio frequency link for data communications and receiving, via the first radio frequency link from the first MLD, control information scheduling one or more service periods for peer to peer communications via the second radio frequency link between the second MLD and the third MLD.

An apparatus for wireless communications at a second MLD is described. The apparatus may include a processor, memory coupled with the processor, and instructions stored in the memory. The instructions may be executable by the processor to cause the apparatus to establish communications according to a multi-link operation for a wireless local area network including a first MLD operating in an access point role, the second MLD, and a third MLD, where the multi-link operation includes a first radio frequency link for control communications and a second radio frequency link for data communications and receive, via the first radio frequency link from the first MLD, control information scheduling one or more service periods for peer to peer communications via the second radio frequency link between the second MLD and the third MLD.

Another apparatus for wireless communications at a second MLD is described. The apparatus may include means for establishing communications according to a multi-link operation for a wireless local area network including a first MLD operating in an access point role, the second MLD, and a third MLD, where the multi-link operation includes a first radio frequency link for control communications and a second radio frequency link for data communications and means for receiving, via the first radio frequency link from the first MLD, control information scheduling one or more service periods for peer to peer communications via the second radio frequency link between the second MLD and the third MLD.

A non-transitory computer-readable medium storing code for wireless communications at a second MLD is described. The code may include instructions executable by a processor to establish communications according to a multi-link operation for a wireless local area network including a first MLD operating in an access point role, the second MLD, and a third MLD, where the multi-link operation includes a first radio frequency link for control communications and a second radio frequency link for data communications and receive, via the first radio frequency link from the first MLD, control information scheduling one or more service periods for peer to peer communications via the second radio frequency link between the second MLD and the third MLD.

Some examples of the method, apparatuses, and non-transitory computer-readable medium described herein may further include operations, features, means, or instructions for transmitting, to the first MLD via the first radio frequency link, a report indicating a buffer status for the peer to peer communications via the second radio frequency link between the second MLD and the third MLD, where the one or more service periods may be determined based on the report.

In some examples of the method, apparatuses, and non-transitory computer-readable medium described herein, transmitting the report may include operations, features, means, or instructions for transmitting an indication of a bandwidth time product and a link identifier associated with the peer to peer communications via the second radio frequency link between the second MLD and the third MLD.

Some examples of the method, apparatuses, and non-transitory computer-readable medium described herein may further include operations, features, means, or instructions for receiving, from the first MLD via the first radio frequency link, second control information scheduling one or more second service periods for second peer to peer communications via the second radio frequency link associated with a fourth MLD, where the one or more second service periods do not overlap in time with the one or more service periods.

Some examples of the method, apparatuses, and non-transitory computer-readable medium described herein may further include operations, features, means, or instructions for receiving, from the first MLD via the first radio frequency link, second control information scheduling one or more second service periods for second peer to peer communications via the second radio frequency link associated with a fourth MLD, where the one or more second service periods overlap in time with the one or more service periods, and where the one or more second service periods may be associated with a first beam orthogonal with a second beam associated with the one or more service periods.

Some examples of the method, apparatuses, and non-transitory computer-readable medium described herein may further include operations, features, means, or instructions for receiving, from the first MLD via the first radio frequency link, second control information indicating a first sector associated with the second MLD and a second sector associated with the third MLD.

DETAILED DESCRIPTION

Figure 1:
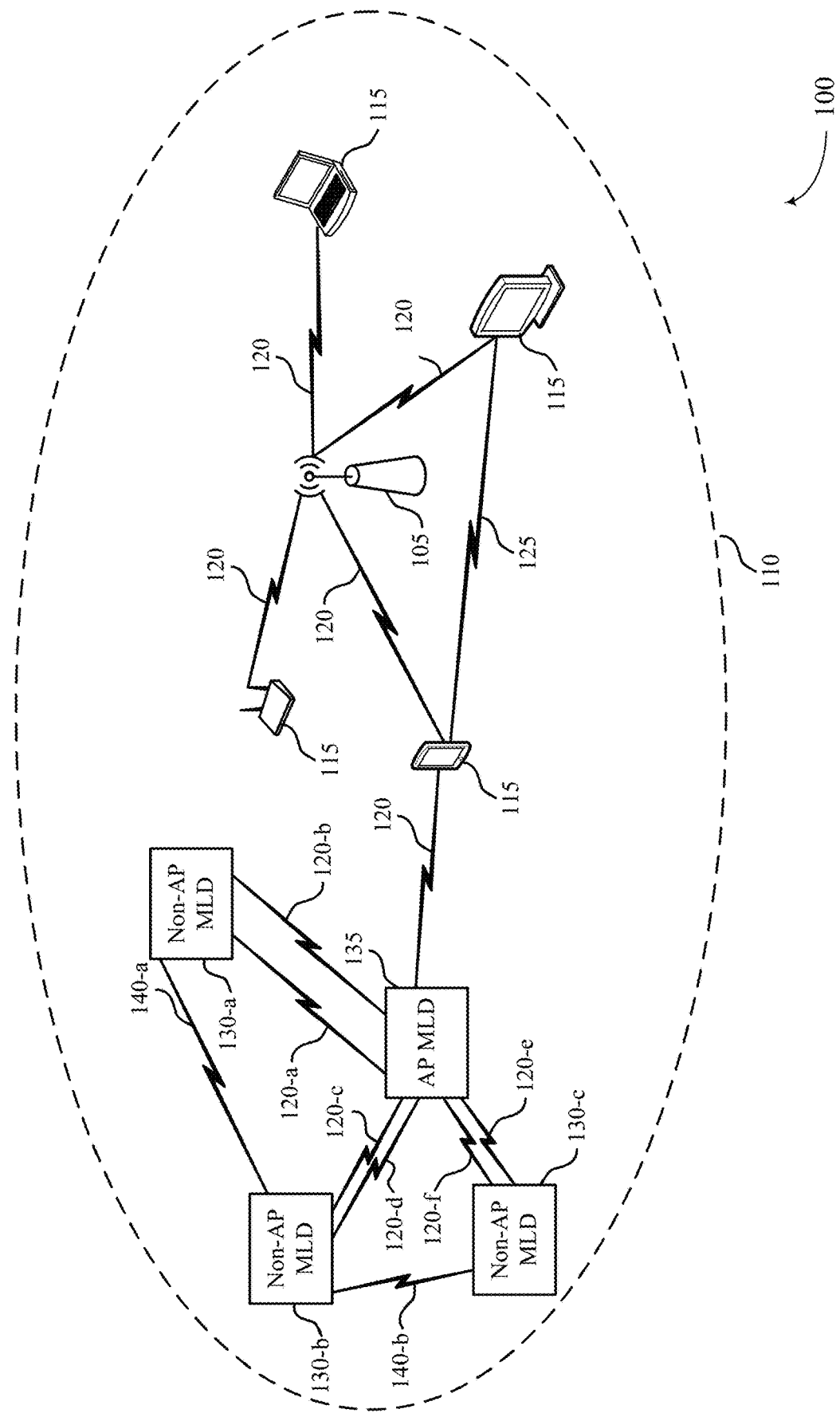
FIG. 1 illustrates an example of a wireless communications system that supports soft access point (AP) and peer to peer (p2p) operation in accordance with aspects of the present disclosure.

In some deployments, devices (such as wireless fidelity (Wi-Fi) devices) may support multi-link operation (MLO) according to which the devices may communicate via multiple different links. For example, an access point (AP) multi-link device (MLD) may communicate with a non-AP MLD via a 2.4 gigahertz (GHz) link, a 5 GHz link, a 6 GHz link, or any combination thereof. In some systems, an AP MLD and a non-AP MLD may be capable of communication via other radio frequency links, such as 3.5 GHz, 45 GHz, or 60 GHz links, which may provide relatively higher data rates, a cleaner (such as less crowded) operating channel, or greater link diversity. Communication devices (e.g., MLDs) in a wireless local area network (WLAN) may use multiple radio frequency links to communicate with each other. MLDs may communicate using a first radio frequency link (e.g., sub7 frequency band) or a second radio frequency link (e.g., 3.5 GHz, 45 GHz, or 60 GHz frequency band). The second radio frequency link (e.g., a 3.5 GHz link, a 45 GHz link, or a 60 GHz link) may provide a large available spectrum for communications in a WLAN (e.g., Wi-Fi). Some WLANs may support multi-link operation (MLO) in which the MLDs may communicate over multiple frequency ranges. For example, MLDs in a WLAN may communicate over one or more sub7 radio frequency links (e.g., 6 GHz, 5 GHz, 2.4 GHz) in addition to over high radio frequency link (e.g., a 3.5 GHz link, a 45 GHz link, or a 60 GHz link). However, operating in a second radio frequency link (e.g., a 3.5 GHz link, a 45 GHz link, or a 60 GHz link) may result in high propagation loss. Due to propagation loss, communication between MLDs over a second radio frequency link (e.g., a 3.5 GHz link, a 45 GHz link, or a 60 GHz frequency band) may demand beamforming on both ends (e.g., the transmitter and receiver side). MLDs may communicate over other radio frequency links (e.g., sub7 frequency band including a 2.4 GHz link, a 5 GHz link, or a 6 GHz link) without the use of beamforming, and therefore MLDs may transmit and receive communications over sub7 frequency band links without consideration of the location of the devices. Additionally, or alternatively, the second radio frequency link (e.g., a 3.5 GHz link, a 45 GHz link, or a 60 GHz link) may be unsuitable for contention based access. In addition, communicating on the 3.5 GHz link, the 45 GHz link, or the 60 GHz link may lead to a high resource consumption.

One or more aspects of the present disclosure may provide for techniques for communicating in accordance with an MLO using one or more radio frequency links. MLDs may communicate using a first radio frequency link (e.g., sub7 frequency band) and a second radio frequency link (e.g., a 3.5 GHz link, a 45 GHz link, or a 60 GHz link). An access point (AP) in an MLO may communicate (e.g., transmit or receive, or both) control signals via a first radio frequency link (e.g., a sub7 radio frequency link), and the AP may communicate (e.g., transmit or receive, or both) data with stations (STAs) via a second radio frequency link (e.g., a 3.5 GHz link, a 45 GHz link, or a 60 GHz link). Additionally, or alternatively, STAs (e.g., non-AP MLDs) may communicate (e.g., transmit or receive, or both) data with each other (e.g., peer to peer (p2p) communications) via the second radio frequency link. In some examples, the AP (e.g., the AP MLD) and the STAs (e.g., non-AP MLDs) may perform a service period setup using the first radio frequency link and may communicate during the service periods using the second radio frequency. The communications between multiple MLDs may be in accordance with a timeline that is specific for the MLO. A non-AP MLD (e.g., an MLD communicating using a STA) may communicate with an AP MLD (e.g., MLD communicating using an AP) in accordance with a beacon interval timeline. An AP MLD may transmit an indication of at least a portion of a beacon interval timeline for communications between the second MLD and one or more non-AP MLDs via the first radio frequency link in accordance with an MLO for a WLAN. The beacon interval timeline may include at least one of a beacon transmit interval, and one or more service periods, channel access between the one or more first MLDs and the second MLD over the second radio frequency link being via the one or more service periods. In some examples, a service period may include a dedicated service period or an opportunistic service period. The service period may be scheduled for communications on the second radio frequency link with at least one non-AP MLD. In some examples, a beacon transmit interval may be followed by a set of dedicated service periods and a set of opportunistic service periods. An AP MLD and a non-AP MLD may negotiate the use of the dedicated service periods using the first radio frequency link. For example, a WLAN operating in accordance with an MLO may include the first frequency range for control communications and a second, higher frequency range for data communications. In some examples, an AP MLD and a non-AP MLD may negotiate the usage of the dedicated service period using the sub7 radio frequency link. The AP MLD may then opportunistically use the set of opportunistic service periods after completion of data transmission on the set of dedicated service periods. Applicant submits that the terms dedicated service period, the opportunistic service period, the beacon transmit interval are for explanatory purposes and may be referred to using different terms.

In some examples, an AP MLD may transmit a message advertising the availability of the opportunistic service periods for data communications. For example, the message may be a broadcast message or a direct message in the first radio frequency link. Additionally, or alternatively, the AP MLD in the WLAN operating in accordance with an MLO may schedule service periods for p2p communications between non-AP MLDs (e.g., STAs). For example, the AP MLD may transmit control information via the sub7 radio frequency link scheduling the service periods for the non-AP MLDs to communicate over the second radio frequency link (e.g., a 3.5 GHz link, a 45 GHz link, or 60 GHz radio frequency link).

Some client devices (e.g., STAs) in a WLAN may be capable of operating in an AP role (e.g., as an AP MLD) in an MLO. For example, a STA may be configured as a soft AP (e.g., a software enabled AP) in an MLO. A soft AP in an MLO may communicate control signals via the first radio frequency link (e.g., a sub7 link), and the soft AP may communicate data with STAs via the second radio frequency link (e.g., a 3.5 GHz link, a 45 GHz link, or a 60 GHz link), and STAs may communicate data with each other (e.g., p2p communications) via the second radio frequency link (e.g., the 3.5 GHz link, the 45 GHz link, or the 60 GHz link). Operating as a soft AP at a client device, however, may consume a large amount of power, and accordingly a client device operating as a soft AP may prefer to transfer the AP role to another MLD. Further, in some scenarios, an MLD operating as a soft AP may lose power or connectivity, which may cause disruptions for the STAs in the WLAN.

One or more aspects of the present disclosure may provide for communications related to the transfer of an AP role in a WLAN operating in accordance with an MLO. One or more aspects of the present disclosure may provide for techniques for assisting, at a soft AP, p2p communications between non-AP MLDs in a WLAN operating in accordance with an MLO. A transfer of the AP role may be active or reactive. For example, a WLAN operating in accordance with an MLO may include an MLD operating in an AP role (e.g., as a soft AP), and one or more non-AP MLDs. For an MLO that includes the first radio frequency link (e.g., a sub7 link) for control communications and a second radio frequency link (e.g., a 3.5 GHz link, a 45 GHz link, or a 60 GHz link) for data communications, the MLD operating in the AP role may transmit a message including information relating to the transfer of the AP role via the first radio frequency link. For example, the message may be a direct 1-to-1 message to a non-AP MLD confirming that the non-AP MLD will assume the AP role. In some cases, the message may be a ranked list of candidate MLDs (which may include non-AP MLDs) that may take over the AP role (e.g., at a certain time, or if the current MLD operating in the AP role loses connectivity or power). Accordingly, at the indicated time, or if the current MLD operating in the AP role loses connectivity or power, a MLD on the candidate list may assume the AP role for the MLO.

The AP MLD (which may be an AP or which may be a client device such as a STA operating as a soft AP) may schedule service periods for p2p communications between non-AP MLDs in the WLAN. The AP MLD may transmit control information via the first radio frequency link scheduling the service periods for the non-AP MLDs to communicate via the second radio frequency link. The AP MLD may consider the locations of the STAs, timing, and orthogonality of beams when scheduling service periods for the STAs.

Aspects of the disclosure are initially described in the context of a wireless communications system. Aspects of the disclosure are further described in the context of communication timelines and process flow. Aspects of the disclosure are further illustrated by and described with reference to apparatus diagrams, system diagrams, and flowcharts that relate to techniques for channel access in wireless communications systems.

FIG. 1 illustrates a WLAN 100 (also known as a Wi-Fi network) configured in accordance with various aspects of the present disclosure. The WLAN 100 may include an AP 105 and multiple associated STAs 115, which may represent devices such as mobile STAs, personal digital assistant (PDAs), other handheld devices, netbooks, notebook computers, tablet computers, laptops, display devices (e.g., TVs, computer monitors, etc.), printers, etc. The AP 105 and the associated STAs 115 may represent a basic service set (BSS) or an extended service set (ESS). The various STAs 115 in the network are able to communicate with one another through the AP 105. Also shown is a coverage area 110 of the AP 105, which may represent a BSA of the WLAN 100. An extended network STA (not shown) associated with the WLAN 100 may be connected to a wired or wireless distribution system that may allow multiple APs 105 to be connected in an ESS.

Although not shown in FIG. 1, a STA 115 may be located in the intersection of more than one coverage area 110 and may associate with more than one AP 105. A single AP 105 and an associated set of STAs 115 may be referred to as a BSS. An ESS is a set of connected B S Ss. A distribution system (not shown) may be used to connect APs 105 in an ESS. In some cases, the coverage area 110 of an AP 105 may be divided into sectors (also not shown). The WLAN 100 may include APs 105 of different types (e.g., metropolitan area, home network, etc.), with varying and overlapping coverage areas 110. Two STAs 115 may also communicate directly via a direct wireless link 125 regardless of whether both STAs 115 are in the same coverage area 110. Examples of direct wireless links 120 may include Wi-Fi Direct connections, Wi-Fi Tunneled Direct Link Setup (TDLS) links, and other group connections. STAs 115 and APs 105 may communicate according to the WLAN radio and baseband protocol for physical and medium access control (MAC) layers from IEEE 802.11 and versions including, but not limited to, 802.11b, 802.11g, 802.11a, 802.11n, 802.11ac, 802.11ad, 802.11ah, 802.11ax, etc. In other implementations, p2p connections or ad hoc networks may be implemented within WLAN 100.

In some cases, a STA 115 (or an AP 105) may be detectable by a central AP 105, but not by other STAs 115 in the coverage area 110 of the central AP 105. For example, one STA 115 may be at one end of the coverage area 110 of the central AP 105 while another STA 115 may be at the other end. Thus, both STAs 115 may communicate with the AP 105, but may not receive the transmissions of the other. This may result in colliding transmissions for the two STAs 115 in a contention based environment (e.g., CSMA/CA) because the STAs 115 may not refrain from transmitting on top of each other. A STA 115 whose transmissions are not identifiable, but that is within the same coverage area 110 may be known as a hidden node. CSMA/CA may be supplemented by the exchange of a request to send (RTS) packet transmitted by a sending STA 115 (or AP 105) and a clear to send (CTS) packet transmitted by the receiving STA 115 (or AP 105). This may alert other devices within range of the sender and receiver not to transmit for the duration of the primary transmission. Thus, RTS/CTS may help mitigate a hidden node problem.

In some implementations, the WLAN 100 may support an MLO according to which two or more devices may communicate via two or more wireless links, such as two or more radio frequency links. In such implementations, the WLAN 100 may include one or more MLDs that are capable of communicating (such as transmitting or receiving) via multiple links. In some aspects, two or more STAs 115 may be associated or affiliated with a first MLD, such as a first non-AP MLD 130-*a*, a second non-AP MLD 130-*b*, or a third non-AP MLD 130-*c*, and two or more APs 105 may be associated or affiliated with a second MLD, such as an AP MLD 135. The two or more STAs 115 or APs 105 associated or affiliated with an MLD may be associated with the multiple functionalities of the MLD.

For example, an MLD may be a device that is capable of communicating via multiple radio frequency links and operation or functionality of the MLD at each of the multiple radio frequency links may be described as being performed by a respective STA 115 (in examples in which the MLD is a non-AP MLD 130) or a respective AP 105 (in examples in which the MLD is an AP MLD 135). As such, a non-AP MLD (e.g., the first non-AP MLD 130-*a*, the second non-AP MLD 130-*b*, or the third non-AP MLD 130-*c*) may communicate (such as transmit or receive) via a first radio frequency link using a first STA 115 and may communicate (such as transmit or receive) via a second radio frequency link using a second STA 115. Similarly, an AP MLD 135 may communicate (such as transmit or receive) via a first radio frequency link using a first AP 105 and may communicate (such as transmit or receive) via a second radio frequency link using a second AP 105. For example, the first non-AP MLD 130-*a* may effectively communicate with an AP MLD 135 via a wireless link 120-*a* using a first STA-AP pair and via a wireless link 120-*b* using a second STA-AP pair. The second non-AP MLD 130-*b* may effectively communicate with an AP MLD 135 via a wireless link 120-*c* using a first STA-AP pair and via a wireless link 120-*d* using a second STA-AP pair. The third non-AP MLD 130-*c* may effectively communicate with an AP MLD 135 via a wireless link 120-*e* using a first STA-AP pair and via a wireless link 120-*f* using a second STA-AP pair In some examples, the non-AP MLDs (e.g., the first non-AP MLD 130-*a*, the second non-AP MLD 130-*b*, and the third non-AP MLD 130-*c*) may communicate with each other using p2p communication links. For example, the first non-AP MLD 130-*a* and the second non-AP MLD 130-*b* may communicate via a first p2p link 140-*a* and the second non-AP MLD 130-*b* and the third non-AP MLD 130-*c* may communicate via a second p2p link 140-*b*.

A non-AP MLD (e.g., the first non-AP MLD 130-*a*, the second non-AP MLD 130-*b*, or the third non-AP MLD 130-*c*) and an AP MLD 135 may communicate via various radio frequency links, including a 2.4 GHz link, a 5 GHz link, and a 6 GHz link. In some systems, the 2.4 GHz link, the 5 GHz link, and the 6 GHz link may be relatively easy to access. For example, a non-AP MLD (e.g., the first non-AP MLD 130-*a*, the second non-AP MLD 130-*b*, or the third non-AP MLD 130-*c*) and an AP MLD 135 may access or communicate using (such as transmit or receive via) any one or more of the 2.4 GHz link, the 5 GHz link, and the 6 GHz link without negotiating access on a different link, without an access constraint (such as an access constraint associated with a service type), or without applying techniques associated with mitigating propagation path loss (such as focusing transmission and reception in a specific direction via beamforming). Some other radio frequency links, however, may be associated with an access constraint or difficulty and, in some implementations, a non-AP MLD (e.g., the first non-AP MLD 130-*a*, the second non-AP MLD 130-*b*, or the third non-AP MLD 130-*c*) and an AP MLD 135 may use any one or more of the 2.4 GHz link, the 5 GHz link, and the 6 GHz link to support and facilitate communications via such other radio frequency links.

Such other radio frequency links may include a 3.5 GHz link, a 45 GHz link, or a 60 GHz link. An access constraint of the 3.5 GHz link, for example, may be associated with other devices (such as incumbent devices) already having access and priority to the 3.5 GHz link. For example, some military and commercial equipment may operate via the 3.5 GHz link and such equipment may have a priority to the 3.5 GHz link. As such, while some Wi-Fi devices or other wireless devices may be permitted to use the 3.5 GHz link, such devices may be configured or indicated to turn off or back off when an incumbent device is transmitting. Accordingly, discovery, setup, and coordination exchanges for a potentially deprioritized device using the 3.5 GHz link may be impractical (as they may be interrupted or precluded from transmission relatively often). An access constraint of the 45 GHz link or the 60 GHz link may be associated with characteristics and challenges associated with communication at relatively higher radio frequencies. In addition, the 45 GHz link and the 60 GHz link may be associated with reachability issues (due to relatively high propagation path loss) and a use of beamforming (such as highly focused transmissions) to achieve a suitable signal quality. Such reachability issues and use of beamforming may make discovery, setup, and coordination exchanges using the 45 GHz link or the 60 GHz link impractical as well, as the reachability issues and the use of beamforming may cause communicating devices to transmit or receive a relatively large amount of overhead signaling or experience link failure relatively often, or both.

Communications devices may operate on multiple radio frequency links to enhance resource utilization and increase throughput. Operating on a 60 GHz radio frequency link, however, may present several challenges. Due to high propagation loss, devices communicating using the 60 GHz radio frequency link may perform beamforming for communication. AP MLDs and non-AP MLDs may not be able to effectively perform contention-based access in 60 GHz radio frequency link. One or more techniques depicted herein provide for enhancing communications using the 60 GHz radio frequency link, making the 60 GHz radio frequency link more accessible and reliable.

In some examples, a non-AP MLD (e.g., the first non-AP MLD 130-*a*, the second non-AP MLD 130-*b*, or the third non-AP MLD 130-*c*) and an AP MLD 135 may communicate using a first radio frequency link (e.g., sub7 radio frequency link) as an anchor link. In some examples, operation on a second radio frequency link (e.g., 60 GHz radio frequency link) may include repeating beacon intervals. Each beacon interval may include a beacon header interval and a data transmission interval. Additionally, or alternatively, the beacon header interval may include three sub-intervals: a beacon transmit interval, during which the AP MLD 135 transmits multiple directional beacons, an association beamforming training during which non-AP MLDs perform beam-training for communication with the AP MLD 135, and an announcement transmission interval during which the AP MLD 135 exchanges management frames with associated and beam trained non-AP MLDs. The data transmission interval may include one or more contention-based access periods and schedule service periods (SPs) for exchanging data frames. The service periods may be dynamic or pseudo-static in nature. In some examples, the AP MLD 135 and the non-AP MLD(s) may communicate data during the data transmission interval. Communication during the data transmission interval can be contention-based or according to scheduled service periods. In some aspects, service period-based channel access may have several benefits. For instance, service period-based channel access may be more efficient than contention-based access periods (as service period duration may be adapted to meet the traffic needs), may have deterministic times for communication (using beam directionality), and may enhance reliable communications. However, setting up service periods may involve an AP MLD 135 polling (to gather resource requirements) and performing an announcement of service periods. In some examples, such service period announcement may be performed during early portion the data transmission interval, thereby reducing the available time during data transmission interval for exchanging data.

Techniques for using a first radio frequency link (e.g., a sub7 radio frequency link) for control communications such as setting up a service period and using a second radio frequency link (e.g., a 60 GHz radio frequency link) for performing data communications (e.g., during the service periods) are disclosed. An AP MLD 135 and non-AP MLDs (e.g., the first non-AP MLD 130-*a*, the second non-AP MLD 130-*b*, or the third non-AP MLD 130-*c*) may use the second radio frequency link (e.g., a 60 GHz radio frequency link) as part of an MLO involving the first radio frequency link (e.g., sub7 radio frequency link(s)). For example, an AP 105 operating on the second radio frequency link may be affiliated with an AP MLD 135 that has at least one other AP 105 operating on the first radio frequency link. An AP MLD 135 may use the techniques described herein to use the first radio frequency link (e.g., one or more sub7 radio links) as an anchor link to facilitate operations on the second radio frequency link (e.g., the 60 GHz radio frequency link). The AP MLD 135 may communicate control communications with the non-AP MLD(s) (e.g., the first non-AP MLD 130-*a*, the second non-AP MLD 130-*b*, or the third non-AP MLD 130-*c*) over the first radio frequency link in accordance with an MLO for the WLAN 100. The AP MLD 135 may further communicate data communications with the non-AP MLD (s) (e.g., the first non-AP MLD 130-*a*, the second non-AP MLD 130-*b*, or the third non-AP MLD 130-*c*) over the second radio frequency link in accordance with the MLO for the WLAN 100. For example, a non-AP MLD may monitor the first radio frequency link for identifying information associated with the second radio frequency link and may use the first radio frequency link to communicate control and feedback information associated with data messages sent (or to be sent) via the second radio frequency link. The non-AP MLD may receive the identifying information associated with the second radio frequency link via a reduced neighbor report (RNR) element carried in of a beacon frame or probe response frame sent via the first radio frequency link or via a multi-link probe response sent via the first radio frequency link. Further, in some implementations, a non-AP MLD may conditionally communicate via the second radio frequency link. In such implementations, the RNR element or the multi-link probe response may indicate a restriction associated with use of the second radio frequency link and, if a condition is satisfied, the non-AP MLD and the AP MLD may exchange multi-link setup signaling to add the second radio frequency link. Additionally, or alternatively, the non-AP MLD and the AP MLD may support one or more signaling- or configuration-based mechanisms associated with transmission of beacon frames via the second radio frequency link. In some implementations, for example, the non-AP MLD and the AP MLD may support a selective or conditional transmission of beacon frames via the second radio frequency link and may otherwise use beacon frames sent via the first radio frequency link to transmit and receive information associated with operational parameters of the second radio frequency link.

A non-AP MLD (e.g., the first non-AP MLD 130-*a*, the second non-AP MLD 130-*b*, or the third non-AP MLD 130-*c*) may communicate data with another non-AP MLD using the second radio frequency link. For example, the p2p link 140-*a* and the p2p link 140-*b* may each be a 60 GHz radio frequency link. Use of the 60 GHz radio frequency link for data communications within the WLAN 100 may reduce management overhead. The AP MLD 135 and the non-AP MLDs (e.g., the first non-AP MLD 130-*a*, the second non-AP MLD 130-*b*, or the third non-AP MLD 130-*c*) may use the techniques depicted herein to perform management frame exchanges using sub7 radio frequency links and perform the data exchange using 60 GHz radio frequency link. Thus, communication devices may perform setups for operations on 60 GHz radio frequency link via signaling on sub7 radio frequency link. That is, communication devices may use sub7 radio frequency links to coordinate transmission amongst 60 GHz participants.

Some client devices (e.g., STAs) in a WLAN may be capable of operating in an AP role (e.g., as the AP MLD 135) in an MLO. For example, a STA may be configured as a soft AP (e.g., a software enabled AP) in an MLO. A soft AP (e.g., the AP MLD 135) in an MLO may communicate control signals with the non-AP MLDs (e.g., the first non-AP MLD 130-*a*, the second non-AP MLD 130-*b*, or the third non-AP MLD 130-*c*) via the respective first radio frequency links (e.g., the wireless link 120-*a*, the wireless link 120-*c*, and the wireless link 120-*e*). The soft AP (e.g., the AP MLD 135) in the MLO may communicate data signals with the non-AP MLDs (e.g., the first non-AP MLD 130-*a*, the second non-AP MLD 130-*b*, or the third non-AP MLD 130-*c*) via the respective second radio frequency links (e.g., the wireless link 120-*b*, the wireless link 120-*d*, and the wireless link 120-*f*). A soft AP may provide MLO functionality to advertise the presence of the second radio frequency link (e.g., the 60 GHz link) via RNR and multi-link probing. A soft AP may exchange (e.g., transmit or broadcast) a management frame via the first radio frequency link on behalf of the second radio frequency link and may transmit, via the first radio frequency link, control signals for the data communications via the second radio frequency link. As described herein, a soft AP may establish service periods (e.g., target wake time based or time-block based) for the non-AP MLDs (e.g., the first non-AP MLD 130-*a*, the second non-AP MLD 130-*b*, or the third non-AP MLD 130-*c*) to facilitate scheduling operations for the data communications via the second radio frequency link. The soft AP may perform or enable beamforming enhancements for communications vie the second radio frequency link.

Operating as a soft AP, however, may consume a large amount of power, and accordingly a client device operating in the AP role (e.g., as the AP MLD 135) may prefer to transfer the AP role to another MLD (e.g., to one of the first non-AP MLD 130-*a*, the second non-AP MLD 130-*b*, or the third non-AP MLD 130-*c*). For example, beaconing, maintaining the clock for the MLO, traffic announcements, and supporting discovery and association of non-AP MLDs may consume a large amount of power. Further, in some scenarios, an MLD operating as a soft AP may lose power or connectivity, which may cause disruptions for the STAs in the BSS. As communications over the second radio frequency link (e.g., a 60 GHz link) may be highly directional, the first radio frequency link may be used to coordinate the transfer of the AP role among the participants in the BSS that includes the second radio frequency link.

In some cases, a device (e.g., the first non-AP MLD 130-*a*) may transmit a 1-to-1 request frame via the first radio frequency link (e.g., via the wireless link 120-*a*) to the AP MLD 135 indicating that the device is willing to take over the AP role for the MLO. If the AP MLD 135 accepts the request, the AP MLD 135 may transmit a response frame via the first radio frequency link (e.g., via the wireless link 120-*a*) to the first non-AP MLD 130-*a* confirming the transfer of the AP role. The AP MLD 135 may transfer a beacon indicating the countdown to the target beacon transmission time (TBTT) (of the beacon transmission interval (BTI) on the second radio frequency link) when the transfer of the AP role will occur. The countdown period may be link enough (e.g., span across multiple delivery traffic indication messages (DTIMs) on the first radio frequency link) to ensure all non-AP MLDs (e.g., the first non-AP MLD 130-*a*, the second non-AP MLD 130-*b*, and the third non-AP MLD 130-*c*) receive at least one beacon frame on the first radio frequency link that indicates the transfer TBTT. The AP MLD 135 may indicate the context of the current BSS (e.g., including the existing service period schedules that have been setup) via a 1-to-1 frame exchange with the transferee AP (e.g., the first non-AP MLD 130-*a* assuming the AP role). The other non-AP MLDs (e.g., the second non-AP MLD 130-*b* and the third non-AP MLD 130-*c*) may proactively perform authentication and association (e.g., multi-link setup) with the first non-AP MLD 130-*a*, which assumes the AP MLD role as a soft AP. The other non-AP MLDs (e.g., the second non-AP MLD 130-*b* and the third non-AP MLD 130-*c*) may renegotiate service periods with the first non-AP MLD 130-*a*, which has assumed the AP MLD role as a soft AP. The other non-AP MLDs (e.g., the second non-AP MLD 130-*b* and the third non-AP MLD 130-*c*) may perform beam training (or a portion thereof) with the first non-AP MLD 130-*a*, which has assumed the AP MLD role as a soft AP.

In some cases, the AP MLD 135 may provide (e.g., transmit) a candidate list of the non-AP MLDs (e.g., the first non-AP MLD 130-*a*, the second non-AP MLD 130-*b*, or the third non-AP MLD 130-*c*) which are capable of taking on the AP role for the MLO that includes the second radio frequency link. The AP MLD 135 may also transmit, with the candidate list, to the TBTT (of the beacon transmission interval (BTI) on the second radio frequency link) when a transfer of the AP role will occur. In some cases, the candidate list may be used as a back-up in case the AP MLD 135 abruptly loses power or connectivity (e.g., a user switches off the AP MLD 135 or the AP MLD 135 leaves range). In such cases where the candidate list is used as a backup, the countdown field may be set to a reserved value (e.g., 255) to indicate that a transfer will not occur unless the AP MLD 135 loses connectivity or power. In some cases, the candidate list may be transmitted for power saving reasons. In such cases where the candidate list is transmitted for power saving reasons, the countdown field may be set to point to the TBTT on the second radio frequency link when the AP role will be transferred. At that time, in some cases, the first non-AP MLD (e.g., the first non-AP MLD 130-a, the second non-AP MLD 130-b, or the third non-AP MLD 130-c) on the candidate list may assume the AP role for the MLO that includes the second radio frequency link. The AP MLD 135 may indicate the context of the current BSS (e.g., including the existing service period schedules that have been setup) in a beacon frame on the first radio frequency link, which may assist the transfer of the AP role to the new AP MLD (from among the MLDs on the candidate list).

In some cases, a candidate non-AP MLD (e.g., the first non-AP MLD 130-a) may indicate a rejection (e.g., via a 1-to-1 message via the first radio frequency link) upon receiving a beacon frame on the first radio frequency link which lists the first non-AP MLD 130-a in the candidate list. The AP MLD 135 may accordingly update the candidate list and transmit a new candidate list without the first non-AP MLD 130-a in the updated candidate list.

In some cases, a non-AP MLD in the candidate list (e.g., the second non-AP MLD 130-b) may indicate a willingness (e.g., via a 1-to-1 frame transmitted via the first radio frequency link) to assume the AP role at an earlier time that is indicated in the countdown field with the candidate list, which may include examples where the countdown field is set to a reserved value.

After several TBTTs on the first radio frequency link, the candidate list may be narrowed down to a single candidate with an accurate TBTT on the second radio frequency link when the AP role transfer occurs. The other non-AP MLDs (e.g., the other of the first non-AP MLD 130-a, the second non-AP MLD 130-b, and the third non-AP MLD 130-c) may proactively perform authentication and association (e.g., multi-link setup) with the non-AP MLD which assumes the AP MLD role as a soft AP. The other non-AP MLDs (e.g., the second non-AP MLD 130-b and the third non-AP MLD 130-c) may renegotiate service periods with the non-AP MLD which has assumed the AP MLD role as a soft AP. The other non-AP MLDs (e.g., the other of the first non-AP MLD 130-a, the second non-AP MLD 130-b, and the third non-AP MLD 130-c) may perform beam training (or a portion thereof) with the non-AP MLD, which has assumed the AP MLD role as a soft AP.

In some cases, the AP MLD 135, which may be a client device operating as a soft AP, may negotiate one or more service periods for one or more p2p links (e.g., the p2p link 140-a or the p2p link 140-b), where the p2p links use the second radio frequency link. In some cases, the p2p link may involve one STA that is not associated with the AP MLD 135. A non-AP MLD (e.g., the first non-AP MLD 130-a) may provide a buffer status for the p2p link 140-a to the AP MLD 135 via the first radio frequency link. For example, the buffer status may include a bandwidth time product and a link ID for the p2p link 140-a. The AP MLD 135 and the first non-AP MLD 130-a may negotiate a variant of assisted off-channel target wake time (TWT). In some cases, the AP MLD 135 may set up non-overlapping (e.g., in time or frequency) service periods for multiple p2p links (e.g., the p2p link 140-a and the p2p link 140-b). In some cases, the AP MLD 135 may determine whether the p2p link 140-a is orthogonal in terms of beam direction with the p2p link 140-b, and if the p2p link 140-a is orthogonal in terms of beam direction with the p2p link 140-b the AP MLD 135 may schedule service periods that overlap in time and frequency for the p2p link 140-a and the p2p link 140-b. In some cases, the AP MLD 135 may apply machine learning techniques to learn whether the p2p link 140-a is orthogonal in terms of beam direction with the p2p link 140-b (e.g., based on physical locations of the first non-AP MLD, the second non-AP MLD 130-b, and the third non-AP MLD 130-c). If one or more of the first non-AP MLD, the second non-AP MLD 130-b, and the third non-AP MLD 130-c changes locations, the AP MLD 135 may reassess the orthogonality of the respective beams for the p2p link 140-a and the p2p link 140-b and may update scheduling for the service periods for the p2p link 140-a and the p2p link 140-b.

In some cases, the AP MLD 135, which may be a client device operating as a soft AP, may aid in beam training between non-AP MLDs (e.g., between the first non-AP MLD 130-a and the second non-AP MLD 130-b). For example, the AP MLD 135 may identify location information for the first non-AP MLD 130-a and the second non-AP MLD 130-b. For example, the AP MLD 135 may have information indicating in which sector each of the first non-AP MLD 130-a and the second non-AP MLD 130-b is located while the AP MLD communicates with each of the first non-AP MLD 130-a and the second non-AP MLD 130-b. This sector information may provide a rough estimate of the orientation of each of the first non-AP MLD 130-a and the second non-AP MLD 130-b with respect to the other. This information may aid during a sector level sweep phase such that each of the first non-AP MLD 130-a and the second non-AP MLD 130-b may focus its respective beam in the correct orientation to quickly converge. The AP MLD 135 may apply machine learning techniques to further refine beam training and mobility detection.

Figure 2:
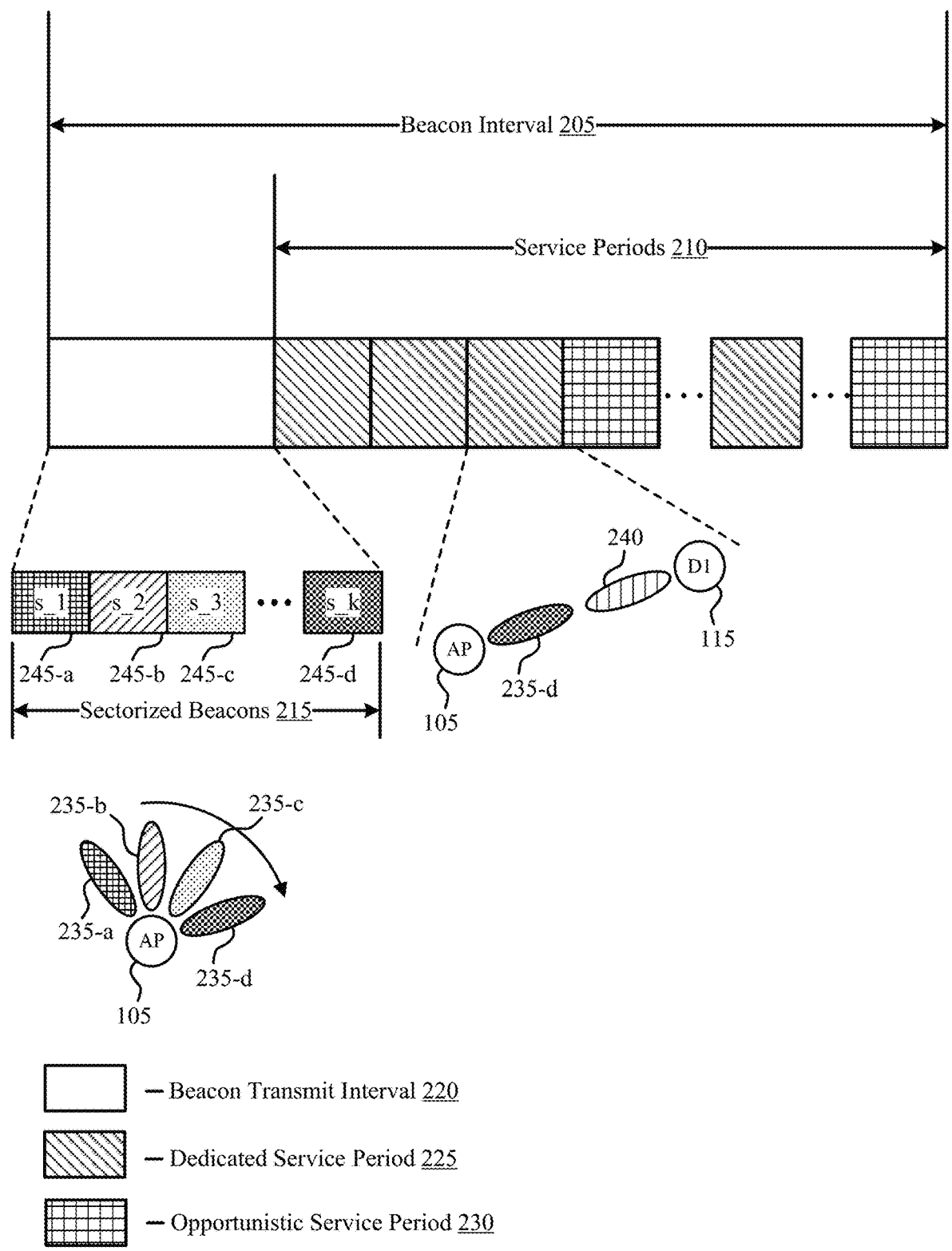
FIG. 2 illustrates an example of a communication timeline that supports soft AP and p2p operation in accordance with one or more aspects of the present disclosure.

FIG. 2 illustrates an example of a communication timeline 200 that supports soft AP and p2p operation in accordance with one or more aspects of the present disclosure. In particular, FIG. 2 shows an example communication timeline 200 that supports using a first radio frequency link to set up operations for a second radio frequency link. In some implementations, the communication timeline 200 may implement aspects of the WLAN 100. Aspects of the communication timeline 200 may be implemented in a wireless network such as a Wi-Fi network implementing the one or more 802.11 family of standards, such as, 802.11ax, 802.11ac, or some other Wi-Fi standard. Generally, wireless communication systems (such as, the WLAN 100) may be configured to support MLO. In an example of an MLO, an AP MLD and one or more non-AP MLDs may communicate using one or more links.

The MLO framework may enable a non-AP MLD to perform one or more operations by monitoring a single link. That is, the AP MLD and the non-AP MLDs may determine a timing synchronization function (or any other timing) for 60 GHz radio frequency link from sub7 radio frequency link. In MLO framework, there may be a fixed timing synchronization function offset between links. Therefore, the AP MLD and the non-AP MLD may use timing synchronization function of sub7 radio frequency link as a reference. According to one or more aspects, an AP MLD may provide traffic indication and indication for one or more updates indication via beacons on sub7 radio frequency link. In some cases, a non-AP MLD may not monitor beacons on 60 GHz radio frequency link for performing one or more operations. However, an AP MLD may use sectorized beacon for a non-AP MLD to decide if beam training is requested. For example, the AP MLD may perform beam training if a beacon a received signal strength indicator, drops below a certain threshold. For instance, the AP MLD may determine that a received signal strength indicator is less than a threshold value. In such cases, the AP MLD may infer that there is a need for sectorized beacons and may hence perform a beacon interval timeline. Thus, techniques depicted herein provide for a multi-link operation frame including a mechanism to tunnel individually addressed management frames. Therefore, an AP MLD may transmit individually addressed management frames for 60 GHz radio frequency link on a sub7 radio frequency link. This eliminates the need for a dedicated interval for exchanging individually addressed management frames.

An AP MLD may perform a beam training procedure to measure a signal strength associated with one or more beam pairs and to select a beam pair associated with a suitable or greatest signal strength. In some implementations, the beam training procedure in accordance with communication timeline 200 may be a beacon frame-based beam training procedure according to which communicating devices may perform beam training via one or more sectorized beacons. For example, a beacon interval 205 may include a beacon transmit interval 220 during which an AP 105 may transmit sectorized beacons in different beamformed directions during different beam training resources (which may generally refer to any one or more of a beam training resource 245-a, a beam training resource 245-b, a beam training resource 245-c, and a beam training resource 245-d).

The beam training resource $s_1$ may be associated with a directional beam 235-a (which may be denoted as $s_1$) and the AP 105 may accordingly transmit a sectorized beacon frame during the beam training resource 245-a using the directional beam 235-a. Similarly, the beam training resource 245-b may be associated with a directional beam 235-b (which may be denoted as $s_2$), the beam training resource 245-c may be associated with a directional beam 235-c (which may be denoted as $s_3$), and the beam training resource 245-d may be associated with a directional beam 235-d (which may be denoted as $s_k$). As such, the AP 105 may sweep across a set of directional beams 235 (which may generally refer to any one or more of the directional beam 235-a, the directional beam 235-b, the directional beam 235-c, or the directional beam 235-d) during the beacon transmit interval 220. A STA 115 may measure the various directional beams 235 used by the AP 105 and identify a suitable beam pair that the AP 105 and the STA 115 may use for exchanging data. Accordingly, the AP 105 and the STA 115 may communicate data during a service period for data frame exchange using the suitable beam pair.

As depicted in FIG. 2, the AP MLD may transmit a beacon interval 205 for communications between the AP MLD and one or more non-AP MLDs on a first radio frequency link (e.g., sub-7 radio frequency link) in accordance with an MLO for a WLAN. The beacon interval 205 may include a beacon transmit interval 220 and a set of service periods 210. The set of service periods 210 may include one or more opportunistic service periods 230 and one or more dedicated service periods 225. The dedicated service periods 225 may be associated with a first periodicity and of the opportunistic service periods 230 may be associated with a second periodicity. In some examples, access between the one or more non-AP MLDs and the AP MLD over a second radio frequency link may be via the one or more service periods 210. A service period 210 may be scheduled for communications on the second radio frequency link with at least one non-AP MLD of the one or more non-AP MLDs.

For example, the STA 115 and the AP 105 may communicate during one or more of the dedicated service periods 225 using the suitable beam pair. Additionally, or alternatively, the STA 115 and the AP 105 may perform beam training during any one or more of the dedicated service periods 225. As illustrated by the FIG. 2, the AP 105 may use the directional beam 235-d and the STA 115 may use a directional beam 240 during a dedicated service period 225.

In some examples, an AP MLD may perform a sector sweep of (short) beacon frames (sectorized beacons 215 including S1, S2, S3, . . . Sk) during the beacon transmit interval 210. The set of beacon frames includes at least one of a basic service set identifier identifying the second MLD, a sector identifier for beam training, a timing synchronization function, a duration of a beacon interval, a traffic indication map, or a combination thereof. The AP MLD may transmit the beacon transmit interval 210 (using an information element) via the first radio frequency link (e.g., sub7 radio frequency link). In some examples, the AP MLD may transmit at least one of a number of sectors, dwell time per sector of the number of sectors, a number of beacon intervals during which the beacon transmit interval is skipped, or a combination thereof. The AP MLD and one or more non-AP MLD may communicate during the one or more service periods 210 via the second radio frequency link (e.g., 60 GHz radio frequency link). In some examples, the AP MLD may transmit a beacon in an on-demand manner (based on a request from a non-AP MLD).

For dedicated service periods 225, an AP MLD and one or more non-AP MLD may perform a service period setup operation for data frame exchange. The AP MLD and the non-AP MLD may negotiate such schedule of service periods 210 in the sub7 radio frequency link. A non-AP MLD may negotiate more than one service period 210 in the same beacon interval 205 (based on traffic profile). The AP MLD and the non-AP MLD may negotiate one or more service periods 210 for a p2p link. For example, an AP MLD may receive, from a non-PA MLD and during a service period setup operation, a request for a dedicated service period 225 for a p2p communication. In some cases, multiple STAs may have overlapping service periods (e.g., based on a target wake time or overlapping individual target wake time). An AP MLD may determine that at least two of the one or more non-AP MLDs have an overlapping dedicated service period 225. The AP MLD may transmit a query to enable the overlapping dedicated service period 225 based on determining that the at least two of the one or more non-AP MLDs have the overlapping dedicated service period 225. In some examples, the query may be included in a trigger frame or a power save poll or a quality of service null frame or a new frame defined for this purpose. In such cases, the dedicated service periods 225 may be trigger enabled (e.g., based poll-response) such that both AP MLDs and non-AP MLDs confirm availability on 60 GHz radio frequency link. A poll-response mechanism may include a response from a non-AP MLD such that a response acts as a confirmation if the non-AP MLD is ready for communications on the 60 GHz radio frequency link. The response to the query may include a trigger-based physical layer protocol data unit or an acknowledgement or a new frame defined for this purpose.

In some examples, a non-AP MLD may transmit a response to a query from an AP MLD. In such cases, the response may include information associated with beam training. Additionally, or alternatively, the response may include an indication if beam training is requested by the non-AP MLD or a peer non-AP MLD. Different pairs of non-AP MLDs whose beamformed links are orthogonal to each other may reuse the same service period 210 (i.e., sectorized reuse). Due to device mobility, such orthogonality may remain for a threshold duration. Therefore, an AP MLD may grant an overlapping schedule for a threshold time period. An AP MLD may also set up opportunistic service periods 230 during gaps between dedicated service periods 225. In some examples, an AP MLD may communicate an indication of opportunistic service periods 230 in sub7 radio frequency link. Such opportunistic service periods 230 may be supplementary to dedicated service periods 225 previously negotiated between the AP MLD and the non-AP MLD.

In some examples, the one or more service periods 210 may include a set of target wake time service periods. In some examples, the one or more service periods 210 may be allocated to a non-AP MLD using frame exchanges via the sub7 radio frequency link for communicating via the 60 GHz radio frequency link. Thus, an MLO frame (supporting communication timeline 200) allows for target wake time setup for another link (tunneling). A non-AP MLD may beamform and may be ready at the beginning of a service period. The non-AP MLD may transition into a power save mode after a time out period if it is not triggered. The service period 210 may be is trigger enabled if shared (i.e., overlapping individual target wait time or broadcast target wake time). In some examples, an AP MLD may transmit a trigger at start of a service period 210 to indicate which non-AP MLD is an intended recipient during the service period. If a service period 210 is dedicated for a single non-AP MLD, then that service period 210 may not be enable using a trigger.

Figure 3:
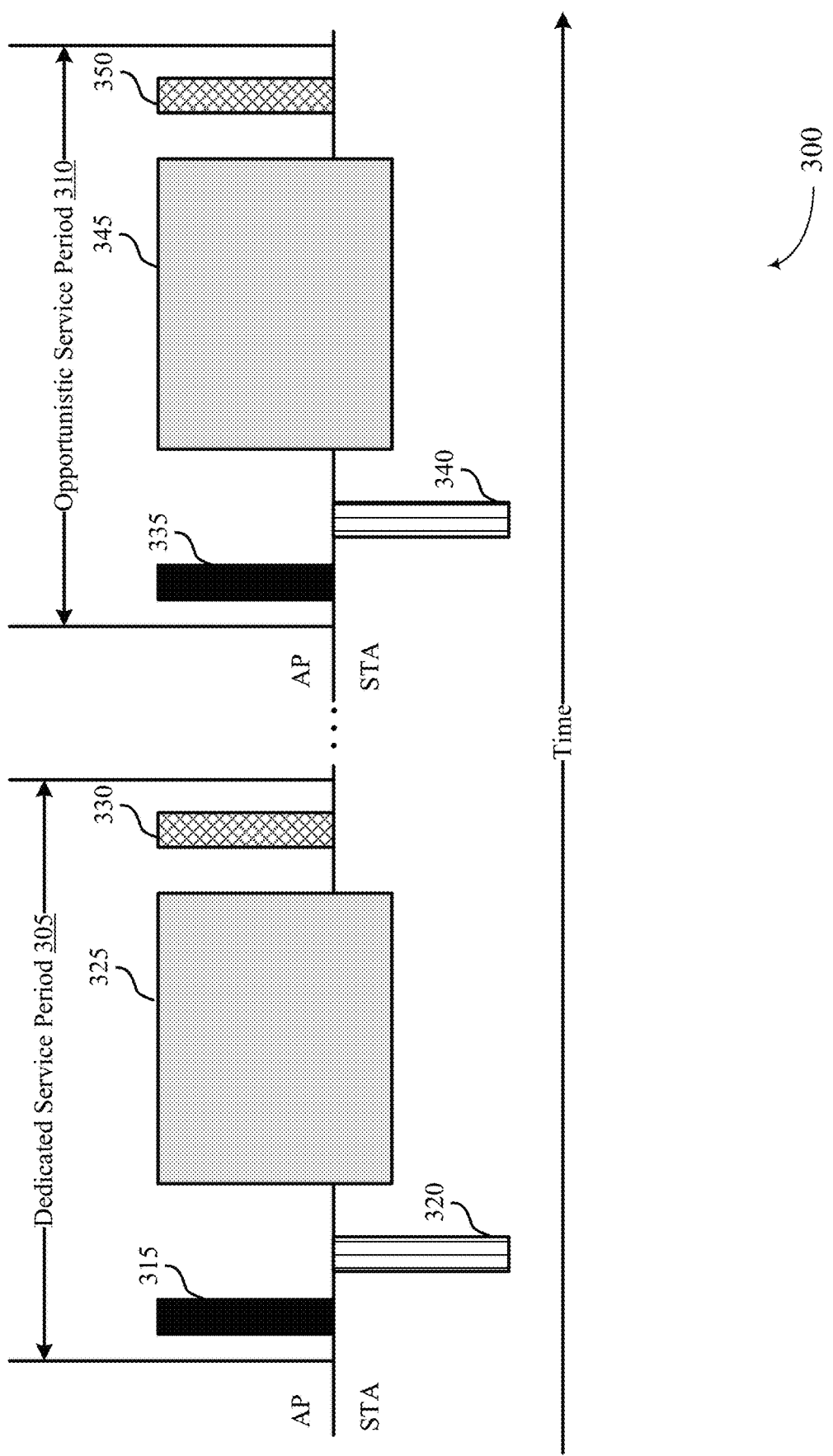
FIG. 3 illustrates an example of a communication timeline that supports soft AP and p2p operation in accordance with one or more aspects of the present disclosure.

FIG. 3 illustrates an example of a communication timeline 300 that supports soft AP and p2p operation in accordance with one or more aspects of the present disclosure. The example communication timeline 300 supports using an opportunistic service period for communicating during gaps between multiple dedicated service periods. In some implementations, the communication timeline 300 may implement aspects of the WLAN 100. Aspects of the communication timeline 300 may be implemented in a wireless network such as a Wi-Fi network implementing the one or more 802.11 family of standards, such as, 802.11ax, 802.11ac, or some other Wi-Fi standard. Generally, wireless communication systems (such as, the WLAN 100) may be configured to support MLO. An AP MLD and one or more non-AP MLDs may communicate using one or more links in accordance with the communication timeline 300.

An AP MLD may communicate with at least one non-AP MLD during a dedicated service period. The AP MLD and one or more non-AP MLD may determine the use of the opportunistic service period based on a polling technique. An opportunistic service period may provide additional time to flush pending frames that were not serviced during a dedicated service period. As depicted in the example of FIG. 3, during a dedicated service period 305, at 315, the AP MLD may poll non-AP MLDs for the use of the dedicated service period 305. At 320, the non-AP MLD may transmit a response to the poll from the AP MLD. At 325, the AP MLD and the non-AP MLD may perform frame exchange. At 330, after completion of the frame exchange, the AP MLD may initiate an opportunistic service period 310. At the end of a dedicated service period 305, if the AP has pending downlink buffer units for the non-AP MLD, or has received an indicate of pending uplink buffer units at the non-AP MLD (e.g., via buffer status report, MORE=1 or EOPS=0 or other means), then the AP MLD may identify identifies an opportunistic service period 310 within a current beacon interval that the pair can use to resume the frame exchange. In some examples, the AP MLD may determine that additional downlink buffer units are remaining after conclusion of the dedicated service period 305. The AP MLD may then transmit, after conclusion of the dedicated service period 305, an indication of at least the portion of a beacon interval timeline, where the indication is of at least one opportunistic service period 310 for communications with the at least one non-AP MLD. The AP MLD may receive, from the non-AP MLD, a response confirming availability for using the opportunistic service period 310. The AP MLD and the non-AP MLD may communicate during the opportunistic service period 310 based on receiving the response.

Additionally, or alternatively, the AP MLD may receive information indicative of pending uplink buffer units remaining at the non-AP MLD after conclusion of the dedicated service period 305. The AP MLD may transmit, after conclusion of the dedicated service period 305, an indication of at least the portion of the beacon interval timeline, where the indication is of at least one opportunistic service period available for communications with the non-AP MLD. The AP MLD may receive a response confirming availability for using the at least one opportunistic service period 310. In some examples, the AP MLD may communicate with the non-AP MLD during the at least one opportunistic service period 310 based on receiving the response. At 335, the AP MLD may poll non-AP MLDs for the use of the opportunistic service period 310. At 340, the non-AP MLD may transmit a response to the poll from the AP MLD. At 345, the AP MLD and the non-AP MLD may perform frame exchange. At 350, after completion of the frame exchange, the AP MLD may initiate a second opportunistic service period.

According to one or more aspects depicted herein, the AP MLD may transmit, via the first radio frequency link (e.g., sub7 radio frequency link), an indication of one or more opportunistic service periods 310 available for communications with the one or more first MLDs. In some examples, communications during the one or more service periods is via the second radio frequency link (e.g., 60 GHz radio frequency link). For instance, the AP MLD may poll, in sub7 radio frequency link, to identify non-AP MLDs requesting more resources than what is already negotiated for 60 GHz radio frequency link (polling in sub7 radio frequency link may be via null data packet feedback report poll or buffer status report poll). In some examples, an AP MLD may transmit an indication for an opportunistic service period 310 via sub7 radio frequency link. For instance, the AP MLD may broadcast to the non-AP MLDs, the indication of one or more opportunistic service periods available for communications with the non-AP MLDs. Alternatively, the AP MLD may transmit the indication of the availability of opportunistic service period 310 in an individually addressed frame (1-to-1). The AP MLD may indicate an exact opportunistic service period 310. Alternatively, the AP MLD may not identify the exact opportunistic service periods for each non-AP MLD (includes trigger-enabled opportunistic service periods so that the non-AP MLD is aware of whether it is getting serviced during a particular service period). In some examples, the non-AP MLD may go to an inactive period if no timing function is received after a certain time out (implying that the AP MLD has not sent the timing function on a sector of an AP MLD).

Figure 4:
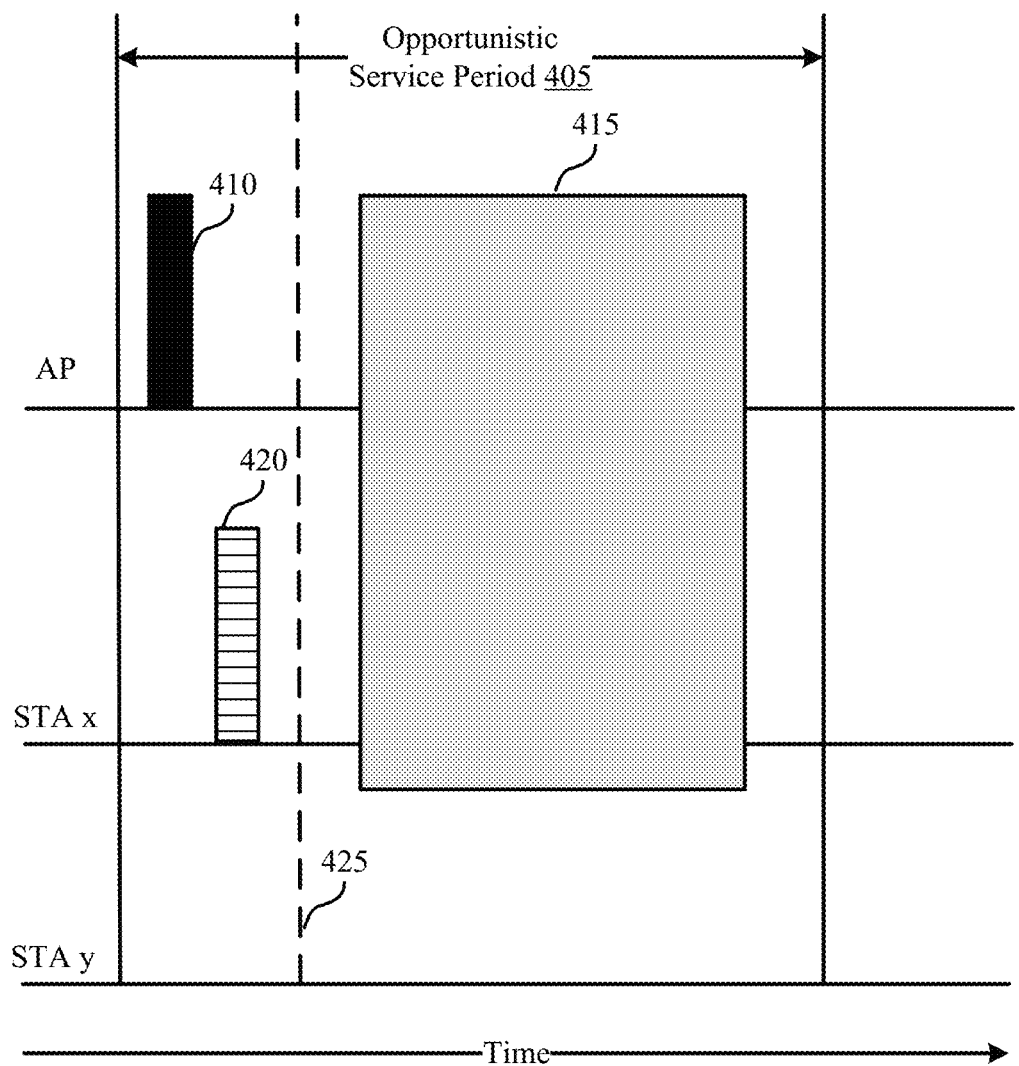
FIG. 4 illustrates an example of a communication timeline that supports soft AP and p2p operation in accordance with one or more aspects of the present disclosure.

FIG. 4 illustrates an example of a communication timeline 400 that supports soft AP and p2p operation in accordance with one or more aspects of the present disclosure. The example communication timeline 400 supports using an opportunistic service period for communicating during gaps between multiple dedicated service periods. In some implementations, the communication timeline 400 may implement aspects of the WLAN 100. Aspects of the communication timeline 400 may be implemented in a wireless network such as a Wi-Fi network implementing the one or more 802.11 family of standards, such as, 802.11ax, 802.11ac, or some other Wi-Fi standard. Generally, wireless communication systems (such as, the WLAN 100) may be configured to support MLO. An AP MLD and one or more non-AP MLDs may communicate using one or more links in accordance with the communication timeline 300.

An AP MLD may communicate with at least one non-AP MLD during a dedicated service period. The AP MLD and one or more non-AP MLD may determine the use of the opportunistic service period in accordance with one or more aspects depicted with reference to FIG. 4. As depicted in the example of FIG. 4, after completion of the frame exchange associated with the dedicated service period, the AP MLD may initiate an opportunistic service period 405. At the end of a dedicated service period, at 410, the AP MLD may poll non-AP MLDs (e.g., STA x and STA y) for the use of the opportunistic service period 405. At 420, a first non-AP MLD (e.g., STA x) may transmit a response to the poll from the AP MLD. At 425, the other non-AP MLDs (e.g., STA y) may go to sleep after a timeout period. At 415, the AP MLD and the first non-AP MLD (e.g., STA x) may perform frame exchange.

According to one or more aspects depicted herein, an AP MLD or a non-AP MLD or both may determine need for additional service period (i.e., for participation in opportunistic service period 405) based on a status during a dedicated service period. The AP MLD mat receive, during a dedicated service period, a status report from a non-AP MLD. The AP MLD may transmit, to the non-AP MLD and based on receiving the status report, the indication of at least the portion of the timeline, where the indication is of at least one opportunistic service period 405. The status report may include at least one of a buffer status report, a data frame, an acknowledgement frame, or a combination thereof. Based on the techniques depicted herein, the AP MLD may identify one or more non-AP MLDs requesting (or in need of) additional service periods. In some cases, the AP MLD may send a poll at the beginning of the opportunistic service period 405. A non-AP MLD may wake up at the beginning of an opportunistic service period 405 to determine whether the AP is triggering in its sector. In some examples, the buffer status may be indicated using a buffer status report poll on sub7 radio frequency link and may provide status on uplink buffer units. Thus, the AP MLD may not perform no special polling on 60 GHz radio frequency link. In some examples, a non-AP MLD may provide a buffer status for p2p communication. In some examples, the buffer status may be associated with bandwidth-time product and link identifier of a 60 GHz radio frequency link. The AP MLD may also assist with off-channel target wake time.

In some examples, the opportunistic service period 405 may be contention based. The AP MLD may transmit an indication of at least a portion of beacon interval timeline, where the indication is of at least one opportunistic service period 405. The AP MLD may receive a response to the indication of the at least one opportunistic service period 405 and may communicate with the non-AP MLD during the at least one opportunistic service period 405 based on receiving the response. For instance, the AP MLD may switch its radio to omni-direction mode during an opportunistic service period 405 to hear a non-AP MLD. The non-AP MLD may contend for the medium and may send a directed poll (e.g., power save poll or quality of service poll) to the AP MLD. In such cases, the AP MLD may send a direction response to one non-AP MLD if it receives polls from more than one non-AP MLDs. In some examples, a non-AP MLD may go to an inactive mode if the non-AP MLD does not receive a response within a timeout period.

Figure 5:
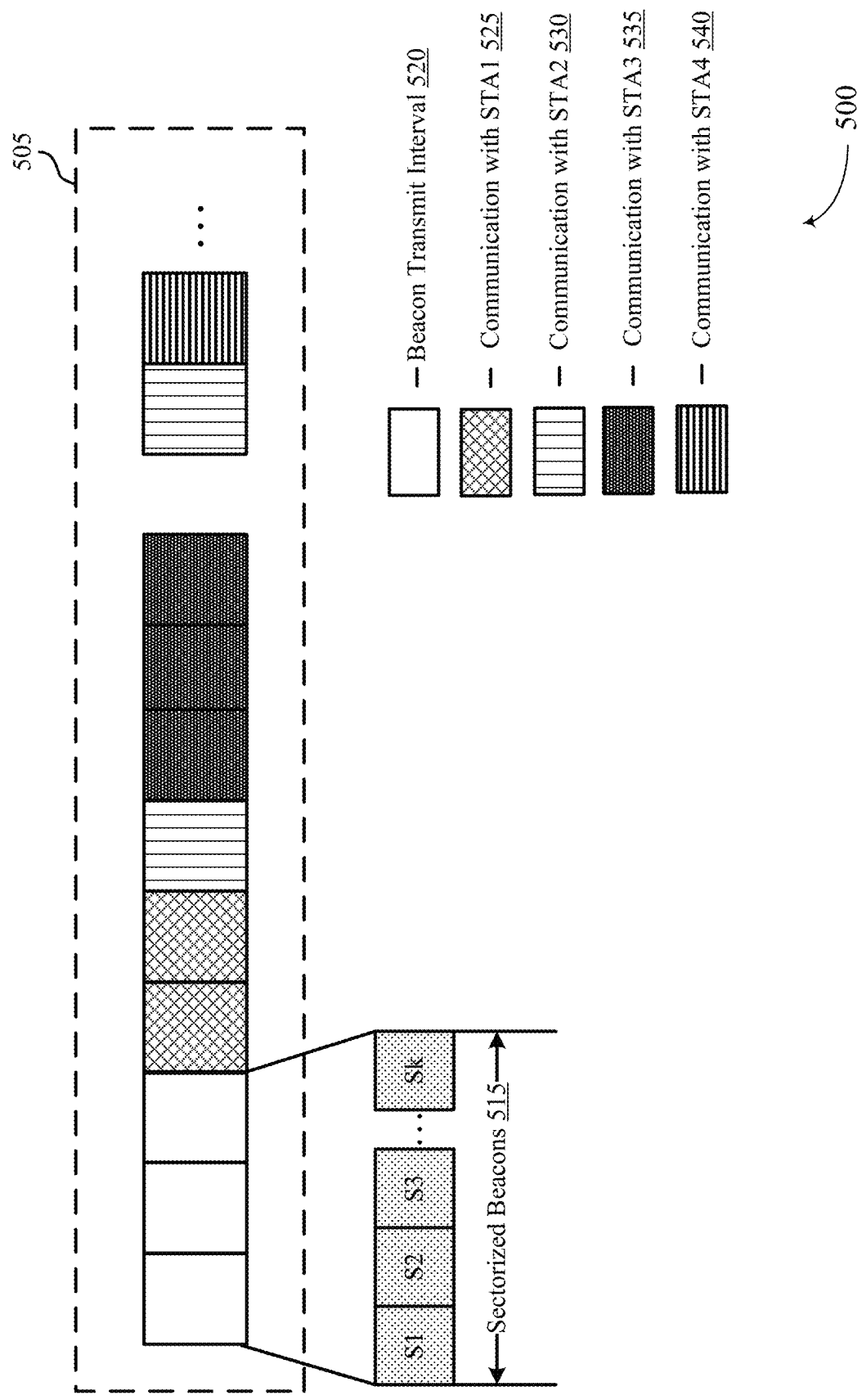
FIG. 5 illustrates an example of a beacon interval that supports soft AP and p2p operation in accordance with one or more aspects of the present disclosure.

FIG. 5 illustrates an example of a beacon interval 500 that supports soft AP and p2p operation in accordance with one or more aspects of the present disclosure. The beacon interval 500 supports using a first radio frequency link (e.g., sub7 radio frequency link) to set up operations for a second radio frequency link (e.g., 60 GHz radio frequency link). In some implementations, the beacon interval 500 may implement aspects of the WLAN 100. In an example of an MLO, an AP MLD and one or more non-AP MLDs may communicate in accordance with the beacon interval 500.

The channel for the first radio frequency link (e.g., sub7 radio frequency link) may be different from the channel for the second radio frequency link (e.g., 60 GHz radio frequency link). For example, in 60 GHz radio frequency link, there may be little or no interference from overlap basic service set due to high pathloss. In basic service set, the transmissions may be highly directional and may be fully scheduled such that both the PA MLD and the non-AP MLD are beam aligned during the time. Therefore, the beacon interval 500 may be communicated in accordance with an updated target wake time schedule.

As depicted in the example of FIG. 5, the beacon interval 505 may be divided into X equal size time-blocks, each of size X divided by a size of the beacon interval 505. In some examples, the beacon interval 505 may be divided into a set of equal sized time blocks, where a bit in a bitmap is associated with a corresponding time block of the set of equal sized time blocks. For instance, 100 ms long beacon interval may be divided into 80 time blocks and a bit in a (10-octet) bitmap may represent a time block of size 1.25 ms. In some examples, functionality within a beacon interval 505 may be represented in terms of time blocks. As depicted in the example of FIG. 5, the beacon interval 505 may be divided in sectorized beacons 515. 3 time blocks, in the example of FIG. 5, may be used for beacon transmit interval 520. The rest of the time in the beacon interval 505 may be allocated to multiple non-AP MLDs based on their traffic needs. In some examples, a first set of service periods 525 may be designated for use in communication with a first non-AP MLD (e.g., STA 1), a second set of service periods 530 may be designated for use in communication with a second non-AP MLD (e.g., STA 2), a third set of service periods 535 may be designated for use in communication with a third non-AP MLD (e.g., STA 3), and a fourth set of service periods 540 may be designated for use in communication with a fourth non-AP MLD (e.g., STA 4).

In some examples, an AP MLD may transmit a beacon in sub7 radio frequency link carrying a bitmap indicating which time blocks are available to use or in use (using 0 or 1). In some examples, a non-AP MLD may negotiate (1-to-1) on sub7 radio frequency link to add or remove time blocks. For example, the AP MLD may transmit a management frame including an indicating of the bitmap. The AP MLD and the non-AP MLD may communicate via the 60 GHz radio frequency link. The management frame may include a beacon frame or a probe response frame. In some examples, an AP MLD may receive, from at least one non-AP MLD, a request for additional time blocks based on a position of the bit in the bitmap. For example, a non-AP MLD may request to add time blocks if the bit position is indicated as 0. The AP MLD may accept or deny the request or may propose an alternative time block for the non-AP MLD. In some examples, the AP MLD may transmit a response based on receiving the request for the additional time blocks. The response may include an acceptance of the request for the additional time blocks or a denial of the request for the additional time blocks or information indicative of an alternative number of additional time blocks.

According to one or more aspects, the AP MLD may transmit an indication of communication schedule via the sub7 radio frequency link, with each bit set to 1 for a slot that is allocated. In some examples, the schedule may be included in a beacon transmit interval and may be associated with an AP MLD, a pair of AP MLD and non-AP MLD and a p2p communication. In some aspects, an AP MLD and one or more non-AP MLDs may include at least one of a single link single radio device, a multi-link single radio device, a multi-link multi-radio device, or a combination thereof. A single link single radio device may operate only on 60 GHz radio frequency link, a multi-link single radio device may operate on one band at a time, and a multi-link multi-radio device may operate on more than one band simultaneously. In some examples, a multi-link multi-radio device may have at least one radio operating on sub7 radio frequency link.

Figure 6:
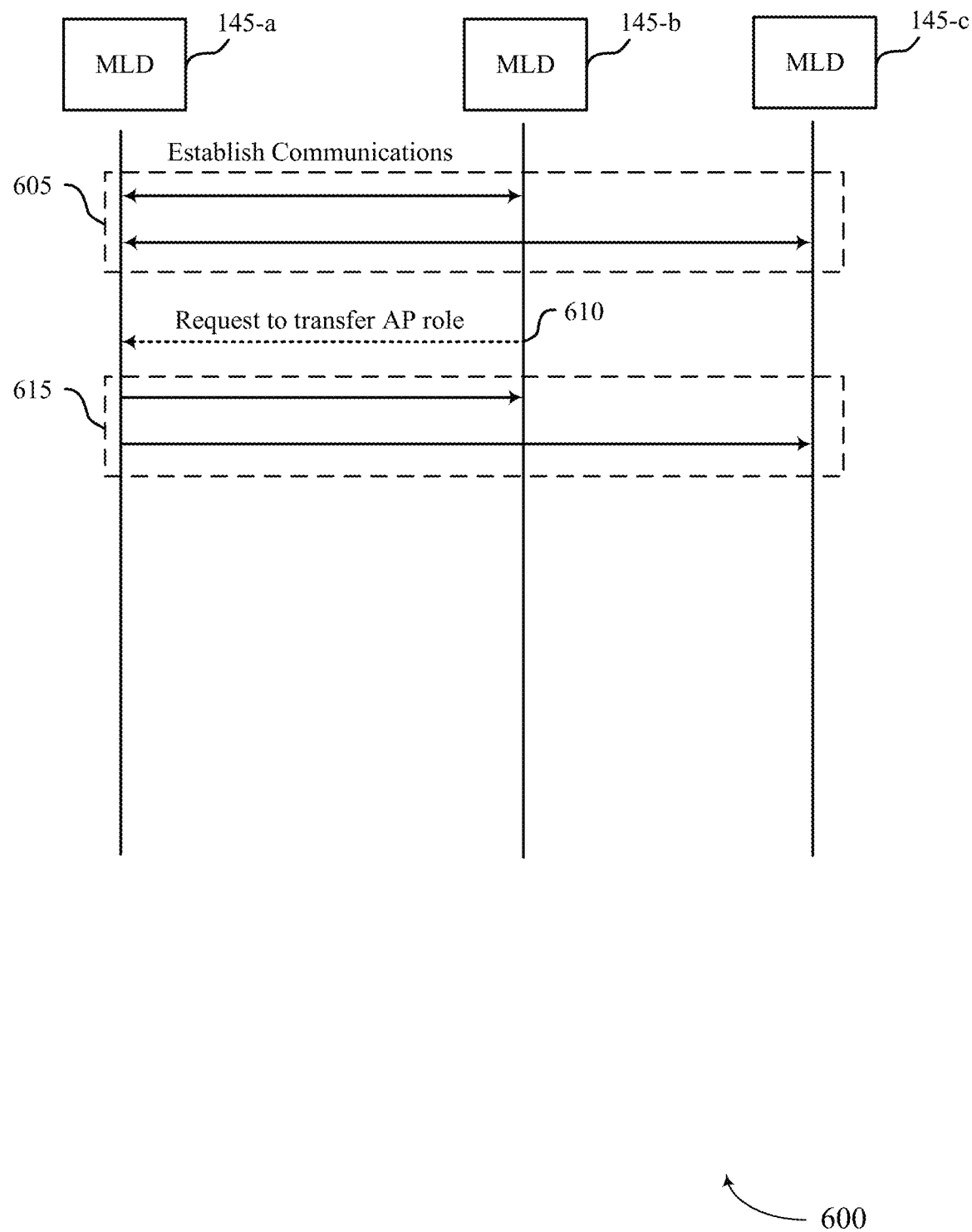
FIG. 6 illustrates an example of a process flow that supports soft AP and p2p operation in accordance with one or more aspects of the present disclosure.

FIG. 6 illustrates an example of a process flow 600 that supports soft AP and p2p operation in accordance with one or more aspects of the present disclosure. In some examples, the process flow 600 may implement aspects of the WLAN 100, the communication timelines 200, 300, and 400, and the beacon interval 500. The process flow 600 may illustrate an example of a first MLD 145-a, a second MLD 145-b, and a third MLD 145-c. The first MLD 145-a may be an example of an AP MLD 135 as described with reference to FIG. 1, and the second MLD 145-b and the third MLD 145-c may be examples of non-AP MLDs 130 as described with reference to FIG. 1. Alternative examples of the following may be implemented, where some processes are performed in a different order than described or are not performed. In some cases, processes may include additional features not mentioned below, or further processes may be added.

At 605, the first MLD 145-a, the second MLD 145-b, and the third MLD 145-c may establish communications according to an MLO for a WLAN including the first MLD 145-a operating in an AP role, the second MLD 145-b and the third MLD 145-c. The MLO includes a first radio frequency link for control communications and a second radio frequency link for data communications.

At 615, the first MLD 145-a may transmit, via the first radio frequency link, a message including information associated with a transfer of the AP role from the first MLD to one of the second MLD 145-b or the third MLD 145-c.

In some cases, at 610, the second MLD 145-b may transmit, to the first MLD 145-a via the first radio frequency link, a request to transfer the AP role to the second MLD 145-b, and the message transmitted at 615 may be a confirmation transmitted to the second MLD 145-b in response to the request. In some cases, the first MLD 145-a may transmit, via the first radio frequency link, a management frame indicating a timing for the transfer of the AP role from the first MLD 145-a to the second MLD 145-b. In some cases, the first MLD 145-a may transmit, to the second MLD 145-b via the first radio frequency link, an indication of a BSS context associated with the AP role in response to the request, the BSS context including at least one operational parameter of a BSS and a set of service periods associated with data communications via the second radio frequency link for the second MLD 145-b and the third MLD 145-c. In some cases, the timing includes a countdown period between transmission of the message and a target beacon transmission time associated with the transfer of the AP role from the first MLD 145-a to the second MLD 145-b, the countdown period including a plurality of DTIM periods on the first radio frequency link.

In some cases, transmitting the message at 615 includes transmitting an indication of a candidate list of MLDs capable of operating in the AP role, where the candidate list of MLDs includes the second MLD 145-b. In some cases, transmitting the message at 615 further includes transmitting an indication of a timing for the transfer of the AP role from the first MLD 145-a to the second MLD 145-b. In some cases, the second MLD 145-b may transmit, to the first MLD 145-a via the first radio frequency link, a second message including an indication of an updated timing for the transfer of the AP role, and in response the first MLD 145-a may transmit, via the first radio frequency link, a third message indicating the updated timing for the transfer of the AP role. In some cases, transmitting the indication of the timing includes transmitting an indication of a countdown period set to a reserved value. In some cases, transmitting the indication of the timing includes transmitting an indication of a TBTT in the second radio frequency link, the TBTT associated with the transfer of the AP role from the first MLD 145-a to the second MLD 145-b. In some cases, transmitting the message at 615 further includes transmitting an indication of a BSS context associated with the AP role, the BSS context including at least one operational parameter of a BSS and a set of service periods associated with data communications via the second radio frequency link for the second MLD 145-b and the third MLD 145-c. In some cases, the third MLD 145-c may transmit, to the first MLD 145-a via the first radio frequency link, an indication to remove the third MLD from the candidate list of MLDs, and the first MLD may transmit a second message including an indication of an updated candidate list of MLDs without the third MLD 145-c. In some cases, the transfer of the AP role includes a transfer of the AP role in the second radio frequency link.

In some cases, after transmission of the message at 615, the second MLD 145-b may receive, from the third MLD 145-c, an authentication message.

In some cases, after transmission of the message at 615, the second MLD 145-b may communicate, according to the MLO and in the AP role, with the third MLD 145-c. In some cases, the second MLD 145-b may transmit, via the first radio frequency link, a management frame for the second radio frequency link. In some cases, the second MLD 145-b may transmit, to the third MLD 145-c, an indication of service periods for data communications via the second radio frequency link. In some cases, the second MLD 145-b may perform a beam training procedure with the third MLD 145-c for data communications via the second radio frequency link.

Figure 7:
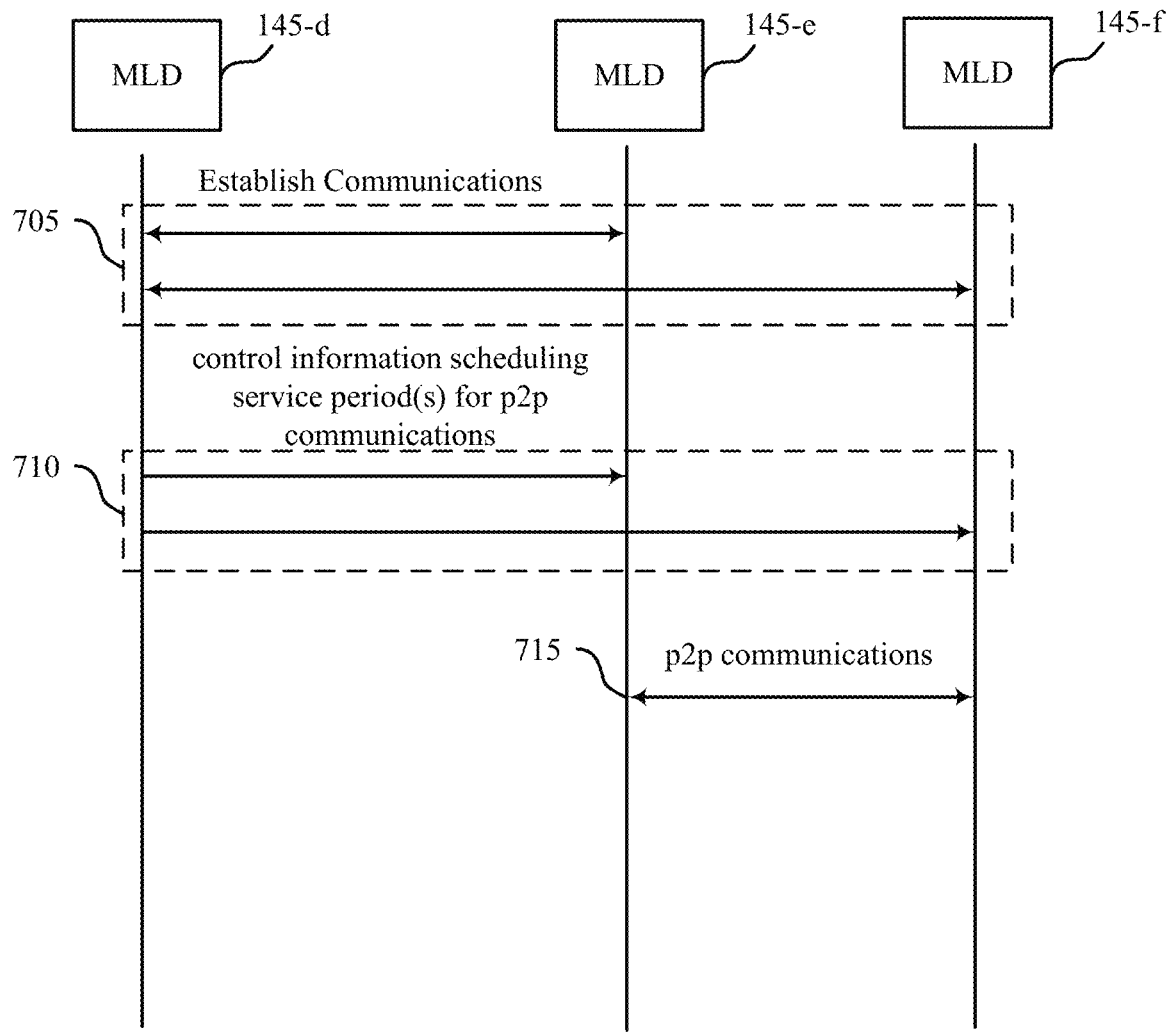
FIG. 7 illustrates an example of a process flow that supports soft AP and p2p operation in accordance with one or more aspects of the present disclosure.

FIG. 7 illustrates an example of a process flow 700 that supports soft AP and p2p operation in accordance with one or more aspects of the present disclosure. In some examples, the process flow 700 may implement aspects of the WLAN 100, the communication timelines 200, 300, and 400, and the beacon interval 500. The process flow 700 may illustrate an example of a first MLD 145-d, a second MLD 145-e, and a third MLD 145-f. The first MLD 145-d may be an example of an AP MLD 135 as described with reference to FIG. 1, and the second MLD 145-e and the third MLD 145-f may be examples of non-AP MLDs 130 as described with reference to FIG. 1. Alternative examples of the following may be implemented, where some processes are performed in a different order than described or are not performed. In some cases, processes may include additional features not mentioned below, or further processes may be added.

At 705, the first MLD 145-d, the second MLD 145-e, and the third MLD 145-f may establish communications according to an MLO for a WLAN including the first MLD 145-d operating in an AP role, the second MLD 145-e and the third MLD 145-f. The MLO includes a first radio frequency link for control communications and a second radio frequency link for data communications.

At 710, the first MLD 145-d may transmit, via the first radio frequency link to the second MLD 145-e and the third MLD 145-f, control information scheduling one or more service periods for p2p communications via the second radio frequency link between the second MLD 145-e and the third MLD 145-c.

At 715, the second MLD 145-e and the third MLD 145-f may communicate p2p communications during the one or more service periods via the second radio frequency link.

In some cases, the second MLD 145-e may transmit, to the first MLD 145-d via the first radio frequency link, a report indicating a buffer status for the p2p communications via the second radio frequency link between the second MLD 145-e and the third MLD 145-f, where the one or more service periods are determined based on the report. In some cases, transmitting the report includes transmitting an indication of a bandwidth time product and a link identifier associated with the p2p communications via the second radio frequency link between the second MLD 145-e and the third MLD 145-f, and where the first MLD 145-d determines a duration of the one or more service periods based on the bandwidth time product and a link identifier.

In some cases, the first MLD 145-d may transmit, via the first radio frequency link to the second MLD 145-e and the third MLD 145-f, second control information scheduling one or more second service periods for second p2p communications via the second radio frequency link associated with a fourth MLD, where the one or more second service periods do not overlap in time with the one or more service periods.

In some cases, the first MLD 145-d may transmit, via the first radio frequency link to the second MLD 145-e and the third MLD 145-f, second control information scheduling one or more second service periods for second p2p communications via the second radio frequency link associated with a fourth MLD, where the one or more second service periods overlap in time with the one or more service periods, and where the one or more second service periods are associated with a first beam orthogonal with a second beam associated with the one or more service periods. In some cases, the first MLD 145-d may determine, via a machine learning process, that the first beam is orthogonal with the second beam, and transmitting the control information and the second control information is based on the determining.

In some cases, the first MLD 145-d may identify a first sector associated with the second MLD 145-e and a second sector associated with the second MLD. The first MLD 145-d may transmit, to the second MLD 145-e and the third MLD 145-f via the first radio frequency link, second control information indicating the first sector and the second sector.

Figure 8:
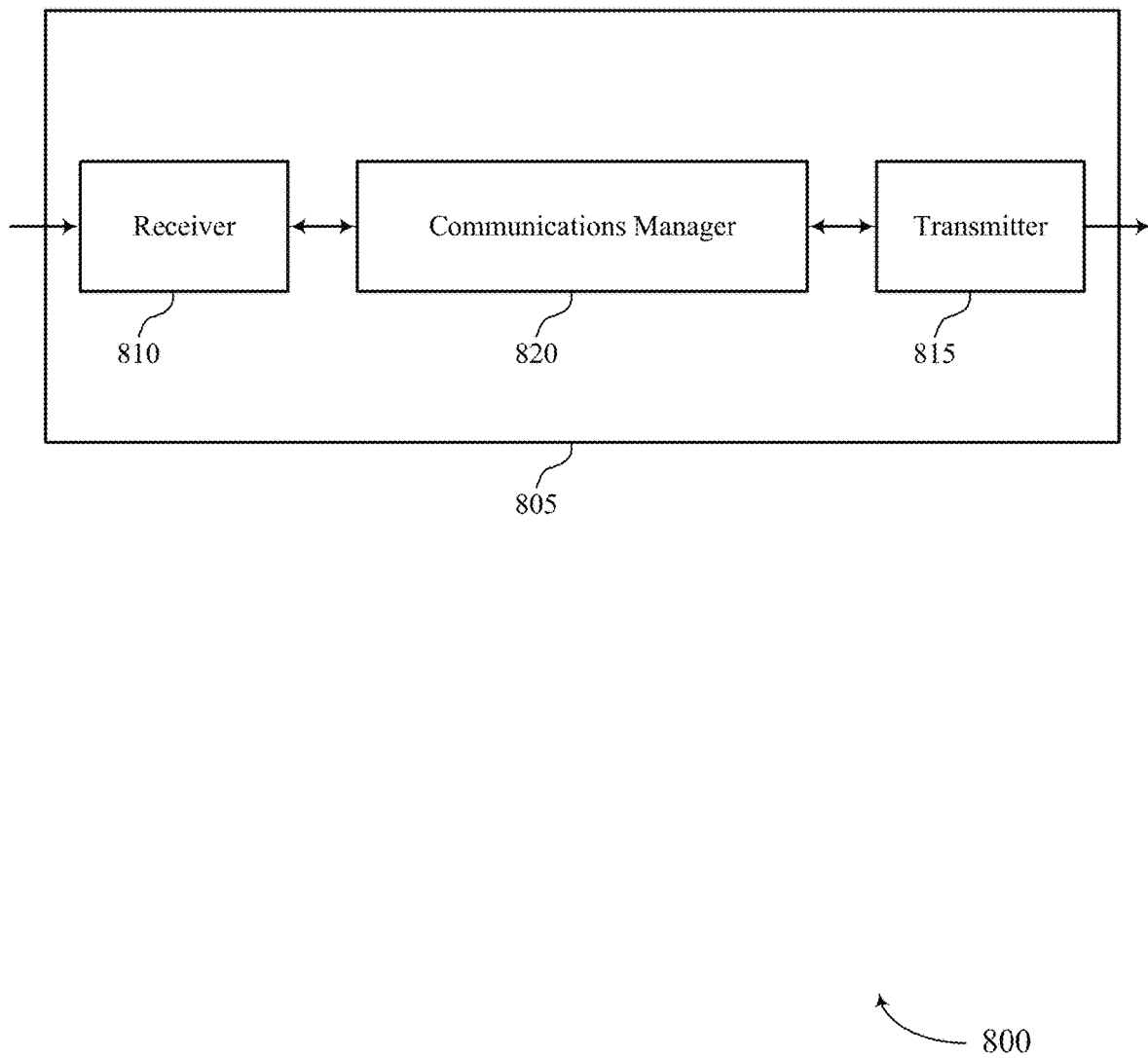
FIGS. 8 and 9 show block diagrams of devices that support soft AP and p2p operation in accordance with one or more aspects of the present disclosure.

FIG. 8 shows a block diagram 800 of a device 805 that supports soft AP and p2p operation in accordance with one or more aspects of the present disclosure. The device 805 may be an example of aspects of an AP as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to soft AP and p2p operation). Information may be passed on to other components of the device 805. The receiver 810 may utilize a single antenna or a set of multiple antennas.

The transmitter 815 may provide a means for transmitting signals generated by other components of the device 805. The transmitter 815 may utilize a single antenna or a set of multiple antennas.

The communications manager 820, the receiver 810, the transmitter 815, or various combinations thereof or various components thereof may be examples of means for performing various aspects of soft AP and p2p operation as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a digital signal processor (DSP), a CPU, an ASIC, a field programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications at a first MLD in accordance with examples as disclosed herein. For example, the communications manager 820 may be configured as or otherwise support a means for establishing communications according to an MLO for a WLAN including the first MLD operating in an AP role and one or more second MLDs, where the MLO includes a first radio frequency link for control communications and a second radio frequency link for data communications. The communications manager 820 may be configured as or otherwise support a means for transmitting, via the first radio frequency link, a message including information associated with a transfer of the AP role from the first MLD to a second MLD of the one or more second MLDs.

Additionally, or alternatively, the communications manager 820 may support wireless communications at a first MLD in accordance with examples as disclosed herein. For example, the communications manager 820 may be configured as or otherwise support a means for establishing communications according to an MLO for a WLAN including the first MLD operating in an AP role, a second MLD, and a third MLD, where the MLO includes a first radio frequency link for control communications and a second radio frequency link for data communications. The communications manager 820 may be configured as or otherwise support a means for transmitting, via the first radio frequency link to the second MLD and to the third MLD, control information scheduling one or more service periods for p2p communications via the second radio frequency link between the second MLD and the third MLD.

By including or configuring the communications manager 820 in accordance with examples as described herein, the device 805 (e.g., a processor controlling or otherwise coupled with the receiver 810, the transmitter 815, the communications manager 820, or a combination thereof) may support techniques for reduced processing, reduced power consumption, and more efficient utilization of communication resources.

Figure 9:
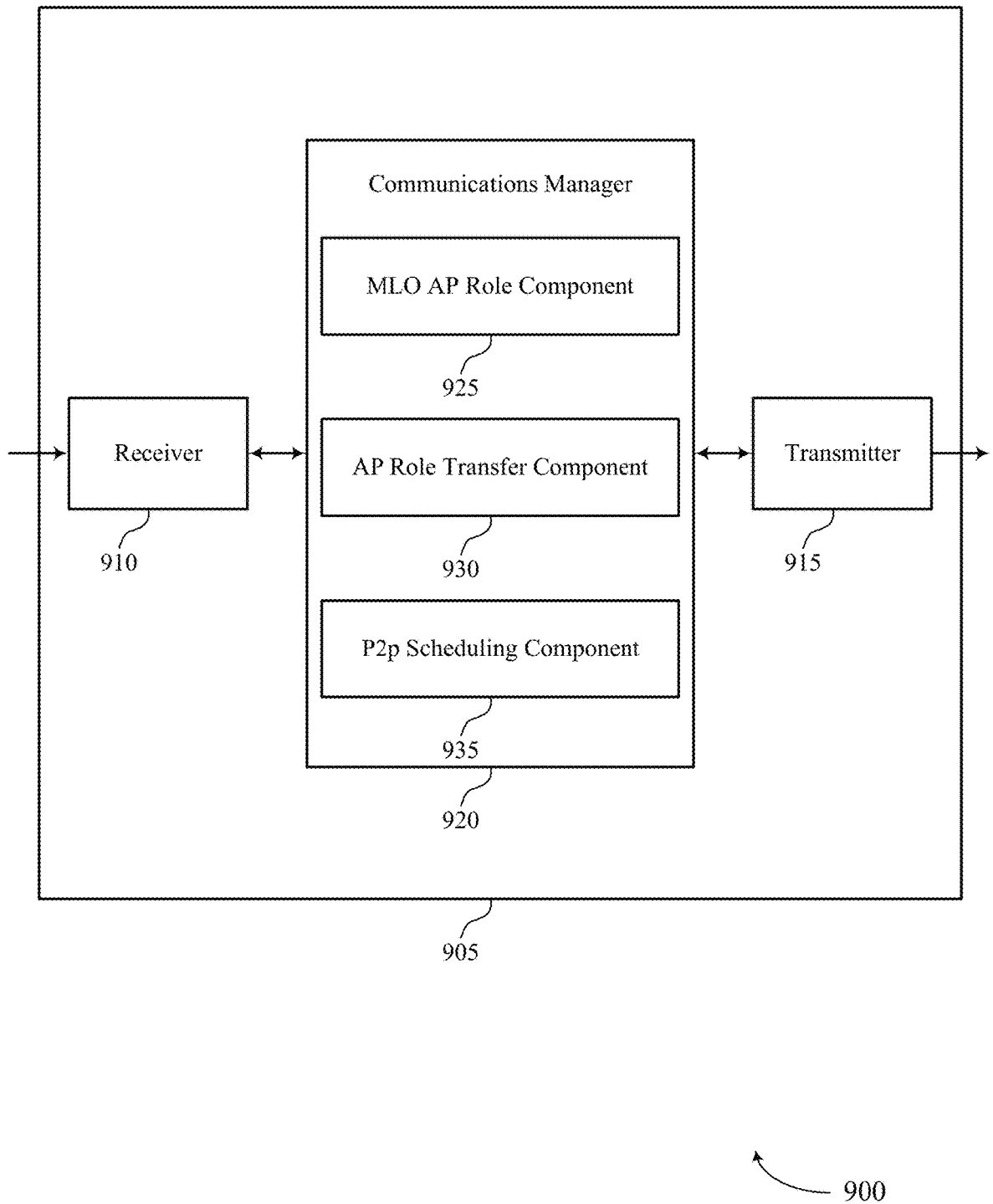

FIG. 9 shows a block diagram 900 of a device 905 that supports soft AP and p2p operation in accordance with one or more aspects of the present disclosure. The device 905 may be an example of aspects of a device 805 or an AP 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to soft AP and p2p operation). Information may be passed on to other components of the device 905. The receiver 910 may utilize a single antenna or a set of multiple antennas.

The transmitter 915 may provide a means for transmitting signals generated by other components of the device 905. The transmitter 915 may utilize a single antenna or a set of multiple antennas.

The device 905, or various components thereof, may be an example of means for performing various aspects of soft AP and p2p operation as described herein. For example, the communications manager 920 may include an MLO AP role component 925, an AP role transfer component 930, a p2p scheduling component 935, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications at a first MLD in accordance with examples as disclosed herein. The MLO AP role component 925 may be configured as or otherwise support a means for establishing communications according to an MLO for a WLAN including the first MLD operating in an AP role and one or more second MLDs, where the MLO includes a first radio frequency link for control communications and a second radio frequency link for data communications. The AP role transfer component 930 may be configured as or otherwise support a means for transmitting, via the first radio frequency link, a message including information associated with a transfer of the AP role from the first MLD to a second MLD of the one or more second MLDs.

Additionally, or alternatively, the communications manager 920 may support wireless communications at a first MLD in accordance with examples as disclosed herein. The MLO AP role component 925 may be configured as or otherwise support a means for establishing communications according to an MLO for a WLAN including the first MLD operating in an AP role, a second MLD, and a third MLD, where the MLO includes a first radio frequency link for control communications and a second radio frequency link for data communications. The p2p scheduling component 935 may be configured as or otherwise support a means for transmitting, via the first radio frequency link to the second MLD and to the third MLD, control information scheduling one or more service periods for p2p communications via the second radio frequency link between the second MLD and the third MLD.

Figure 10:
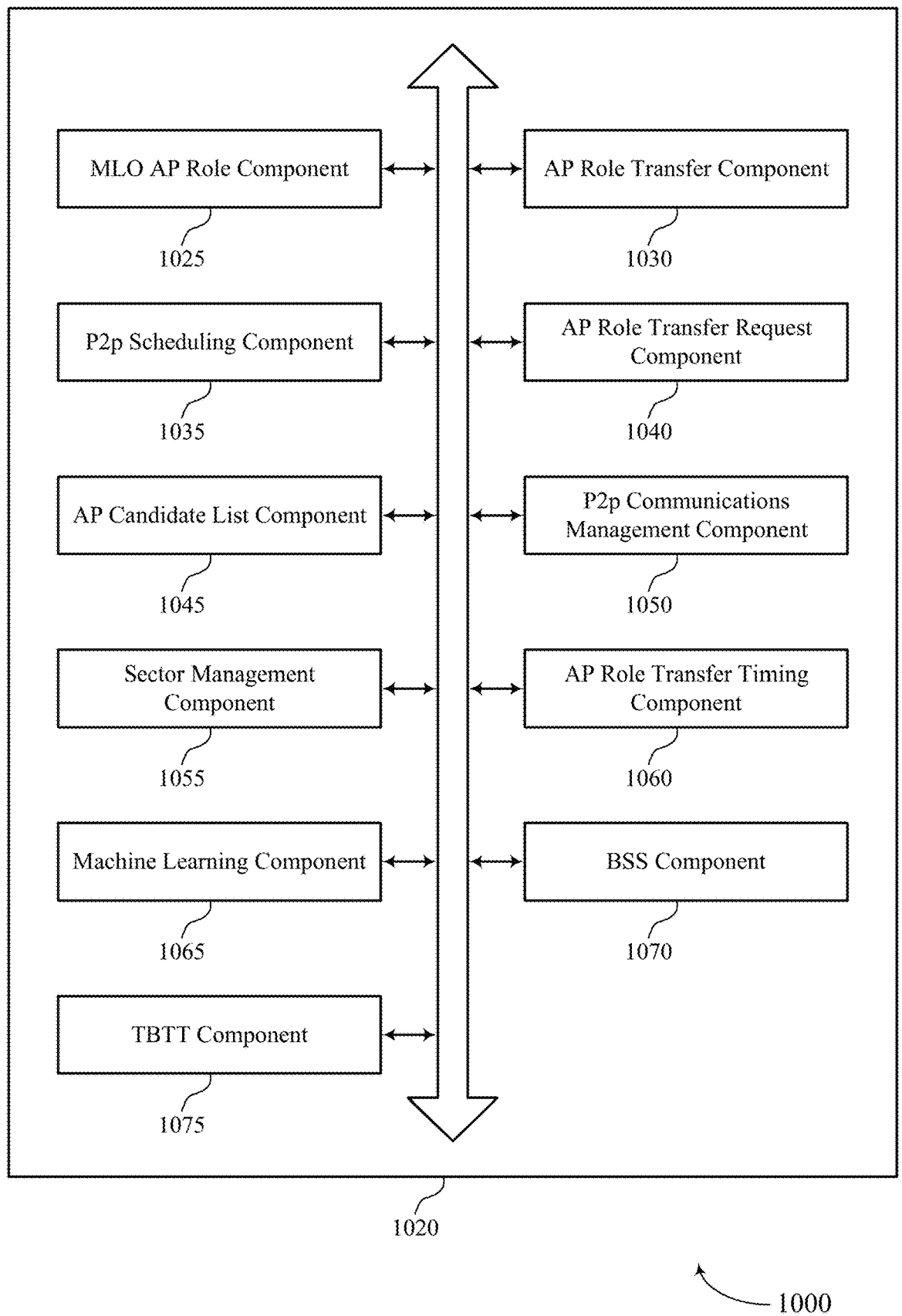
FIG. 10 shows a block diagram of a communications manager that supports soft AP and p2p operation in accordance with one or more aspects of the present disclosure.

FIG. 10 shows a block diagram 1000 of a communications manager 1020 that supports soft AP and p2p operation in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of soft AP and p2p operation as described herein. For example, the communications manager 1020 may include an MLO AP role component 1025, an AP role transfer component 1030, a p2p scheduling component 1035, an AP role transfer request component 1040, an AP candidate list component 1045, a p2p communications management component 1050, a sector management component 1055, an AP role transfer timing component 1060, a machine learning component 1065, an BSS component 1070, a TBTT component 1075, or any combination thereof. Each of these components may communicate, directly or indirectly, with one another (e.g., via one or more buses).

The communications manager 1020 may support wireless communications at a first MLD in accordance with examples as disclosed herein. The MLO AP role component 1025 may be configured as or otherwise support a means for establishing communications according to an MLO for a WLAN including the first MLD operating in an AP role and one or more second MLDs, where the MLO includes a first radio frequency link for control communications and a second radio frequency link for data communications. The AP role transfer component 1030 may be configured as or otherwise support a means for transmitting, via the first radio frequency link, a message including information associated with a transfer of the AP role from the first MLD to a second MLD of the one or more second MLDs.

In some examples, the AP role transfer request component 1040 may be configured as or otherwise support a means for receiving, from the second MLD of the one or more second MLDs and via the first radio frequency link, a request to transfer the AP role to the second MLD of the one or more second MLDs, where the message includes a confirmation transmitted to the second MLD of the one or more second MLDs in response to the request.

In some examples, the AP role transfer timing component 1060 may be configured as or otherwise support a means for transmitting, via the first radio frequency link, a management frame indicating a timing for the transfer of the AP role from the first MLD to the second MLD of the one or more second MLDs.

In some examples, the BSS component 1070 may be configured as or otherwise support a means for transmitting, to the second MLD of the one or more second MLDs via the first radio frequency link, an indication of a BSS context associated with the AP role in response to the request, the BSS context including at least one operational parameter of a BSS and a set of service periods associated with data communications via the second radio frequency link for the one or more second MLDs.

In some examples, the timing includes a countdown period between transmission of the message and a target beacon transmission time associated with the transfer of the AP role from the first MLD to the second MLD of the one or more second MLDs, the countdown period including a set of multiple delivery traffic indication message periods on the first radio frequency link.

In some examples, to support transmitting the message, the AP candidate list component 1045 may be configured as or otherwise support a means for transmitting an indication of a candidate list of MLDs of the one or more second MLDs capable of operating in the AP role, where the candidate list of MLDs includes the second MLD of the one or more second MLDs.

In some examples, to support transmitting the message, the AP role transfer timing component 1060 may be configured as or otherwise support a means for transmitting an indication of a timing for the transfer of the AP role from the first MLD to the second MLD of the one or more second MLDs.

In some examples, the AP role transfer timing component 1060 may be configured as or otherwise support a means for receiving, from the second MLD of the one or more second MLDs via the first radio frequency link, a second message including an indication of an updated timing for the transfer of the AP role. In some examples, the AP role transfer timing component 1060 may be configured as or otherwise support a means for transmitting, via the first radio frequency link and in response to the second message, a third message indicating the updated timing for the transfer of the AP role.

In some examples, to support transmitting the indication of the timing, the AP role transfer timing component 1060 may be configured as or otherwise support a means for transmitting an indication of a countdown period set to a reserved value.

In some examples, to support transmitting the indication of the timing, the TBTT component 1075 may be configured as or otherwise support a means for transmitting an indication of a target beacon transmission time in the second radio frequency link, the target beacon transmission time associated with the transfer of the AP role from the first MLD to the second MLD of the one or more second MLDs.

In some examples, to support transmitting the message, the BSS component 1070 may be configured as or otherwise support a means for transmitting an indication of a BSS context associated with the AP role, the BSS context including at least one operational parameter of a BSS and a set of service periods associated with data communications via the second radio frequency link for the one or more second MLDs.

In some examples, the AP candidate list component 1045 may be configured as or otherwise support a means for receiving, via the first radio frequency link from a third MLD of the one or more second MLDs included in the candidate list of MLDs, an indication to remove the third MLD from the candidate list of MLDs. In some examples, the AP candidate list component 1045 may be configured as or otherwise support a means for transmitting a second message including an indication of an updated candidate list of MLDs without the third MLD.

In some examples, the transfer of the AP role includes a transfer of the AP role in the second radio frequency link.

Additionally, or alternatively, the communications manager 1020 may support wireless communications at a first MLD in accordance with examples as disclosed herein. In some examples, the MLO AP role component 1025 may be configured as or otherwise support a means for establishing communications according to an MLO for a WLAN including the first MLD operating in an AP role, a second MLD, and a third MLD, where the MLO includes a first radio frequency link for control communications and a second radio frequency link for data communications. The p2p scheduling component 1035 may be configured as or otherwise support a means for transmitting, via the first radio frequency link to the second MLD and to the third MLD, control information scheduling one or more service periods for p2p communications via the second radio frequency link between the second MLD and the third MLD.

In some examples, the p2p communications management component 1050 may be configured as or otherwise support a means for receiving, from the second MLD via the first radio frequency link, a report indicating a buffer status for the p2p communications via the second radio frequency link between the second MLD and the third MLD, where the one or more service periods are determined based on the report.

In some examples, to support receiving the report, the p2p communications management component 1050 may be configured as or otherwise support a means for receiving an indication of a bandwidth time product and a link identifier associated with the p2p communications via the second radio frequency link between the second MLD and the third MLD, and where the first MLD determines a duration of the one or more service periods based on the bandwidth time product and a link identifier.

In some examples, the p2p scheduling component 1035 may be configured as or otherwise support a means for transmitting, via the first radio frequency link to the second MLD and the third MLD, second control information scheduling one or more second service periods for second p2p communications via the second radio frequency link associated with a fourth MLD, where the one or more second service periods do not overlap in time with the one or more service periods.

In some examples, the p2p scheduling component 1035 may be configured as or otherwise support a means for transmitting, via the first radio frequency link to the second MLD and the third MLD, second control information scheduling one or more second service periods for second p2p communications via the second radio frequency link associated with a fourth MLD, where the one or more second service periods overlap in time with the one or more service periods, and where the one or more second service periods are associated with a first beam orthogonal with a second beam associated with the one or more service periods.

In some examples, the machine learning component 1065 may be configured as or otherwise support a means for determining, via a machine learning process, that the first beam is orthogonal with the second beam, and where transmitting the control information and the second control information is based on the determining.

In some examples, the sector management component 1055 may be configured as or otherwise support a means for identifying a first sector associated with the second MLD and a second sector associated with the third MLD. In some examples, the sector management component 1055 may be configured as or otherwise support a means for transmitting, to the second MLD and the third MLD via the first radio frequency link, second control information indicating the first sector and the second sector.

Figure 11:
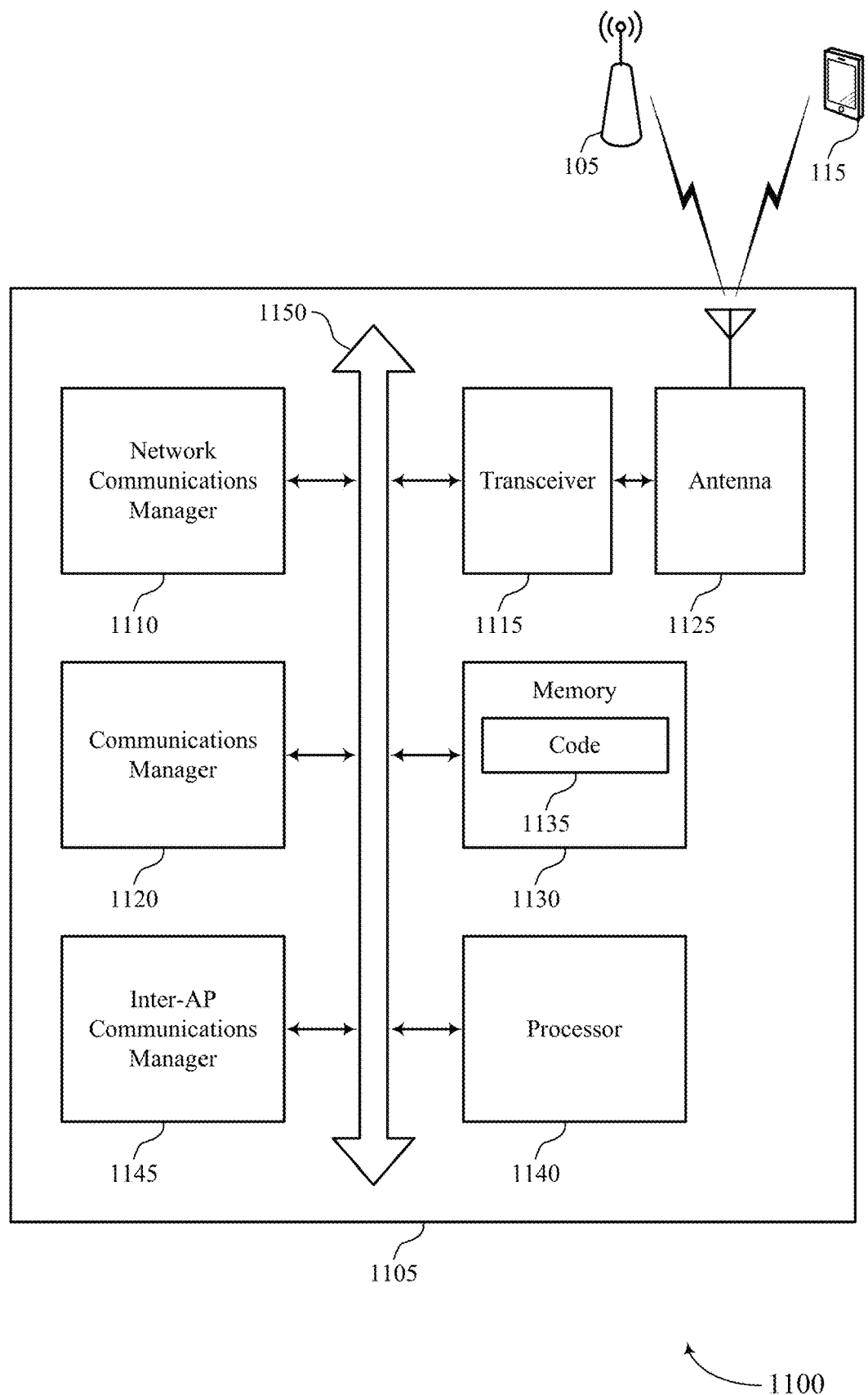
FIG. 11 shows a diagram of a system including a device that supports soft AP and p2p operation in accordance with one or more aspects of the present disclosure.

FIG. 11 shows a diagram of a system 1100 including a device 1105 that supports soft AP and p2p operation in accordance with one or more aspects of the present disclosure. The device 1105 may be an example of or include the components of a device 805, a device 905, or an AP as described herein. The device 1105 may include components for bi-directional voice and data communications including components for transmitting and receiving communications, such as a communications manager 1120, a network communications manager 1110, a transceiver 1115, an antenna 1125, a memory 1130, code 1135, a processor 1140, and an inter-AP communications manager 1145. These components may be in electronic communication or otherwise coupled (e.g., operatively, communicatively, functionally, electronically, electrically) via one or more buses (e.g., a bus 1150).

The network communications manager 1110 may manage communications with a core network (e.g., via one or more wired backhaul links). For example, the network communications manager 1110 may manage the transfer of data communications for client devices, such as one or more STAs 115.

In some cases, the device 1105 may include a single antenna 1125. However, in some other cases the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets and provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include random access memory (RAM) and read only memory (ROM). The memory 1130 may store computer-readable, computer-executable code 1135 including instructions that, when executed by the processor 1140, cause the device 1105 to perform various functions described herein. In some cases, the memory 1130 may contain, among other things, a basic I/O system (BIOS) which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting soft AP and p2p operation). For example, the device 1105 or a component of the device 1105 may include a processor 1140 and memory 1130 coupled with or to the processor 1140, the processor 1140 and memory 1130 configured to perform various functions described herein.

The inter-station communications manager 1145 may manage communications with other APs 105, and may include a controller or scheduler for controlling communications with STAs 115 in cooperation with other APs 105. For example, the inter-station communications manager 1145 may coordinate scheduling for transmissions to APs 105 for various interference mitigation techniques such as beamforming or joint transmission. In some examples, the inter-station communications manager 1145 may provide an X2 interface within an LTE/LTE-A wireless communication network technology to provide communication between APs 105.

The communications manager 1120 may support wireless communications at a first MLD in accordance with examples as disclosed herein. For example, the communications manager 1120 may be configured as or otherwise support a means for establishing communications according to an MLO for a WLAN including the first MLD operating in an AP role and one or more second MLDs, where the MLO includes a first radio frequency link for control communications and a second radio frequency link for data communications. The communications manager 1120 may be configured as or otherwise support a means for transmitting, via the first radio frequency link, a message including information associated with a transfer of the AP role from the first MLD to a second MLD of the one or more second MLDs.

Additionally, or alternatively, the communications manager 1120 may support wireless communications at a first MLD in accordance with examples as disclosed herein. For example, the communications manager 1120 may be configured as or otherwise support a means for establishing communications according to an MLO for a WLAN including the first MLD operating in an AP role, a second MLD, and a third MLD, where the MLO includes a first radio frequency link for control communications and a second radio frequency link for data communications. The communications manager 1120 may be configured as or otherwise support a means for transmitting, via the first radio frequency link to the second MLD and to the third MLD, control information scheduling one or more service periods for p2p communications via the second radio frequency link between the second MLD and the third MLD.

By including or configuring the communications manager 1120 in accordance with examples as described herein, the device 1105 may support techniques for improved communication reliability, reduced latency, improved user experience related to reduced processing, reduced power consumption, more efficient utilization of communication resources, and improved coordination between devices.

Figure 12:
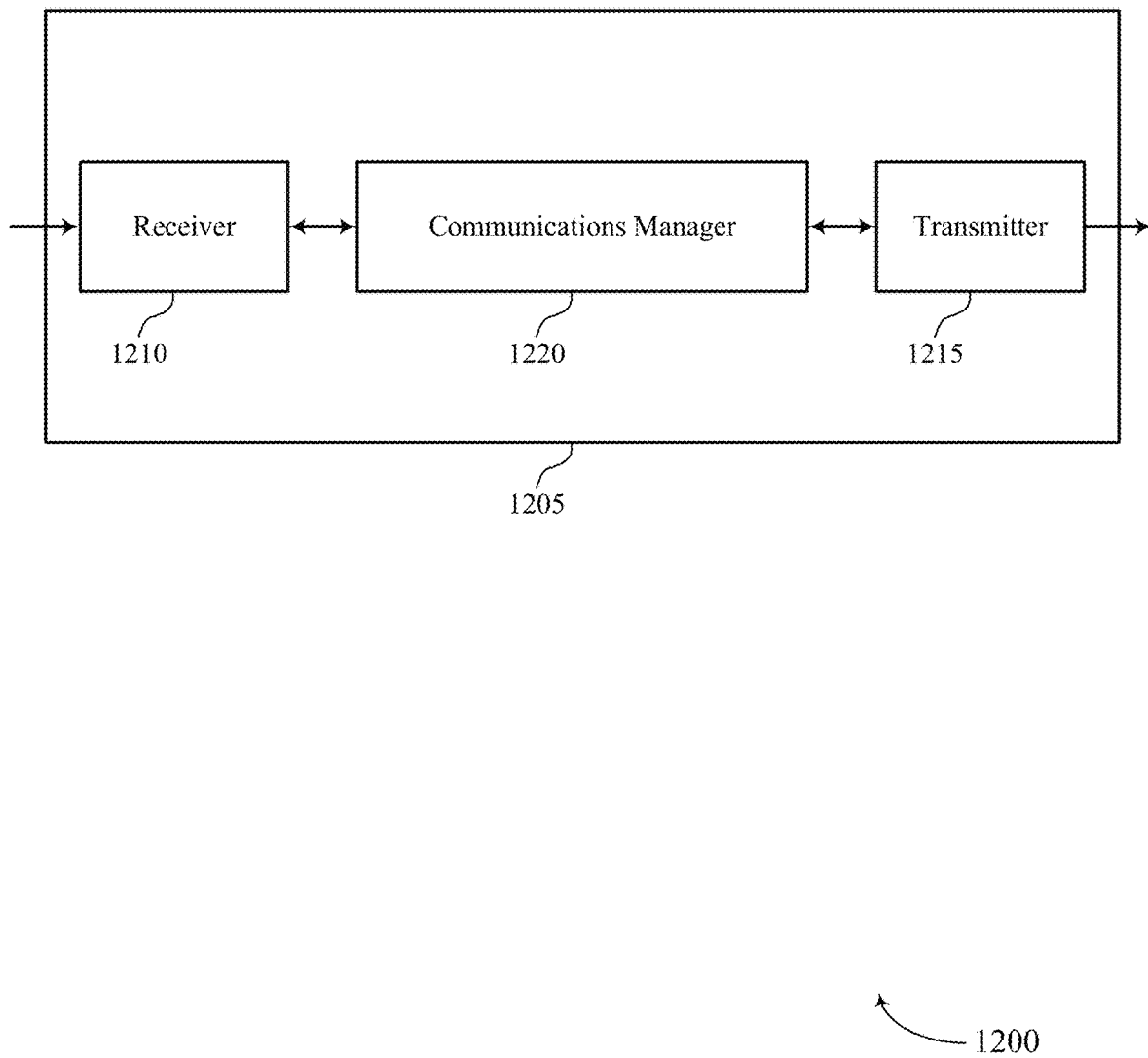
FIGS. 12 and 13 show block diagrams of devices that support soft AP and p2p operation in accordance with one or more aspects of the present disclosure.

FIG. 12 shows a block diagram 1200 of a device 1205 that supports soft AP and p2p operation in accordance with one or more aspects of the present disclosure. The device 1205 may be an example of aspects of an STA as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to soft AP and p2p operation). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to soft AP and p2p operation). In some examples, the transmitter 1215 may be co-located with a receiver 1210 in a transceiver module. The transmitter 1215 may utilize a single antenna or a set of multiple antennas.

The communications manager 1220, the receiver 1210, the transmitter 1215, or various combinations thereof or various components thereof may be examples of means for performing various aspects of soft AP and p2p operation as described herein. For example, the communications manager 1220, the receiver 1210, the transmitter 1215, or various combinations or components thereof may support a method for performing one or more of the functions described herein.

In some examples, the communications manager 1220, the receiver 1210, the transmitter 1215, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1220, the receiver 1210, the transmitter 1215, or various combinations or components thereof may be implemented in code (e.g., as communications management software or firmware) executed by a processor. If implemented in code executed by a processor, the functions of the communications manager 1220, the receiver 1210, the transmitter 1215, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1220 may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communications at a first MLD in accordance with examples as disclosed herein. For example, the communications manager 1220 may be configured as or otherwise support a means for establishing communications according to an MLO for a WLAN including the first MLD operating in an AP role and one or more second MLDs, where the MLO includes a first radio frequency link for control communications and a second radio frequency link for data communications. The communications manager 1220 may be configured as or otherwise support a means for transmitting, via the first radio frequency link, a message including information associated with a transfer of the AP role from the first MLD to a second MLD of the one or more second MLDs.

Additionally, or alternatively, the communications manager 1220 may support wireless communications at a second MLD in accordance with examples as disclosed herein. For example, the communications manager 1220 may be configured as or otherwise support a means for establishing communications according to an MLO for a WLAN including a first MLD operating in an AP role, the second MLD, and one or more third MLDs, the MLO including a first radio frequency link for control communications and a second radio frequency link for data communications. The communications manager 1220 may be configured as or otherwise support a means for receiving, from the first MLD via the first radio frequency link, a message including information associated with a transfer of the AP role from the first MLD to the second MLD or to one of the one or more third MLDs.

Additionally, or alternatively, the communications manager 1220 may support wireless communications at a first MLD in accordance with examples as disclosed herein. For example, the communications manager 1220 may be configured as or otherwise support a means for establishing communications according to an MLO for a WLAN including the first MLD operating in an AP role, a second MLD, and a third MLD, where the MLO includes a first radio frequency link for control communications and a second radio frequency link for data communications. The communications manager 1220 may be configured as or otherwise support a means for transmitting, via the first radio frequency link to the second MLD and to the third MLD, control information scheduling one or more service periods for p2p communications via the second radio frequency link between the second MLD and the third MLD.

Additionally, or alternatively, the communications manager 1220 may support wireless communications at a second MLD in accordance with examples as disclosed herein. For example, the communications manager 1220 may be configured as or otherwise support a means for establishing communications according to an MLO for a WLAN including a first MLD operating in an AP role, the second MLD, and a third MLD, where the MLO includes a first radio frequency link for control communications and a second radio frequency link for data communications. The communications manager 1220 may be configured as or otherwise support a means for receiving, via the first radio frequency link from the first MLD, control information scheduling one or more service periods for p2p communications via the second radio frequency link between the second MLD and the third MLD.

By including or configuring the communications manager 1220 in accordance with examples as described herein, the device 1205 (e.g., a processor controlling or otherwise coupled with the receiver 1210, the transmitter 1215, the communications manager 1220, or a combination thereof) may support techniques for reduced processing, reduced power consumption, and more efficient utilization of communication resources.

Figure 13:
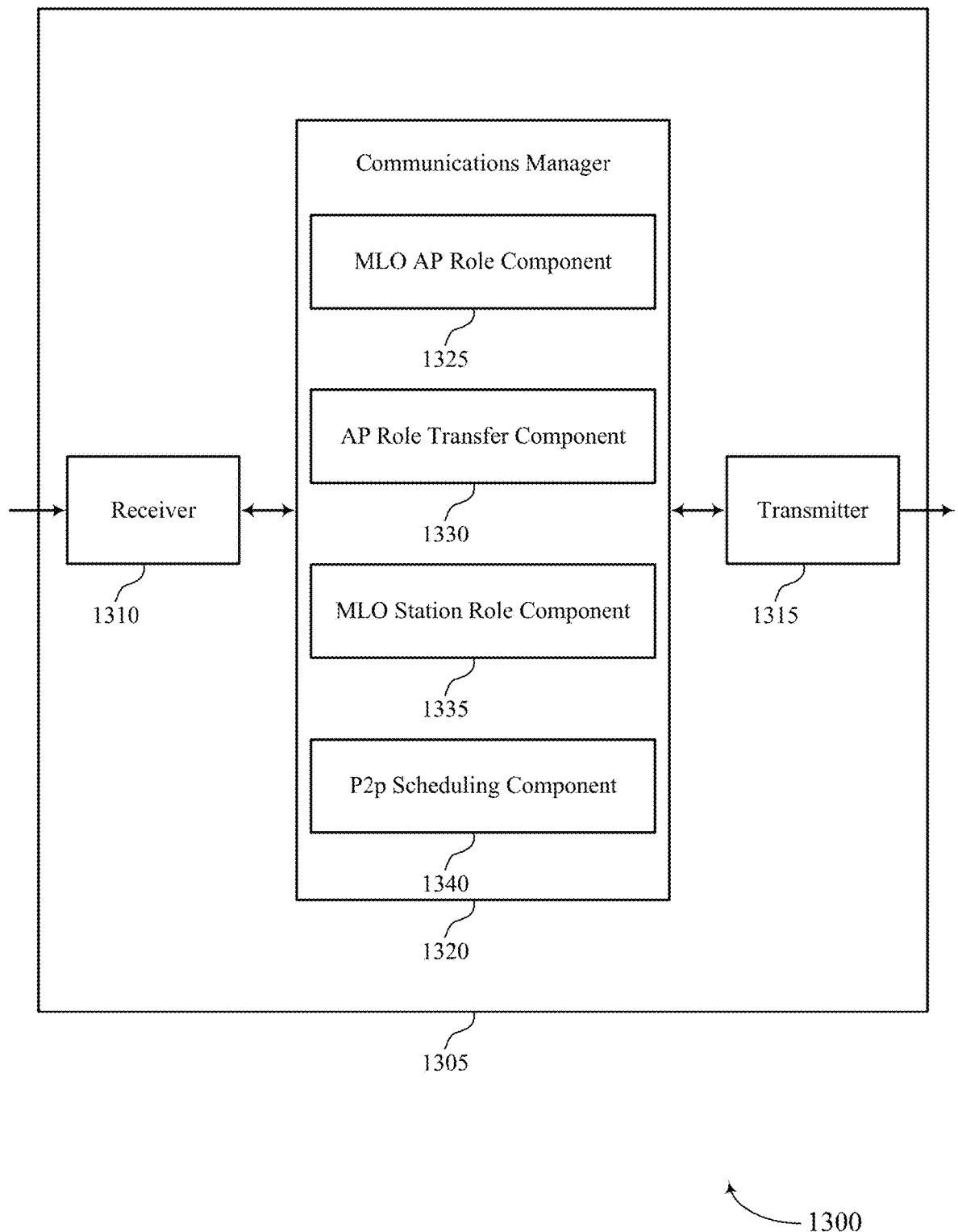

FIG. 13 shows a block diagram 1300 of a device 1305 that supports soft AP and p2p operation in accordance with one or more aspects of the present disclosure. The device 1305 may be an example of aspects of a device 1205 or an STA 115 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for receiving information such as packets, user data, control information, or any combination thereof associated with various information channels (e.g., control channels, data channels, information channels related to soft AP and p2p operation). Information may be passed on to other components of the device 1305. The receiver 1310 may utilize a single antenna or a set of multiple antennas.

The transmitter 1315 may provide a means for transmitting signals generated by other components of the device 1305. For example, the transmitter 1315 may transmit information such as packets, user data, control information, or any combination thereof associated with various information channels (e.g., control channels, data channels, information channels related to soft AP and p2p operation). In some examples, the transmitter 1315 may be co-located with a receiver 1310 in a transceiver module. The transmitter 1315 may utilize a single antenna or a set of multiple antennas.

The device 1305, or various components thereof, may be an example of means for performing various aspects of soft AP and p2p operation as described herein. For example, the communications manager 1320 may include an MLO AP role component 1325, an AP role transfer component 1330, an MLO station role component 1335, a p2p scheduling component 1340, or any combination thereof. The communications manager 1320 may be an example of aspects of a communications manager 1220 as described herein. In some examples, the communications manager 1320, or various components thereof, may be configured to perform various operations (e.g., receiving, obtaining, monitoring, outputting, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to obtain information, output information, or perform various other operations as described herein.

The communications manager 1320 may support wireless communications at a first MLD in accordance with examples as disclosed herein. The MLO AP role component 1325 may be configured as or otherwise support a means for establishing communications according to an MLO for a WLAN including the first MLD operating in an AP role and one or more second MLDs, where the MLO includes a first radio frequency link for control communications and a second radio frequency link for data communications. The AP role transfer component 1330 may be configured as or otherwise support a means for transmitting, via the first radio frequency link, a message including information associated with a transfer of the AP role from the first MLD to a second MLD of the one or more second MLDs.

Additionally, or alternatively, the communications manager 1320 may support wireless communications at a second MLD in accordance with examples as disclosed herein. The MLO station role component 1335 may be configured as or otherwise support a means for establishing communications according to an MLO for a WLAN including a first MLD operating in an AP role, the second MLD, and one or more third MLDs, the MLO including a first radio frequency link for control communications and a second radio frequency link for data communications. The AP role transfer component 1330 may be configured as or otherwise support a means for receiving, from the first MLD via the first radio frequency link, a message including information associated with a transfer of the AP role from the first MLD to the second MLD or to one of the one or more third MLDs.

Additionally, or alternatively, the communications manager 1320 may support wireless communications at a first MLD in accordance with examples as disclosed herein. The MLO AP role component 1325 may be configured as or otherwise support a means for establishing communications according to an MLO for a WLAN including the first MLD operating in an AP role, a second MLD, and a third MLD, where the MLO includes a first radio frequency link for control communications and a second radio frequency link for data communications. The p2p scheduling component 1340 may be configured as or otherwise support a means for transmitting, via the first radio frequency link to the second MLD and to the third MLD, control information scheduling one or more service periods for p2p communications via the second radio frequency link between the second MLD and the third MLD.

Additionally, or alternatively, the communications manager 1320 may support wireless communications at a second MLD in accordance with examples as disclosed herein. The MLO station role component 1335 may be configured as or otherwise support a means for establishing communications according to an MLO for a WLAN including a first MLD operating in an AP role, the second MLD, and a third MLD, where the MLO includes a first radio frequency link for control communications and a second radio frequency link for data communications. The p2p scheduling component 1340 may be configured as or otherwise support a means for receiving, via the first radio frequency link from the first MLD, control information scheduling one or more service periods for p2p communications via the second radio frequency link between the second MLD and the third MLD.

Figure 14:
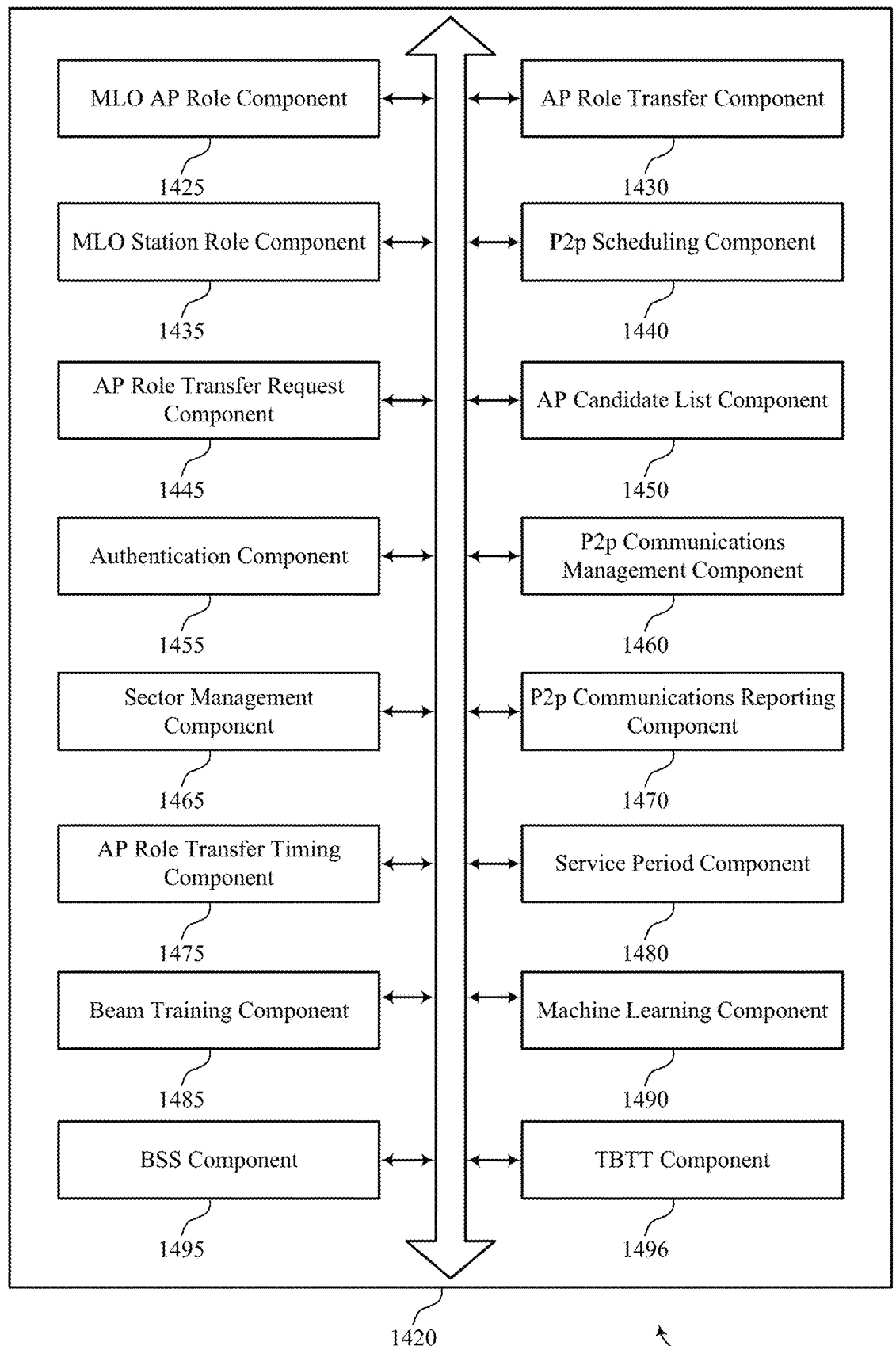
FIG. 14 shows a block diagram of a communications manager that supports soft AP and p2p operation in accordance with one or more aspects of the present disclosure.

FIG. 14 shows a block diagram 1400 of a communications manager 1420 that supports soft AP and p2p operation in accordance with one or more aspects of the present disclosure. The communications manager 1420 may be an example of aspects of a communications manager 1220, a communications manager 1320, or both, as described herein. The communications manager 1420, or various components thereof, may be an example of means for performing various aspects of soft AP and p2p operation as described herein. For example, the communications manager 1420 may include an MLO AP role component 1425, an AP role transfer component 1430, an MLO station role component 1435, a p2p scheduling component 1440, an AP role transfer request component 1445, an AP candidate list component 1450, an authentication component 1455, a p2p communications management component 1460, a sector management component 1465, a p2p communications reporting component 1470, an AP role transfer timing component 1475, a service period component 1480, a beam training component 1485, a machine learning component 1490, an BSS component 1495, a TBTT component 1496, or any combination thereof. Each of these components may communicate, directly or indirectly, with one another (e.g., via one or more buses).

The communications manager 1420 may support wireless communications at a first MLD in accordance with examples as disclosed herein. The MLO AP role component 1425 may be configured as or otherwise support a means for establishing communications according to an MLO for a WLAN including the first MLD operating in an AP role and one or more second MLDs, where the MLO includes a first radio frequency link for control communications and a second radio frequency link for data communications. The AP role transfer component 1430 may be configured as or otherwise support a means for transmitting, via the first radio frequency link, a message including information associated with a transfer of the AP role from the first MLD to a second MLD of the one or more second MLDs.

In some examples, the AP role transfer request component 1445 may be configured as or otherwise support a means for receiving, from the second MLD of the one or more second MLDs and via the first radio frequency link, a request to transfer the AP role to the second MLD of the one or more second MLDs, where the message includes a confirmation transmitted to the second MLD of the one or more second MLDs in response to the request.

In some examples, the AP role transfer timing component 1475 may be configured as or otherwise support a means for transmitting, via the first radio frequency link, a management frame indicating a timing for the transfer of the AP role from the first MLD to the second MLD of the one or more second MLDs.

In some examples, the BSS component 1495 may be configured as or otherwise support a means for transmitting, to the second MLD of the one or more second MLDs via the first radio frequency link, an indication of a BSS context associated with the AP role in response to the request, the BSS context including at least one operational parameter of a BSS and a set of service periods associated with data communications via the second radio frequency link for the one or more second MLDs.

In some examples, the timing includes a countdown period between transmission of the message and a target beacon transmission time associated with the transfer of the AP role from the first MLD to the second MLD of the one or more second MLDs, the countdown period including a set of multiple delivery traffic indication message periods on the first radio frequency link.

In some examples, to support transmitting the message, the AP candidate list component 1450 may be configured as or otherwise support a means for transmitting an indication of a candidate list of MLDs of the one or more second MLDs capable of operating in the AP role, where the candidate list of MLDs includes the second MLD of the one or more second MLDs.

In some examples, to support transmitting the message, the AP role transfer timing component 1475 may be configured as or otherwise support a means for transmitting an indication of a timing for the transfer of the AP role from the first MLD to the second MLD of the one or more second MLDs.

In some examples, the AP role transfer timing component 1475 may be configured as or otherwise support a means for receiving, from the second MLD of the one or more second MLDs via the first radio frequency link, a second message including an indication of an updated timing for the transfer of the AP role. In some examples, the AP role transfer timing component 1475 may be configured as or otherwise support a means for transmitting, via the first radio frequency link and in response to the second message, a third message indicating the updated timing for the transfer of the AP role.

In some examples, to support transmitting the indication of the timing, the AP role transfer timing component 1475 may be configured as or otherwise support a means for transmitting an indication of a countdown period set to a reserved value.

In some examples, to support transmitting the indication of the timing, the TBTT component 1496 may be configured as or otherwise support a means for transmitting an indication of a target beacon transmission time in the second radio frequency link, the target beacon transmission time associated with the transfer of the AP role from the first MLD to the second MLD of the one or more second MLDs.

In some examples, to support transmitting the message, the BSS component 1495 may be configured as or otherwise support a means for transmitting an indication of a BSS context associated with the AP role, the BSS context including at least one operational parameter of a BSS and a set of service periods associated with data communications via the second radio frequency link for the one or more second MLDs.

In some examples, the AP candidate list component 1450 may be configured as or otherwise support a means for receiving, via the first radio frequency link from a third MLD of the one or more second MLDs included in the candidate list of MLDs, an indication to remove the third MLD from the candidate list of MLDs. In some examples, the AP candidate list component 1450 may be configured as or otherwise support a means for transmitting a second message including an indication of an updated candidate list of MLDs without the third MLD.

In some examples, the transfer of the AP role includes a transfer of the AP role in the second radio frequency link.

Additionally, or alternatively, the communications manager 1420 may support wireless communications at a second MLD in accordance with examples as disclosed herein. The MLO station role component 1435 may be configured as or otherwise support a means for establishing communications according to an MLO for a WLAN including a first MLD operating in an AP role, the second MLD, and one or more third MLDs, the MLO including a first radio frequency link for control communications and a second radio frequency link for data communications. In some examples, the AP role transfer component 1430 may be configured as or otherwise support a means for receiving, from the first MLD via the first radio frequency link, a message including information associated with a transfer of the AP role from the first MLD to the second MLD or to one of the one or more third MLDs.

In some examples, the authentication component 1455 may be configured as or otherwise support a means for receiving, from the one or more third MLDs via the first radio frequency link, one or more respective authentication messages.

In some examples, the MLO AP role component 1425 may be configured as or otherwise support a means for communicating, according to the MLO and in the AP role, with the one or more third MLDs.

In some examples, the MLO AP role component 1425 may be configured as or otherwise support a means for transmitting, via the first radio frequency link, a management frame for the second radio frequency link.

In some examples, the service period component 1480 may be configured as or otherwise support a means for transmitting, to the one or more third MLDs via the first radio frequency link, an indication of service periods for data communications via the second radio frequency link.

In some examples, the beam training component 1485 may be configured as or otherwise support a means for performing a beam training procedure with the one or more third MLDs for data communications via the second radio frequency link.

In some examples, the AP role transfer request component 1445 may be configured as or otherwise support a means for transmitting, to the first MLD via the first radio frequency link, a request to transfer the AP role to the second MLD, where the message includes a confirmation received in response to the request.

In some examples, the AP role transfer timing component 1475 may be configured as or otherwise support a means for receiving, from the first MLD via the first radio frequency link, a management frame indicating a timing for the transfer of the AP role from the first MLD to the second MLD.

In some examples, the BSS component 1495 may be configured as or otherwise support a means for receiving, from the first MLD via the first radio frequency link, an indication of a BSS context associated with the AP role in response to the request, the basic service set context including at least one operational parameter of a BSS and a set of service periods associated with data communications via the second radio frequency link for the one or more third MLDs.

In some examples, the timing includes a countdown period between transmission of the message and a target beacon transmission time associated with the transfer of the AP role from the first MLD to the second MLD, the countdown period including a set of multiple delivery traffic indication message periods on the first radio frequency link.

In some examples, to support receiving the message, the AP candidate list component 1450 may be configured as or otherwise support a means for receiving an indication of a candidate list of MLDs capable of operating in the AP role, where the candidate list of MLDs includes the second MLD.

In some examples, to support receiving the message, the AP role transfer timing component 1475 may be configured as or otherwise support a means for receiving an indication of a timing for the transfer of the AP role from the first MLD to the second MLD or to one of the one or more third MLDs.

In some examples, the AP role transfer timing component 1475 may be configured as or otherwise support a means for transmitting, to the first MLD via the first radio frequency link, a second message including an indication of an updated timing for the transfer of the AP role. In some examples, the AP role transfer timing component 1475 may be configured as or otherwise support a means for receiving, via the first radio frequency link and in response to the second message, a third message indicating the updated timing for the transfer of the AP role.

In some examples, to support receiving the indication of the timing, the AP role transfer timing component 1475 may be configured as or otherwise support a means for receiving an indication of a countdown period set to a reserved value.

In some examples, to support receiving the indication of the timing, the TBTT component 1496 may be configured as or otherwise support a means for receiving an indication of a target beacon transmission time in the second radio frequency link, the target beacon transmission time associated with the transfer of the AP role from the first MLD to the second MLD or to one of the one or more third MLDs.

In some examples, to support receiving the message, the BSS component 1495 may be configured as or otherwise support a means for receiving an indication of a BSS context associated with the AP role, the BSS context including at least one operational parameter of a BSS and a set of service periods associated with data communications via the second radio frequency link for the second MLD and the one or more third MLDs.

In some examples, the AP candidate list component 1450 may be configured as or otherwise support a means for transmitting, via the first radio frequency link to the first MLD, an indication to remove the second MLD from the candidate list of MLDs. In some examples, the AP candidate list component 1450 may be configured as or otherwise support a means for receiving, from the first MLD via the first radio frequency link, a second message including an indication of an updated candidate list of MLDs without the second MLD.

In some examples, the transfer of the AP role includes a transfer of the AP role in the second radio frequency link.

Additionally, or alternatively, the communications manager 1420 may support wireless communications at a first MLD in accordance with examples as disclosed herein. In some examples, the MLO AP role component 1425 may be configured as or otherwise support a means for establishing communications according to an MLO for a WLAN including the first MLD operating in an AP role, a second MLD, and a third MLD, where the MLO includes a first radio frequency link for control communications and a second radio frequency link for data communications. The p2p scheduling component 1440 may be configured as or otherwise support a means for transmitting, via the first radio frequency link to the second MLD and to the third MLD, control information scheduling one or more service periods for p2p communications via the second radio frequency link between the second MLD and the third MLD.

In some examples, the p2p communications management component 1460 may be configured as or otherwise support a means for receiving, from the second MLD via the first radio frequency link, a report indicating a buffer status for the p2p communications via the second radio frequency link between the second MLD and the third MLD, where the one or more service periods are determined based on the report.

In some examples, to support receiving the report, the p2p communications management component 1460 may be configured as or otherwise support a means for receiving an indication of a bandwidth time product and a link identifier associated with the p2p communications via the second radio frequency link between the second MLD and the third MLD, and where the first MLD determines a duration of the one or more service periods based on the bandwidth time product and a link identifier.

In some examples, the p2p scheduling component 1440 may be configured as or otherwise support a means for transmitting, via the first radio frequency link to the second MLD and the third MLD, second control information scheduling one or more second service periods for second p2p communications via the second radio frequency link associated with a fourth MLD, where the one or more second service periods do not overlap in time with the one or more service periods.

In some examples, the p2p scheduling component 1440 may be configured as or otherwise support a means for transmitting, via the first radio frequency link to the second MLD and the third MLD, second control information scheduling one or more second service periods for second p2p communications via the second radio frequency link associated with a fourth MLD, where the one or more second service periods overlap in time with the one or more service periods, and where the one or more second service periods are associated with a first beam orthogonal with a second beam associated with the one or more service periods.

In some examples, the machine learning component 1490 may be configured as or otherwise support a means for determining, via a machine learning process, that the first beam is orthogonal with the second beam, and where transmitting the control information and the second control information is based on the determining.

In some examples, the sector management component 1465 may be configured as or otherwise support a means for identifying a first sector associated with the second MLD and a second sector associated with the third MLD. In some examples, the sector management component 1465 may be configured as or otherwise support a means for transmitting, to the second MLD and the third MLD via the first radio frequency link, second control information indicating the first sector and the second sector.

Additionally, or alternatively, the communications manager 1420 may support wireless communications at a second MLD in accordance with examples as disclosed herein. In some examples, the MLO station role component 1435 may be configured as or otherwise support a means for establishing communications according to an MLO for a WLAN including a first MLD operating in an AP role, the second MLD, and a third MLD, where the MLO includes a first radio frequency link for control communications and a second radio frequency link for data communications. In some examples, the p2p scheduling component 1440 may be configured as or otherwise support a means for receiving, via the first radio frequency link from the first MLD, control information scheduling one or more service periods for p2p communications via the second radio frequency link between the second MLD and the third MLD.

In some examples, the p2p communications reporting component 1470 may be configured as or otherwise support a means for transmitting, to the first MLD via the first radio frequency link, a report indicating a buffer status for the p2p communications via the second radio frequency link between the second MLD and the third MLD, where the one or more service periods are determined based on the report.

In some examples, to support transmitting the report, the p2p communications reporting component 1470 may be configured as or otherwise support a means for transmitting an indication of a bandwidth time product and a link identifier associated with the p2p communications via the second radio frequency link between the second MLD and the third MLD.

In some examples, the p2p scheduling component 1440 may be configured as or otherwise support a means for receiving, from the first MLD via the first radio frequency link, second control information scheduling one or more second service periods for second p2p communications via the second radio frequency link associated with a fourth MLD, where the one or more second service periods do not overlap in time with the one or more service periods.

In some examples, the p2p scheduling component 1440 may be configured as or otherwise support a means for receiving, from the first MLD via the first radio frequency link, second control information scheduling one or more second service periods for second p2p communications via the second radio frequency link associated with a fourth MLD, where the one or more second service periods overlap in time with the one or more service periods, and where the one or more second service periods are associated with a first beam orthogonal with a second beam associated with the one or more service periods.

In some examples, the sector management component 1465 may be configured as or otherwise support a means for receiving, from the first MLD via the first radio frequency link, second control information indicating a first sector associated with the second MLD and a second sector associated with the third MLD.

Figure 15:
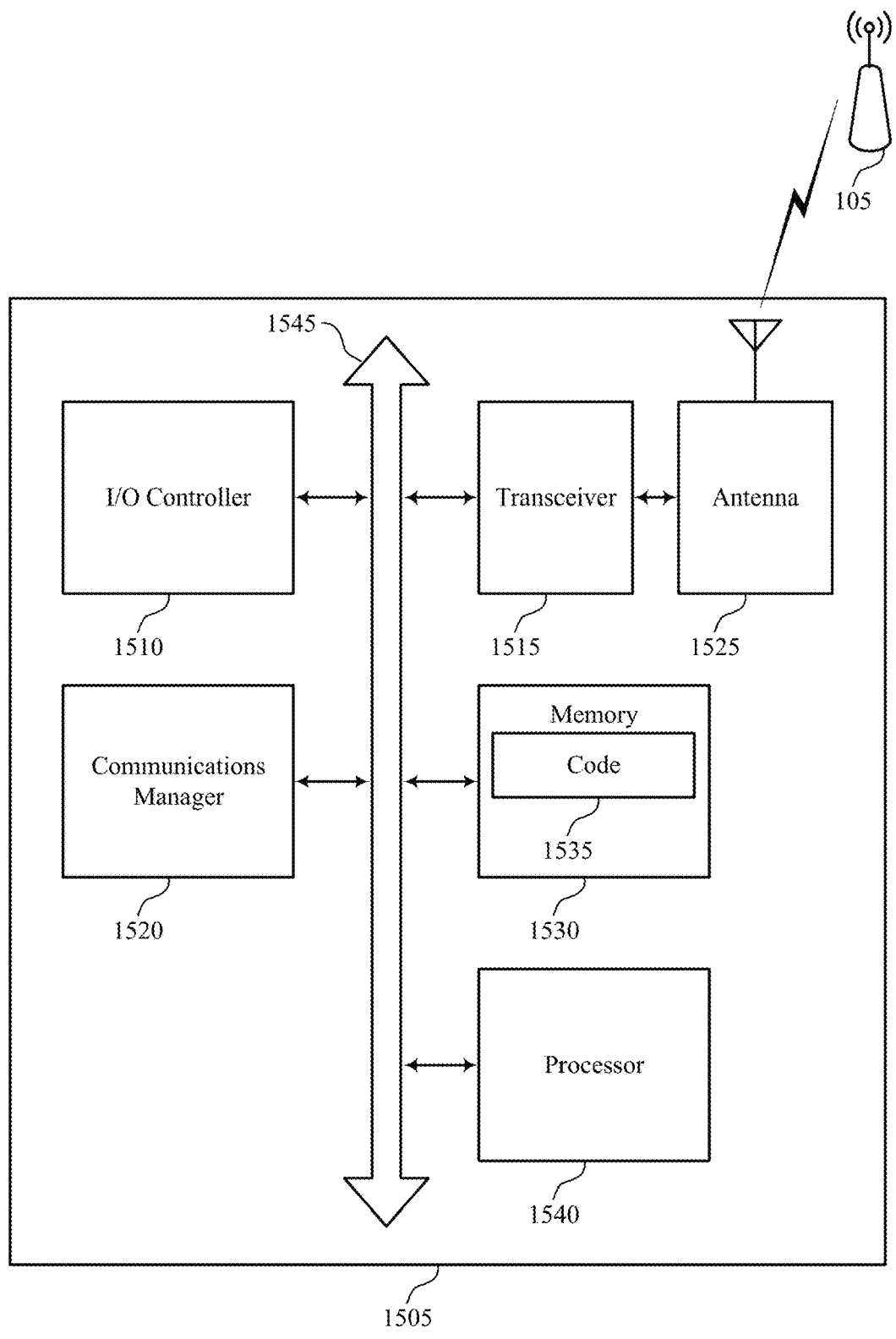
FIG. 15 shows a diagram of a system including a device that supports soft AP and p2p operation in accordance with one or more aspects of the present disclosure.

FIG. 15 shows a diagram of a system 1500 including a device 1505 that supports soft AP and p2p operation in accordance with one or more aspects of the present disclosure. The device 1505 may be an example of or include the components of a device 1205, a device 1305, or an STA as described herein. The device 1505 may include components for bi-directional voice and data communications including components for transmitting and receiving communications, such as a communications manager 1520, an I/O controller 1510, a transceiver 1515, an antenna 1525, a memory 1530, code 1535, and a processor 1540. These components may be in electronic communication or otherwise coupled (e.g., operatively, communicatively, functionally, electronically, electrically) via one or more buses (e.g., a bus 1545).

The I/O controller 1510 may manage input and output signals for the device 1505. The I/O controller 1510 may also manage peripherals not integrated into the device 1505. In some cases, the I/O controller 1510 may represent a physical connection or port to an external peripheral. In some cases, the I/O controller 1510 may utilize an operating system such as iOS®, ANDROID®, MS-DOS®, MS-WINDOWS®, OS/2®, UNIX®, LINUX®, or another known operating system. In some other cases, the I/O controller 1510 may represent or interact with a modem, a keyboard, a mouse, a touchscreen, or a similar device. In some cases, the I/O controller 1510 may be implemented as part of a processor, such as the processor 1540. In some cases, a user may interact with the device 1505 via the I/O controller 1510 or via hardware components controlled by the I/O controller 1510.

In some cases, the device 1505 may include a single antenna 1525. However, in some other cases the device 1505 may have more than one antenna 1525, which may be capable of concurrently transmitting or receiving multiple wireless transmissions. The transceiver 1515 may communicate bi-directionally, via the one or more antennas 1525, wired, or wireless links as described herein. For example, the transceiver 1515 may represent a wireless transceiver and may communicate bi-directionally with another wireless transceiver. The transceiver 1515 may also include a modem to modulate the packets and provide the modulated packets to one or more antennas 1525 for transmission, and to demodulate packets received from the one or more antennas 1525. The transceiver 1515, or the transceiver 1515 and one or more antennas 1525, may be an example of a transmitter 1215, a transmitter 1315, a receiver 1210, a receiver 1310, or any combination thereof or component thereof, as described herein.

The memory 1530 may include RAM and ROM. The memory 1530 may store computer-readable, computer-executable code 1535 including instructions that, when executed by the processor 1540, cause the device 1505 to perform various functions described herein. In some cases, the memory 1530 may contain, among other things, a BIOS which may control basic hardware or software operation such as the interaction with peripheral components or devices.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some other cases, a memory controller may be integrated into the processor 1540. The processor 1540 may be configured to execute computer-readable instructions stored in a memory (e.g., the memory 1530) to cause the device 1505 to perform various functions (e.g., functions or tasks supporting soft AP and p2p operation). For example, the device 1505 or a component of the device 1505 may include a processor 1540 and memory 1530 coupled with or to the processor 1540, the processor 1540 and memory 1530 configured to perform various functions described herein.

The communications manager 1520 may support wireless communications at a first MLD in accordance with examples as disclosed herein. For example, the communications manager 1520 may be configured as or otherwise support a means for establishing communications according to an MLO for a WLAN including the first MLD operating in an AP role and one or more second MLDs, where the MLO includes a first radio frequency link for control communications and a second radio frequency link for data communications. The communications manager 1520 may be configured as or otherwise support a means for transmitting, via the first radio frequency link, a message including information associated with a transfer of the AP role from the first MLD to a second MLD of the one or more second MLDs.

Additionally, or alternatively, the communications manager 1520 may support wireless communications at a second MLD in accordance with examples as disclosed herein. For example, the communications manager 1520 may be configured as or otherwise support a means for establishing communications according to an MLO for a WLAN including a first MLD operating in an AP role, the second MLD, and one or more third MLDs, the MLO including a first radio frequency link for control communications and a second radio frequency link for data communications. The communications manager 1520 may be configured as or otherwise support a means for receiving, from the first MLD via the first radio frequency link, a message including information associated with a transfer of the AP role from the first MLD to the second MLD or to one of the one or more third MLDs.

Additionally, or alternatively, the communications manager 1520 may support wireless communications at a first MLD in accordance with examples as disclosed herein. For example, the communications manager 1520 may be configured as or otherwise support a means for establishing communications according to an MLO for a WLAN including the first MLD operating in an AP role, a second MLD, and a third MLD, where the MLO includes a first radio frequency link for control communications and a second radio frequency link for data communications. The communications manager 1520 may be configured as or otherwise support a means for transmitting, via the first radio frequency link to the second MLD and to the third MLD, control information scheduling one or more service periods for p2p communications via the second radio frequency link between the second MLD and the third MLD.

Additionally, or alternatively, the communications manager 1520 may support wireless communications at a second MLD in accordance with examples as disclosed herein. For example, the communications manager 1520 may be configured as or otherwise support a means for establishing communications according to an MLO for a WLAN including a first MLD operating in an AP role, the second MLD, and a third MLD, where the MLO includes a first radio frequency link for control communications and a second radio frequency link for data communications. The communications manager 1520 may be configured as or otherwise support a means for receiving, via the first radio frequency link from the first MLD, control information scheduling one or more service periods for p2p communications via the second radio frequency link between the second MLD and the third MLD.

By including or configuring the communications manager 1520 in accordance with examples as described herein, the device 1505 may support techniques for improved communication reliability, reduced latency, improved user experience related to reduced processing, reduced power consumption, more efficient utilization of communication resources, and improved coordination between devices.

Figure 16:
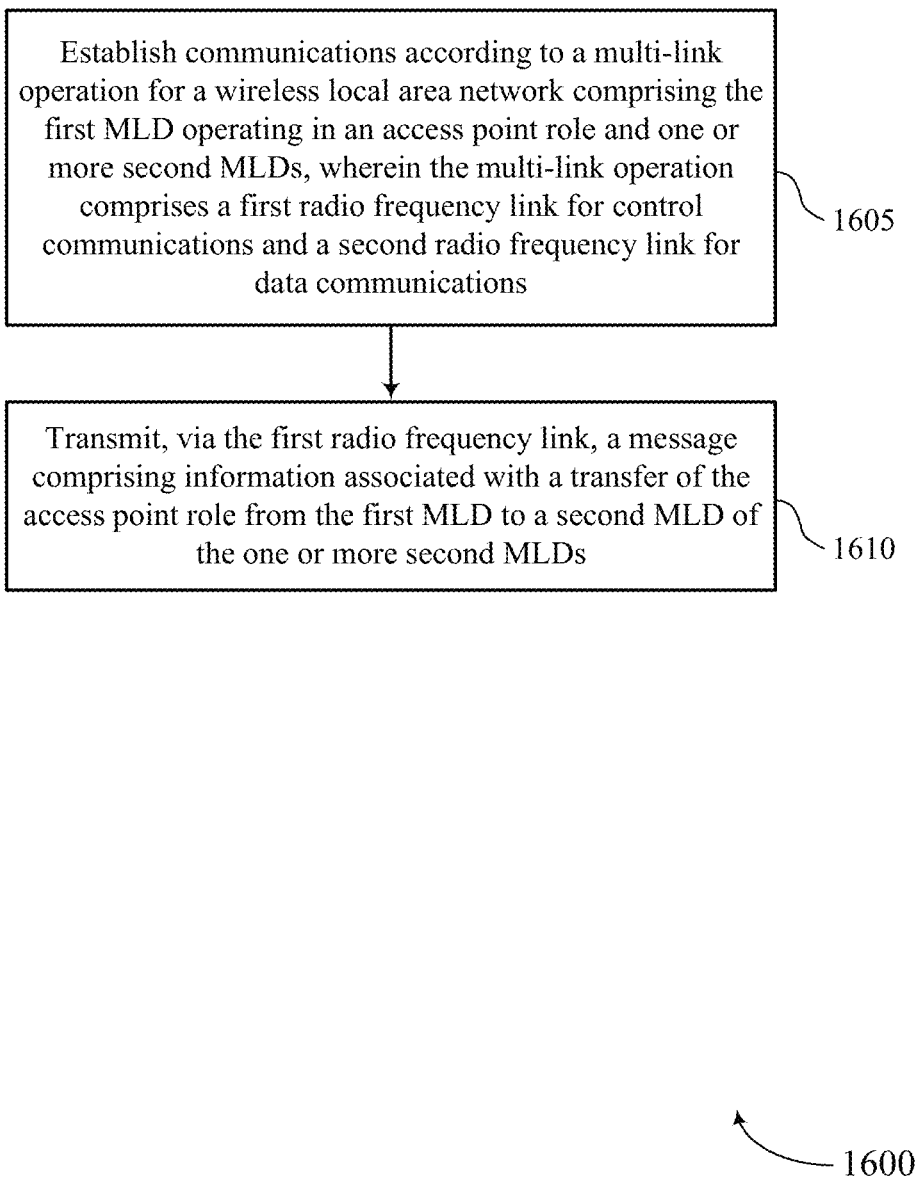
FIGS. 16 through 21 show flowcharts illustrating methods that support soft AP and p2p operation in accordance with one or more aspects of the present disclosure.

FIG. 16 shows a flowchart illustrating a method 1600 that supports soft AP and p2p operation in accordance with one or more aspects of the present disclosure. The operations of the method 1600 may be implemented by an AP or an STA or its components as described herein. For example, the operations of the method 1600 may be performed by an AP as described with reference to FIGs. FIG. 1 through 11 or an STA as described with reference to FIGs. FIG. 1 through 7 and 12 through 15. In some examples, an AP or an STA may execute a set of instructions to control the functional elements of the AP or the STA to perform the described functions. Additionally, or alternatively, the AP or the STA may perform aspects of the described functions using special-purpose hardware.

At 1605, the method may include establishing communications according to an MLO for a WLAN including the first MLD operating in an AP role and one or more second MLDs, where the MLO includes a first radio frequency link for control communications and a second radio frequency link for data communications. The operations of 1605 may be performed in accordance with examples as disclosed herein. In some examples, aspects of the operations of 1605 may be performed by an MLO AP role component 1025 or an MLO AP role component 1425 as described with reference to FIGS. 10 and 14.

At 1610, the method may include transmitting, via the first radio frequency link, a message including information associated with a transfer of the AP role from the first MLD to a second MLD of the one or more second MLDs. The operations of 1610 may be performed in accordance with examples as disclosed herein. In some examples, aspects of the operations of 1610 may be performed by an AP role transfer component 1030 or an AP role transfer component 1430 as described with reference to FIGS. 10 and 14.

Figure 17:
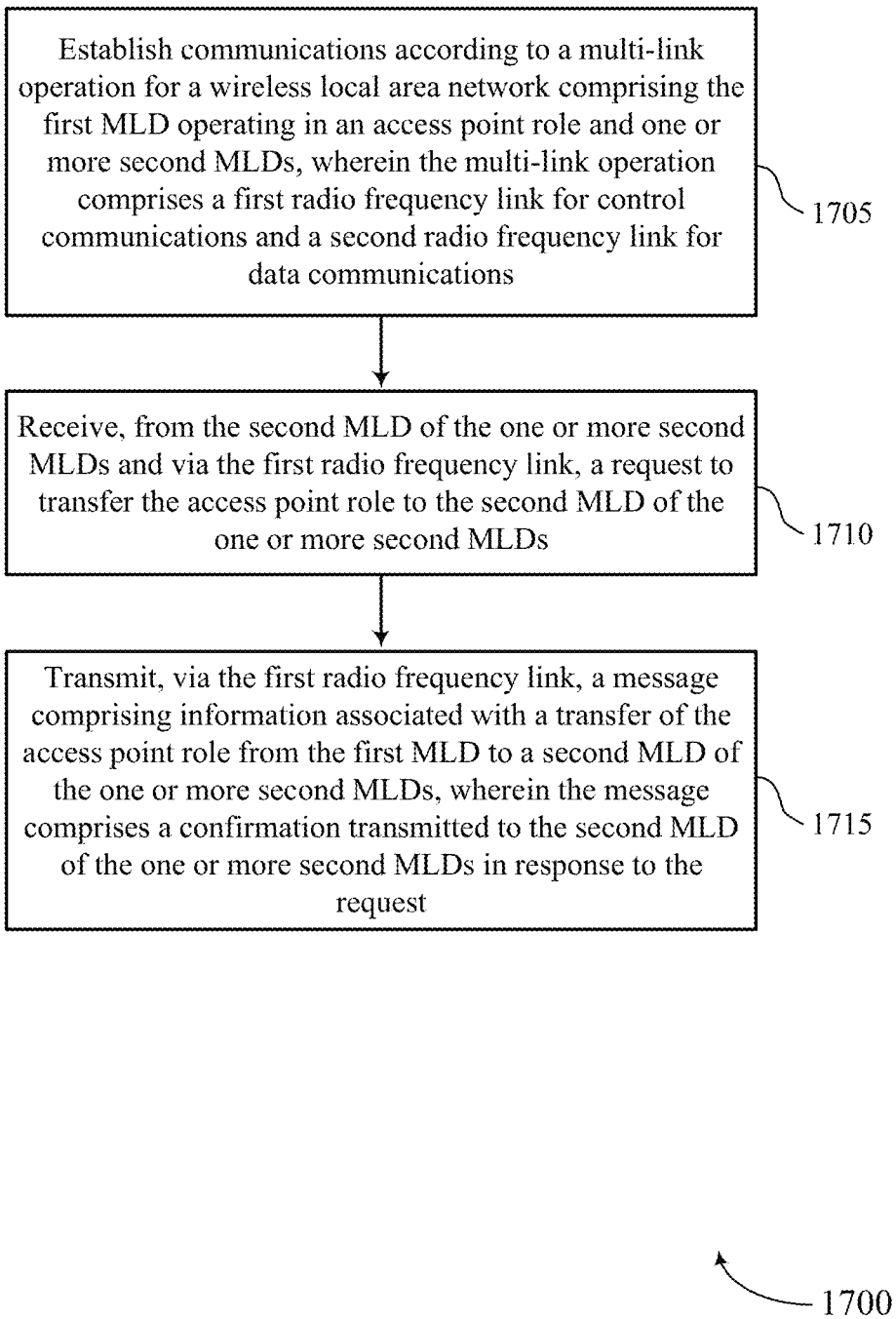

FIG. 17 shows a flowchart illustrating a method 1700 that supports soft AP and p2p operation in accordance with one or more aspects of the present disclosure. The operations of the method 1700 may be implemented by an AP or an STA or its components as described herein. For example, the operations of the method 1700 may be performed by an AP as described with reference to FIGs. FIG. 1 through 11 or an STA as described with reference to FIGs. FIG. 1 through 7 and 12 through 15. In some examples, an AP or an STA may execute a set of instructions to control the functional elements of the AP or the STA to perform the described functions. Additionally, or alternatively, the AP or the STA may perform aspects of the described functions using special-purpose hardware.

At 1705, the method may include establishing communications according to an MLO for a WLAN including the first MLD operating in an AP role and one or more second MLDs, where the MLO includes a first radio frequency link for control communications and a second radio frequency link for data communications. The operations of 1705 may be performed in accordance with examples as disclosed herein. In some examples, aspects of the operations of 1705 may be performed by an MLO AP role component 1025 or an MLO AP role component 1425 as described with reference to FIGS. 10 and 14.

At 1710, the method may include receiving, from the second MLD of the one or more second MLDs and via the first radio frequency link, a request to transfer the AP role to a second MLD of the one or more second MLDs. The operations of 1710 may be performed in accordance with examples as disclosed herein. In some examples, aspects of the operations of 1710 may be performed by an AP role transfer request component 1040 or an AP role transfer request component 1445 as described with reference to FIGS. 10 and 14.

At 1715, the method may include transmitting, via the first radio frequency link, a message including information associated with a transfer of the AP role from the first MLD to the second MLD of the one or more second MLDs, where the message includes a confirmation transmitted to the second MLD of the one or more second MLDs in response to the request. The operations of 1715 may be performed in accordance with examples as disclosed herein. In some examples, aspects of the operations of 1715 may be performed by an AP role transfer component 1030 or an AP role transfer component 1430 as described with reference to FIGS. 10 and 14.

Figure 18:
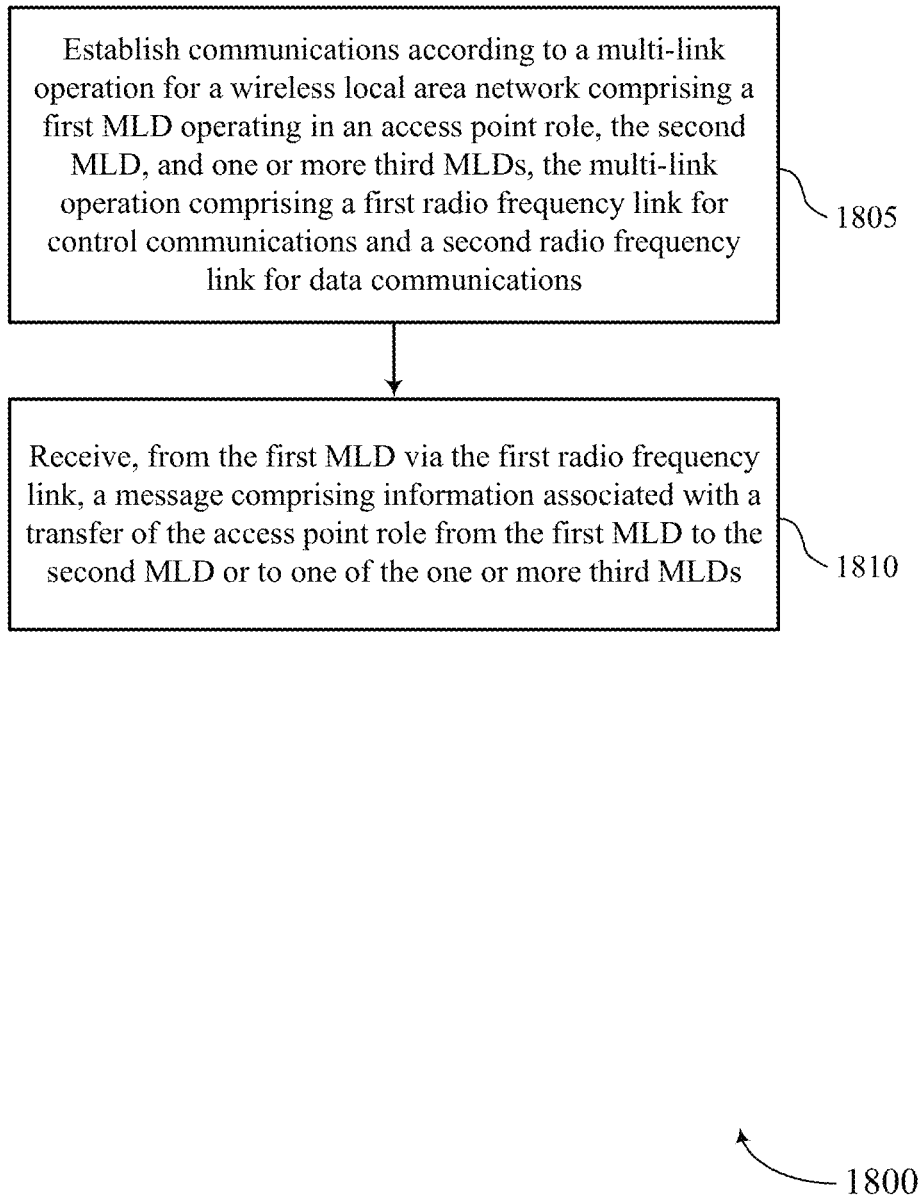

FIG. 18 shows a flowchart illustrating a method 1800 that supports soft AP and p2p operation in accordance with one or more aspects of the present disclosure. The operations of the method 1800 may be implemented by an STA or its components as described herein. For example, the operations of the method 1800 may be performed by an STA as described with reference to FIGs. FIG. 1 through 7 and 12 through 15. In some examples, an STA may execute a set of instructions to control the functional elements of the STA to perform the described functions. Additionally, or alternatively, the STA may perform aspects of the described functions using special-purpose hardware.

At 1805, the method may include establishing communications according to an MLO for a WLAN including a first MLD operating in an AP role, the second MLD, and one or more third MLDs, the MLO including a first radio frequency link for control communications and a second radio frequency link for data communications. The operations of 1805 may be performed in accordance with examples as disclosed herein. In some examples, aspects of the operations of 1805 may be performed by an MLO station role component 1435 as described with reference to FIG. 14.

At 1810, the method may include receiving, from the first MLD via the first radio frequency link, a message including information associated with a transfer of the AP role from the first MLD to the second MLD or to one of the one or more third MLDs. The operations of 1810 may be performed in accordance with examples as disclosed herein. In some examples, aspects of the operations of 1810 may be performed by an AP role transfer component 1430 as described with reference to FIG. 14.

Figure 19:
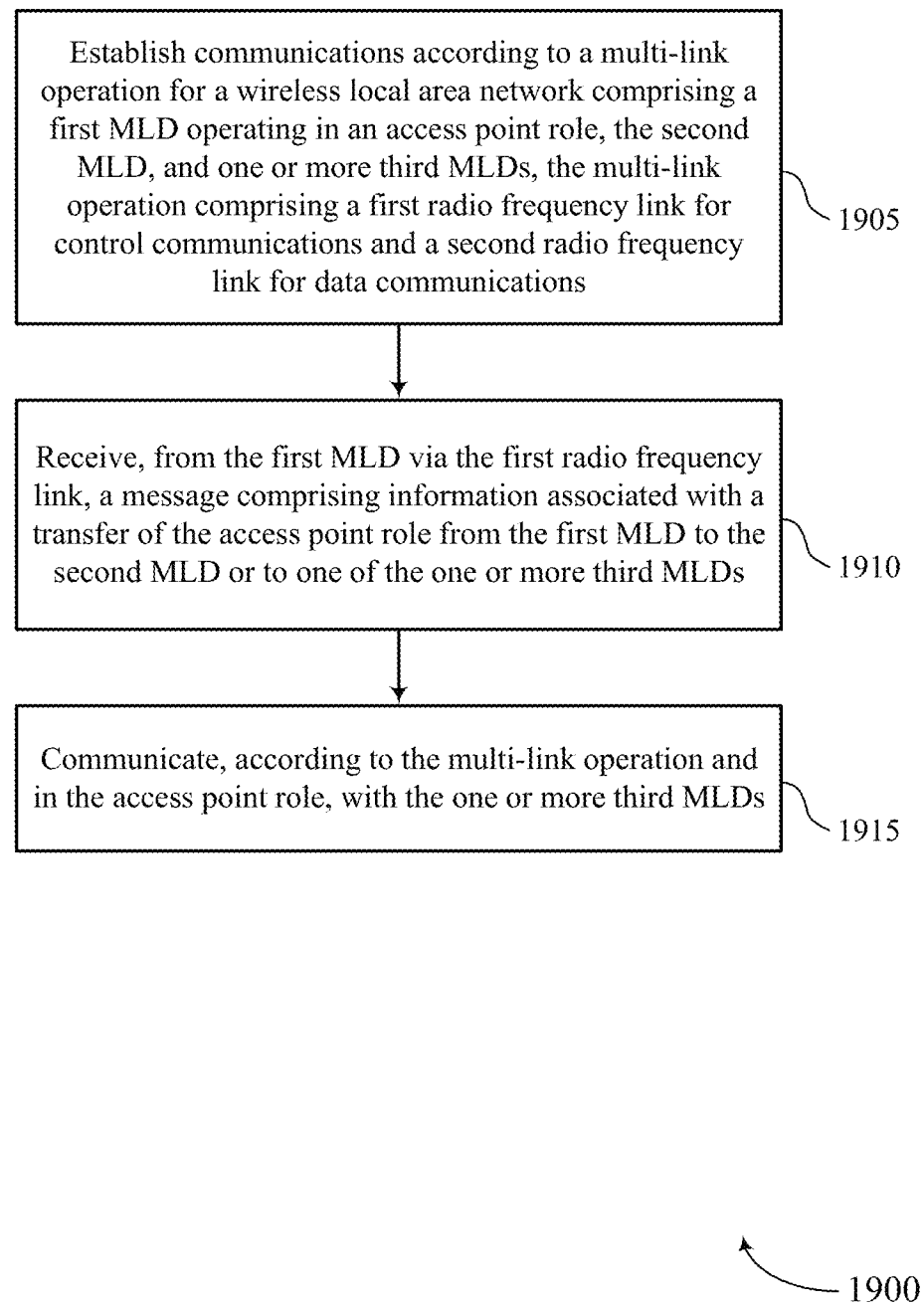

FIG. 19 shows a flowchart illustrating a method 1900 that supports soft AP and p2p operation in accordance with one or more aspects of the present disclosure. The operations of the method 1900 may be implemented by an STA or its components as described herein. For example, the operations of the method 1900 may be performed by an STA as described with reference to FIGs. FIGS. 1 through 7 and 12 through 15. In some examples, an STA may execute a set of instructions to control the functional elements of the STA to perform the described functions. Additionally, or alternatively, the STA may perform aspects of the described functions using special-purpose hardware.

At 1905, the method may include establishing communications according to an MLO for a WLAN including a first MLD operating in an AP role, the second MLD, and one or more third MLDs, the MLO including a first radio frequency link for control communications and a second radio frequency link for data communications. The operations of 1905 may be performed in accordance with examples as disclosed herein. In some examples, aspects of the operations of 1905 may be performed by an MLO station role component 1435 as described with reference to FIG. 14.

At 1910, the method may include receiving, from the first MLD via the first radio frequency link, a message including information associated with a transfer of the AP role from the first MLD to the second MLD or to one of the one or more third MLDs. The operations of 1910 may be performed in accordance with examples as disclosed herein. In some examples, aspects of the operations of 1910 may be performed by an AP role transfer component 1430 as described with reference to FIG. 14.

At 1915, the method may include communicating, according to the MLO and in the AP role, with the one or more third MLDs. The operations of 1915 may be performed in accordance with examples as disclosed herein. In some examples, aspects of the operations of 1915 may be performed by an MLO AP role component 1425 as described with reference to FIG. 14.

Figure 20:
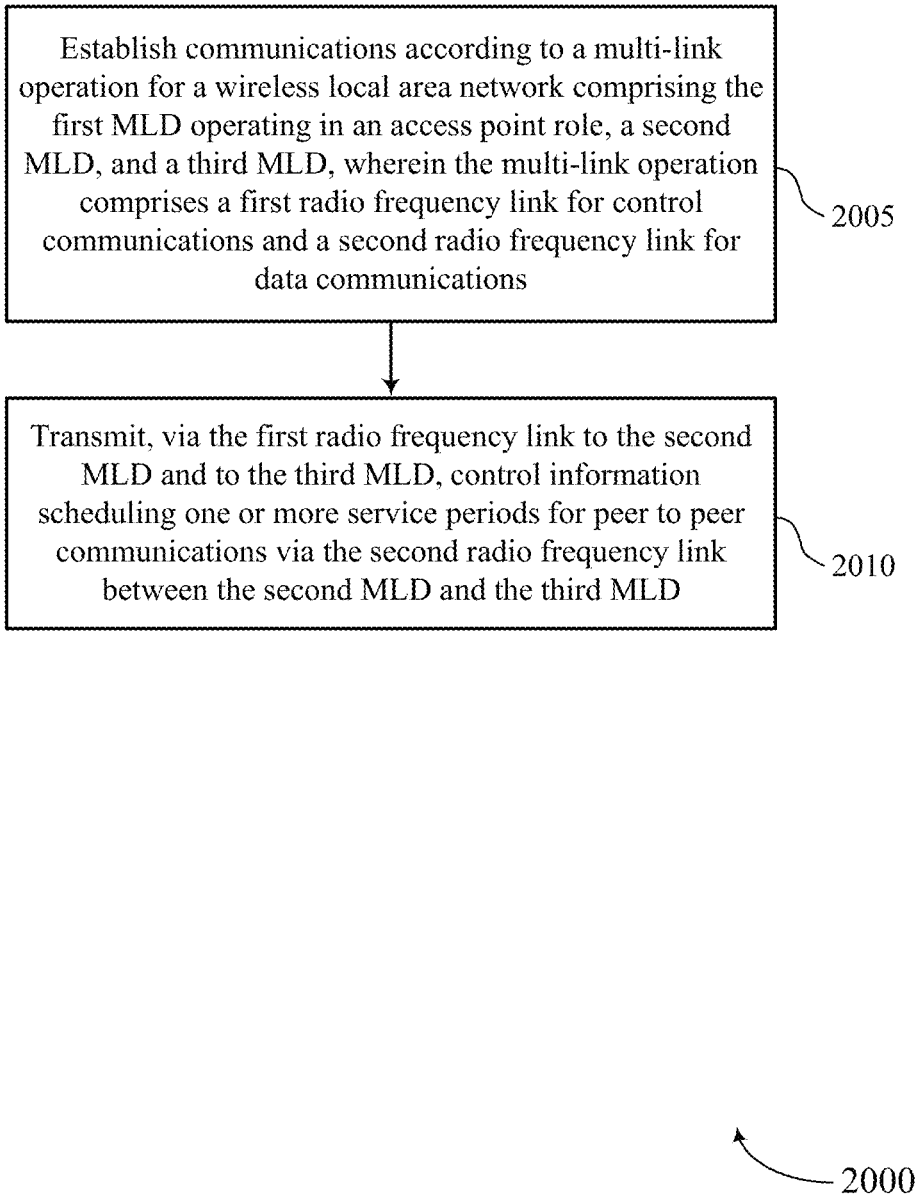

FIG. 20 shows a flowchart illustrating a method 2000 that supports soft AP and p2p operation in accordance with one or more aspects of the present disclosure. The operations of the method 2000 may be implemented by an AP or an STA or its components as described herein. For example, the operations of the method 2000 may be performed by an AP as described with reference to FIGs. FIG. 1 through 11 or an STA as described with reference to FIGs. FIGS. 1 through 7 and 12 through 15. In some examples, an AP or an STA may execute a set of instructions to control the functional elements of the AP or the STA to perform the described functions. Additionally, or alternatively, the AP or the STA may perform aspects of the described functions using special-purpose hardware.

At 2005, the method may include establishing communications according to an MLO for a WLAN including the first MLD operating in an AP role, a second MLD, and a third MLD, where the MLO includes a first radio frequency link for control communications and a second radio frequency link for data communications. The operations of 2005 may be performed in accordance with examples as disclosed herein. In some examples, aspects of the operations of 2005 may be performed by an MLO AP role component 1025 or an MLO AP role component 1425 as described with reference to FIGS. 10 and 14.

At 2010, the method may include transmitting, via the first radio frequency link to the second MLD and to the third MLD, control information scheduling one or more service periods for p2p communications via the second radio frequency link between the second MLD and the third MLD. The operations of 2010 may be performed in accordance with examples as disclosed herein. In some examples, aspects of the operations of 2010 may be performed by a p2p scheduling component 1035 or a p2p scheduling component 1440 as described with reference to FIGS. 10 and 14.

Figure 21:
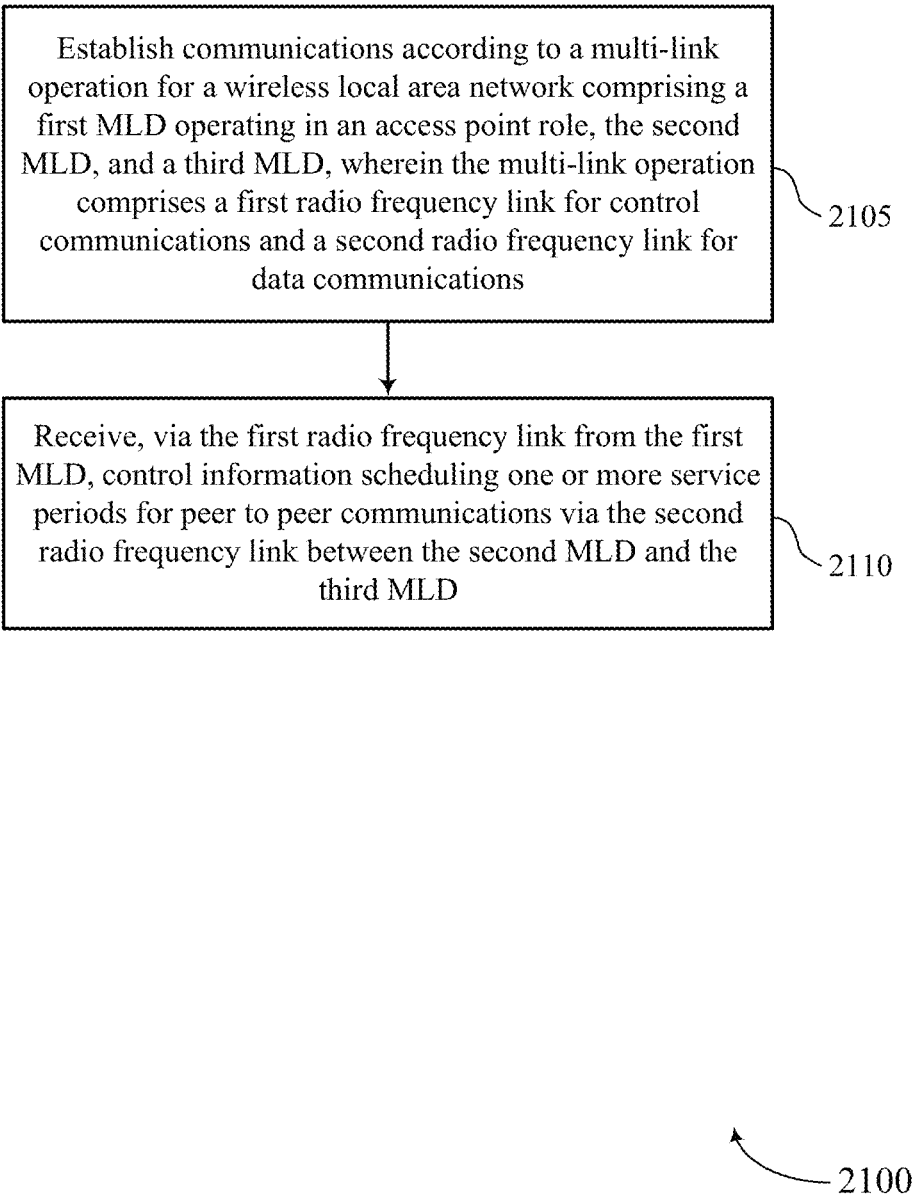

FIG. 21 shows a flowchart illustrating a method 2100 that supports soft AP and p2p operation in accordance with one or more aspects of the present disclosure. The operations of the method 2100 may be implemented by an STA or its components as described herein. For example, the operations of the method 2100 may be performed by an STA as described with reference to FIGs. FIGS. 1 through 7 and 12 through 15. In some examples, an STA may execute a set of instructions to control the functional elements of the STA to perform the described functions. Additionally, or alternatively, the STA may perform aspects of the described functions using special-purpose hardware.

At 2105, the method may include establishing communications according to an MLO for a WLAN including a first MLD operating in an AP role, the second MLD, and a third MLD, where the MLO includes a first radio frequency link for control communications and a second radio frequency link for data communications. The operations of 2105 may be performed in accordance with examples as disclosed herein. In some examples, aspects of the operations of 2105 may be performed by an MLO station role component 1435 as described with reference to FIG. 14.

At 2110, the method may include receiving, via the first radio frequency link from the first MLD, control information scheduling one or more service periods for p2p communications via the second radio frequency link between the second MLD and the third MLD. The operations of 2110 may be performed in accordance with examples as disclosed herein. In some examples, aspects of the operations of 2110 may be performed by a p2p scheduling component 1440 as described with reference to FIG. 14.

The following provides an overview of aspects of the present disclosure:

Aspect 1: A method for wireless communications at a first MLD, comprising: establishing communications according to a multi-link operation for a wireless local area network comprising the first MLD operating in an access point role and one or more second MLDs, wherein the multi-link operation comprises a first radio frequency link for control communications and a second radio frequency link for data communications; and transmitting, via the first radio frequency link, a message comprising information associated with a transfer of the access point role from the first MLD to a second MLD of the one or more second MLDs.

Aspect 2: The method of aspect 1, further comprising: receiving, from the second MLD of the one or more second MLDs and via the first radio frequency link, a request to transfer the access point role to the second MLD of the one or more second MLDs, wherein the message comprises a confirmation transmitted to the second MLD of the one or more second MLDs in response to the request.

Aspect 3: The method of aspect 2, further comprising: transmitting, via the first radio frequency link, a management frame indicating a timing for the transfer of the access point role from the first MLD to the second MLD of the one or more second MLDs.

Aspect 4: The method of aspect 3, further comprising: transmitting, to the second MLD of the one or more second MLDs via the first radio frequency link, an indication of a BSS context associated with the access point role in response to the request, the BSS context comprising at least one operational parameter of a BSS and a set of service periods associated with data communications via the second radio frequency link for the one or more second MLDs.

Aspect 5: The method of any of aspects 3 through 4, wherein the timing comprises a countdown period between transmission of the message and a target beacon transmission time associated with the transfer of the access point role from the first MLD to the second MLD of the one or more second MLDs, the countdown period comprising a plurality of delivery traffic indication message periods on the first radio frequency link.

Aspect 6: The method of any of aspects 1 through 5, wherein transmitting the message comprises: transmitting an indication of a candidate list of MLDs of the one or more second MLDs capable of operating in the access point role, wherein the candidate list of MLDs comprises the second MLD of the one or more second MLDs.

Aspect 7: The method of aspect 6, wherein transmitting the message further comprises: transmitting an indication of a timing for the transfer of the access point role from the first MLD to the second MLD of the one or more second MLDs.

Aspect 8: The method of aspect 7, further comprising: receiving, from the second MLD of the one or more second MLDs via the first radio frequency link, a second message comprising an indication of an updated timing for the transfer of the access point role; and transmitting, via the first radio frequency link and in response to the second message, a third message indicating the updated timing for the transfer of the access point role.

Aspect 9: The method of any of aspects 7 through 8, wherein transmitting the indication of the timing comprises: transmitting an indication of a countdown period set to a reserved value.

Aspect 10: The method of any of aspects 7 through 9, wherein transmitting the indication of the timing comprises: transmitting an indication of a target beacon transmission time in the second radio frequency link, the target beacon transmission time associated with the transfer of the access point role from the first MLD to the second MLD of the one or more second MLDs.

Aspect 11: The method of any of aspects 7 through 10, wherein transmitting the message further comprises: transmitting an indication of a BSS context associated with the access point role, the BSS context comprising at least one operational parameter of a BSS and a set of service periods associated with data communications via the second radio frequency link for the one or more second MLDs.

Aspect 12: The method of any of aspects 6 through 11, further comprising: receiving, via the first radio frequency link from a third MLD of the one or more second MLDs included in the candidate list of MLDs, an indication to remove the third MLD from the candidate list of MLDs; and transmitting a second message comprising an indication of an updated candidate list of MLDs without the third MLD.

Aspect 13: The method of any of aspects 6 through 12, wherein the transfer of the access point role comprises a transfer of the access point role in the second radio frequency link.

Aspect 14: A method for wireless communications at a second MLD, comprising: establishing communications according to a multi-link operation for a wireless local area network comprising a first MLD operating in an access point role, the second MLD, and one or more third MLDs, the multi-link operation comprising a first radio frequency link for control communications and a second radio frequency link for data communications; and receiving, from the first MLD via the first radio frequency link, a message comprising information associated with a transfer of the access point role from the first MLD to the second MLD or to one of the one or more third MLDs.

Aspect 15: The method of aspect 14, further comprising: receiving, from the one or more third MLDs via the first radio frequency link, one or more respective authentication messages.

Aspect 16: The method of any of aspects 14 through 15, further comprising: communicating, according to the multi-link operation and in the access point role, with the one or more third MLDs.

Aspect 17: The method of aspect 16, further comprising: transmitting, via the first radio frequency link, a management frame for the second radio frequency link.

Aspect 18: The method of any of aspects 16 through 17, further comprising: transmitting, to the one or more third MLDs via the first radio frequency link, an indication of service periods for data communications via the second radio frequency link.

Aspect 19: The method of any of aspects 16 through 18, further comprising: performing a beam training procedure with the one or more third MLDs for data communications via the second radio frequency link.

Aspect 20: The method of any of aspects 14 through 19, further comprising: transmitting, to the first MLD via the first radio frequency link, a request to transfer the access point role to the second MLD, wherein the message comprises a confirmation received in response to the request.

Aspect 21: The method of aspect 20, further comprising: receiving, from the first MLD via the first radio frequency link, a management frame indicating a timing for the transfer of the access point role from the first MLD to the second MLD.

Aspect 22: The method of aspect 21, further comprising: receiving, from the first MLD via the first radio frequency link, an indication of a BSS context associated with the access point role in response to the request, the basic service set context comprising at least one operational parameter of a BSS and a set of service periods associated with data communications via the second radio frequency link for the one or more third MLDs.

Aspect 23: The method of any of aspects 21 through 22, wherein the timing comprises a countdown period between transmission of the message and a target beacon transmission time associated with the transfer of the access point role from the first MLD to the second MLD, the countdown period comprising a plurality of delivery traffic indication message periods on the first radio frequency link.

Aspect 24: The method of any of aspects 14 through 23, wherein receiving the message comprises: receiving an indication of a candidate list of MLDs capable of operating in the access point role, wherein the candidate list of MLDs comprises the second MLD.

Aspect 25: The method of aspect 24, wherein receiving the message further comprises: receiving an indication of a timing for the transfer of the access point role from the first MLD to the second MLD or to one of the one or more third MLDs.

Aspect 26: The method of aspect 25, further comprising: transmitting, to the first MLD via the first radio frequency link, a second message comprising an indication of an updated timing for the transfer of the access point role; and receiving, via the first radio frequency link and in response to the second message, a third message indicating the updated timing for the transfer of the access point role.

Aspect 27: The method of any of aspects 25 through 26, wherein receiving the indication of the timing comprises: receiving an indication of a countdown period set to a reserved value.

Aspect 28: The method of any of aspects 25 through 27, wherein receiving the indication of the timing comprises: receiving an indication of a target beacon transmission time in the second radio frequency link, the target beacon transmission time associated with the transfer of the access point role from the first MLD to the second MLD or to one of the one or more third MLDs.

Aspect 29: The method of any of aspects 25 through 28, wherein receiving the message further comprises: receiving an indication of a BSS context associated with the access point role, the BSS context comprising at least one operational parameter of a BSS and a set of service periods associated with data communications via the second radio frequency link for the second MLD and the one or more third MLDs.

Aspect 30: The method of any of aspects 24 through 29, further comprising: transmitting, via the first radio frequency link to the first MLD, an indication to remove the second MLD from the candidate list of MLDs; and receiving, from the first MLD via the first radio frequency link, a second message comprising an indication of an updated candidate list of MLDs without the second MLD.

Aspect 31: The method of any of aspects 14 through 30, wherein the transfer of the access point role comprises a transfer of the access point role in the second radio frequency link.

Aspect 32: A method for wireless communications at a first MLD, comprising: establishing communications according to a multi-link operation for a wireless local area network comprising the first MLD operating in an access point role, a second MLD, and a third MLD, wherein the multi-link operation comprises a first radio frequency link for control communications and a second radio frequency link for data communications; and transmitting, via the first radio frequency link to the second MLD and to the third MLD, control information scheduling one or more service periods for peer to peer communications via the second radio frequency link between the second MLD and the third MLD.

Aspect 33: The method of aspect 32, further comprising: receiving, from the second MLD via the first radio frequency link, a report indicating a buffer status for the peer to peer communications via the second radio frequency link between the second MLD and the third MLD, wherein the one or more service periods are determined based at least in part on the report.

Aspect 34: The method of aspect 33, wherein receiving the report comprises: receiving an indication of a bandwidth time product and a link identifier associated with the peer to peer communications via the second radio frequency link between the second MLD and the third MLD, and wherein the first MLD determines a duration of the one or more service periods based at least in part on the bandwidth time product and a link identifier.

Aspect 35: The method of any of aspects 32 through 34, further comprising: transmitting, via the first radio frequency link to the second MLD and the third MLD, second control information scheduling one or more second service periods for second peer to peer communications via the second radio frequency link associated with a fourth MLD, wherein the one or more second service periods do not overlap in time with the one or more service periods.

Aspect 36: The method of any of aspects 32 through 35, further comprising: transmitting, via the first radio frequency link to the second MLD and the third MLD, second control information scheduling one or more second service periods for second peer to peer communications via the second radio frequency link associated with a fourth MLD, wherein the one or more second service periods overlap in time with the one or more service periods, and wherein the one or more second service periods are associated with a first beam orthogonal with a second beam associated with the one or more service periods.

Aspect 37: The method of aspect 36, further comprising: determining, via a machine learning process, that the first beam is orthogonal with the second beam, and wherein transmitting the control information and the second control information is based at least in part on the determining.

Aspect 38: The method of any of aspects 32 through 37, further comprising: identifying a first sector associated with the second MLD and a second sector associated with the third MLD; and transmitting, to the second MLD and the third MLD via the first radio frequency link, second control information indicating the first sector and the second sector.

Aspect 39: A method for wireless communications at a second MLD, comprising: establishing communications according to a multi-link operation for a wireless local area network comprising a first MLD operating in an access point role, the second MLD, and a third MLD, wherein the multi-link operation comprises a first radio frequency link for control communications and a second radio frequency link for data communications; and receiving, via the first radio frequency link from the first MLD, control information scheduling one or more service periods for peer to peer communications via the second radio frequency link between the second MLD and the third MLD.

Aspect 40: The method of aspect 39, further comprising: transmitting, to the first MLD via the first radio frequency link, a report indicating a buffer status for the peer to peer communications via the second radio frequency link between the second MLD and the third MLD, wherein the one or more service periods are determined based at least in part on the report.

Aspect 41: The method of aspect 40, wherein transmitting the report comprises: transmitting an indication of a bandwidth time product and a link identifier associated with the peer to peer communications via the second radio frequency link between the second MLD and the third MLD.

Aspect 42: The method of any of aspects 39 through 41, further comprising: receiving, from the first MLD via the first radio frequency link, second control information scheduling one or more second service periods for second peer to peer communications via the second radio frequency link associated with a fourth MLD, wherein the one or more second service periods do not overlap in time with the one or more service periods.

Aspect 43: The method of any of aspects 39 through 42, further comprising: receiving, from the first MLD via the first radio frequency link, second control information scheduling one or more second service periods for second peer to peer communications via the second radio frequency link associated with a fourth MLD, wherein the one or more second service periods overlap in time with the one or more service periods, and wherein the one or more second service periods are associated with a first beam orthogonal with a second beam associated with the one or more service periods.

Aspect 44: The method of any of aspects 39 through 43, further comprising: receiving, from the first MLD via the first radio frequency link, second control information indicating a first sector associated with the second MLD and a second sector associated with the third MLD.

Aspect 45: An apparatus for wireless communications at a first MLD, comprising a processor; memory coupled with the processor; and instructions stored in the memory and executable by the processor to cause the apparatus to perform a method of any of aspects 1 through 13.

Aspect 46: An apparatus for wireless communications at a first MLD, comprising at least one means for performing a method of any of aspects 1 through 13.

Aspect 47: A non-transitory computer-readable medium storing code for wireless communications at a first MLD, the code comprising instructions executable by a processor to perform a method of any of aspects 1 through 13.

Aspect 48: An apparatus for wireless communications at a second MLD, comprising a processor; memory coupled with the processor; and instructions stored in the memory and executable by the processor to cause the apparatus to perform a method of any of aspects 14 through 31.

Aspect 49: An apparatus for wireless communications at a second MLD, comprising at least one means for performing a method of any of aspects 14 through 31.

Aspect 50: A non-transitory computer-readable medium storing code for wireless communications at a second MLD, the code comprising instructions executable by a processor to perform a method of any of aspects 14 through 31.

Aspect 51: An apparatus for wireless communications at a first MLD, comprising a processor; memory coupled with the processor; and instructions stored in the memory and executable by the processor to cause the apparatus to perform a method of any of aspects 32 through 38.

Aspect 52: An apparatus for wireless communications at a first MLD, comprising at least one means for performing a method of any of aspects 32 through 38.

Aspect 53: A non-transitory computer-readable medium storing code for wireless communications at a first MLD, the code comprising instructions executable by a processor to perform a method of any of aspects 32 through 38.

Aspect 54: An apparatus for wireless communications at a second MLD, comprising a processor; memory coupled with the processor; and instructions stored in the memory and executable by the processor to cause the apparatus to perform a method of any of aspects 39 through 44.

Aspect 55: An apparatus for wireless communications at a second MLD, comprising at least one means for performing a method of any of aspects 39 through 44.

Aspect 56: A non-transitory computer-readable medium storing code for wireless communications at a second MLD, the code comprising instructions executable by a processor to perform a method of any of aspects 39 through 44.

It should be noted that the methods described herein describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM). An orthogonal frequency division multiple access (OFDMA) system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc.

The wireless communications system or systems described herein may support synchronous or asynchronous operation. For synchronous operation, the stations may have similar frame timing, and transmissions from different stations may be approximately aligned in time. For asynchronous operation, the stations may have different frame timing, and transmissions from different stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, the WLAN 100 of FIG. 1—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a first multi-link device (MLD), comprising:
    establishing communications according to a multi-link operation for a wireless local area network comprising the first MLD operating in an access point role and one or more second MLDs, wherein the multi-link operation comprises a first radio frequency link associated with control communications for the multi-link operation and a second radio frequency link associated with data communications; and
    transmitting, via the first radio frequency link and in association with the first radio frequency link being a lower frequency range than the second radio frequency link, a message comprising information associated with a transfer of the access point role for both the first radio frequency link and the second radio frequency link from the first MLD to a second MLD of the one or more second MLDs.

2. The method of claim 1, further comprising:
    receiving, from the second MLD of the one or more second MLDs and via the first radio frequency link, a request to transfer the access point role to the second MLD of the one or more second MLDs, wherein the message comprises a confirmation transmitted to the second MLD of the one or more second MLDs in response to the request.

3. The method of claim 2, further comprising:
    transmitting, via the first radio frequency link, a management frame indicating a timing for the transfer of the access point role from the first MLD to the second MLD of the one or more second MLDs.

4. The method of claim 3, further comprising:
    transmitting, to the second MLD of the one or more second MLDs via the first radio frequency link, an indication of a basic service set (BSS) context associated with the access point role in response to the request, the BSS context comprising at least one operational parameter of a BSS and a set of service periods associated with data communications via the second radio frequency link for the one or more second MLDs.

5. The method of claim 3, wherein the timing comprises a countdown period between transmission of the message and a target beacon transmission time associated with the transfer of the access point role from the first MLD to the second MLD of the one or more second MLDs, the countdown period comprising a plurality of delivery traffic indication message periods on the first radio frequency link.

6. The method of claim 1, wherein transmitting the message comprises:
    transmitting an indication of a candidate list of MLDs of the one or more second MLDs capable of operating in the access point role, wherein the candidate list of MLDs comprises the second MLD of the one or more second MLDs.

7. The method of claim 6, wherein transmitting the message further comprises:
    transmitting an indication of a timing for the transfer of the access point role from the first MLD to the second MLD of the one or more second MLDs.

8. The method of claim 7, further comprising:
    receiving, from the second MLD of the one or more second MLDs via the first radio frequency link, a second message comprising an indication of an updated timing for the transfer of the access point role; and
    transmitting, via the first radio frequency link and in response to the second message, a third message indicating the updated timing for the transfer of the access point role.

9. The method of claim 7, wherein transmitting the indication of the timing comprises:
    transmitting an indication of a countdown period set to a reserved value.

10. The method of claim 7, wherein transmitting the indication of the timing comprises:
    transmitting an indication of a target beacon transmission time in the second radio frequency link, the target beacon transmission time associated with the transfer of the access point role from the first MLD to the second MLD of the one or more second MLDs.

11. The method of claim 7, wherein transmitting the message further comprises:
    transmitting an indication of a basic service set (BSS) context associated with the access point role, the BSS context comprising at least one operational parameter of a BSS and a set of service periods associated with data communications via the second radio frequency link for the one or more second MLDs.

12. The method of claim 6, further comprising:
    receiving, via the first radio frequency link from a third MLD of the one or more second MLDs included in the candidate list of MLDs, an indication to remove the third MLD from the candidate list of MLDs; and
    transmitting a second message comprising an indication of an updated candidate list of MLDs without the third MLD.

13. The method of claim 6, wherein the transfer of the access point role comprises a transfer of the access point role in the second radio frequency link.

14. An apparatus for wireless communications at a first multi-link device (MLD), comprising:
    one or more processors;
    memory coupled with the one or more processors; and
    instructions stored in the memory and executable by the one or more processors to cause the apparatus to;
        establish communications according to a multi-link operation for a wireless local area network comprising the first MLD operating in an access point role and one or more second MLDs, wherein the multi-link operation comprises a first radio frequency link associated with control communications for the multi-link operation and a second radio frequency link associated with data communications; and
        transmit, via the first radio frequency link and in association with the first radio frequency link being a lower frequency range than the second radio frequency link, a message comprising information associated with a transfer of the access point role for both the first radio frequency link and the second radio frequency link from the first MLD to a second MLD of the one or more second MLDs.

15. The apparatus of claim 14, wherein the instructions are executable by the one or more processors to cause the apparatus to:
    receive, from the second MLD of the one or more second MLDs and via the first radio frequency link, a request to transfer the access point role to the second MLD of the one or more second MLDs, wherein the message comprises a confirmation transmitted to the second MLD of the one or more second MLDs in response to the request.

16. The apparatus of claim 15, wherein the instructions are executable by the one or more processors to cause the apparatus to:

transmit, via the first radio frequency link, a management frame indicating a timing for the transfer of the access point role from the first MLD to the second MLD of the one or more second MLDs.

17. The apparatus of claim 16, wherein the instructions are executable by the one or more processors to cause the apparatus to:

transmit, to the second MLD of the one or more second MLDs via the first radio frequency link, an indication of a basic service set (BSS) context associated with the access point role in response to the request, the BSS context comprising at least one operational parameter of a BSS and a set of service periods associated with data communications via the second radio frequency link for the one or more second MLDs.

18. The apparatus of claim 16, wherein the timing comprises a countdown period between transmission of the message and a target beacon transmission time associated with the transfer of the access point role from the first MLD to the second MLD of the one or more second MLDs, the countdown period comprising a plurality of delivery traffic indication message periods on the first radio frequency link.

19. The apparatus of claim 14, wherein to cause the apparatus to transmit the message, the instructions are executable by the one or more processors to cause the apparatus to:

transmit an indication of a candidate list of MLDs of the one or more second MLDs capable of operating in the access point role, wherein the candidate list of MLDs comprises the second MLD of the one or more second MLDs.

20. The apparatus of claim 19, wherein to cause the apparatus to transmit the message, the instructions are executable by the one or more processors to cause the apparatus to:

transmit an indication of a timing for the transfer of the access point role from the first MLD to the second MLD of the one or more second MLDs.

21. A non-transitory computer-readable medium storing code for wireless communications at a first multi-link device (MLD), the code comprising instructions executable by one or more processors to:

establish communications according to a multi-link operation for a wireless local area network comprising the first MLD operating in an access point role and one or more second MLDs, wherein the multi-link operation comprises a first radio frequency link associated with control communications for the multi-link operation and a second radio frequency link associated with data communications; and transmit, via the first radio frequency link and in association with the first radio frequency link being a lower frequency range than the second radio frequency link, a message comprising information associated with a transfer of the access point role for both the first radio frequency link and the second radio frequency link from the first MLD to a second MLD of the one or more second MLDs.

* * * * *